(12) United States Patent
Johnson et al.

(10) Patent No.: US 12,323,551 B2
(45) Date of Patent: *Jun. 3, 2025

(54) PAIR-THE-PLAN SYSTEM FOR DEVICES AND METHOD OF USE

(71) Applicant: Aeris Communications, Inc., San Jose, CA (US)

(72) Inventors: Drew S. Johnson, San Jose, CA (US); Dae Seong Kim, Campbell, CA (US); David Hu, Sunnyvale, CA (US); Robert B. Fultz, Boulder Creek, CA (US); Steven A. Millstein, Dallas, TX (US); John Molise, Menlo Park, CA (US)

(73) Assignee: Aeris Communications, Inc., San Jose, CA (US)

( * ) Notice: Subject to any disclaimer, the term of this patent is extended or adjusted under 35 U.S.C. 154(b) by 349 days.

This patent is subject to a terminal disclaimer.

(21) Appl. No.: 17/726,915

(22) Filed: Apr. 22, 2022

(65) Prior Publication Data

US 2022/0247869 A1   Aug. 4, 2022

Related U.S. Application Data

(63) Continuation of application No. 17/465,982, filed on Sep. 3, 2021, now abandoned, which is a continuation
(Continued)

(51) Int. Cl.
*H04M 15/00* (2024.01)
*H04L 12/14* (2024.01)
(Continued)

(52) U.S. Cl.
CPC .... *H04M 15/7652* (2013.01); *H04L 12/1457* (2013.01); *H04L 12/1471* (2013.01);
(Continued)

(58) Field of Classification Search
CPC ..... H04W 15/7652; H04W 4/44; H04W 4/90; H04W 12/1457; H04W 12/1471;
(Continued)

(56) References Cited

U.S. PATENT DOCUMENTS 6,195,568 B1   2/2001   Irvin
8,805,441 B1   8/2014   Nasserbakht
(Continued)

OTHER PUBLICATIONS

PCT International Search Report and Written Opinion of the International Searching Authority, issued Jan. 21, 2015, application No. PCT/US2014/060748 (5343PCT).

*Primary Examiner* — Nghi H Ly
(74) *Attorney, Agent, or Firm* — Shih IP Law Group, PLLC

(57) ABSTRACT

A computer-implemented method and system are disclosed for connecting one or more devices to subscriptions and cellular or other wireless billing plans. The method includes enrolling the one or more devices enabled for connectivity to cellular or other wireless service in a cellular or other wireless subscription and associated billing plan, wherein the enrollment includes providing an identifier for the one or more devices to a cellular or other wireless service provider chosen by a second user, and allowing the second user to use capabilities of the one or more devices governed by the cellular or other wireless subscription and an associated billing plan chosen by the second user; while the one or more devices are also configured to allow a first user to use capabilities of the one or more devices as governed by the cellular or other wireless subscription and an associated billing plan of the first user's choice.

33 Claims, 31 Drawing Sheets

Related U.S. Application Data of application No. 16/819,398, filed on Mar. 16, 2020, now Pat. No. 11,115,542, which is a continuation-in-part of application No. 15/599,835, filed on May 19, 2017, now Pat. No. 11,140,274, which is a continuation of application No. 14/274,505, filed on May 9, 2014, now Pat. No. 9,667,806, application No. 17/726,915, filed on Apr. 22, 2022 is a continuation-in-part of application No. 17/488,885, filed on Sep. 29, 2021, now Pat. No. 12,081,695.

(60) Provisional application No. 61/893,055, filed on Oct. 18, 2013.

(51) Int. Cl.
*H04W 4/24* (2024.01)
*H04W 4/44* (2018.01)
*H04W 4/90* (2018.01)

(52) U.S. Cl.
CPC ......... *H04M 15/60* (2013.01); *H04M 15/745* (2013.01); *H04M 15/765* (2013.01); *H04W 4/24* (2013.01); *H04W 4/44* (2018.02); *H04W 4/90* (2018.02)

(58) Field of Classification Search
CPC . H04W 15/60; H04W 15/745; H04W 15/765; H04W 4/24
USPC ......... 455/424, 406, 435.1, 410, 414.1, 418, 455/422.1
See application file for complete search history.

(56) References Cited

U.S. PATENT DOCUMENTS

| | | | |
|---|---|---|---|
| 9,129,087 B2 | 9/2015 | Grab | |
| 9,667,806 B2* | 5/2017 | Johnson | H04M 15/7652 |
| 11,115,542 B2* | 9/2021 | Hu | H04W 4/44 |
| 11,140,274 B2* | 10/2021 | Johnson | H04L 12/1457 |
| 2008/0274715 A1 | 11/2008 | Heit | |
| 2010/0131385 A1 | 5/2010 | Harrang | |
| 2010/0234071 A1 | 9/2010 | Shabtay et al. | |
| 2010/0306231 A1* | 12/2010 | Fisher | G06F 16/9536 715/764 |
| 2011/0118018 A1 | 5/2011 | Toyoda | |
| 2012/0046024 A1* | 2/2012 | Mikan | H04M 15/8351 455/420 |
| 2012/0088544 A1 | 4/2012 | Bentley | |
| 2012/0142367 A1 | 6/2012 | Przybylski | |
| 2013/0226682 A1 | 8/2013 | Grossman | |
| 2013/0254017 A1 | 9/2013 | Jack | |
| 2013/0262275 A1 | 10/2013 | Outwater | |
| 2013/0336637 A1 | 12/2013 | Nakamura et al. | |
| 2014/0322294 A1 | 1/2014 | Donlan et al. | |
| 2021/0400150 A1 | 12/2021 | Hu et al. | |
| 2022/0021769 A1* | 1/2022 | Johnson | H04L 12/1471 |
| 2022/0247869 A1 | 8/2022 | Johnson | |

* cited by examiner

A Multipurpose Device Connected To Multiple Service Providers
If multiple profiles can be active at the same time

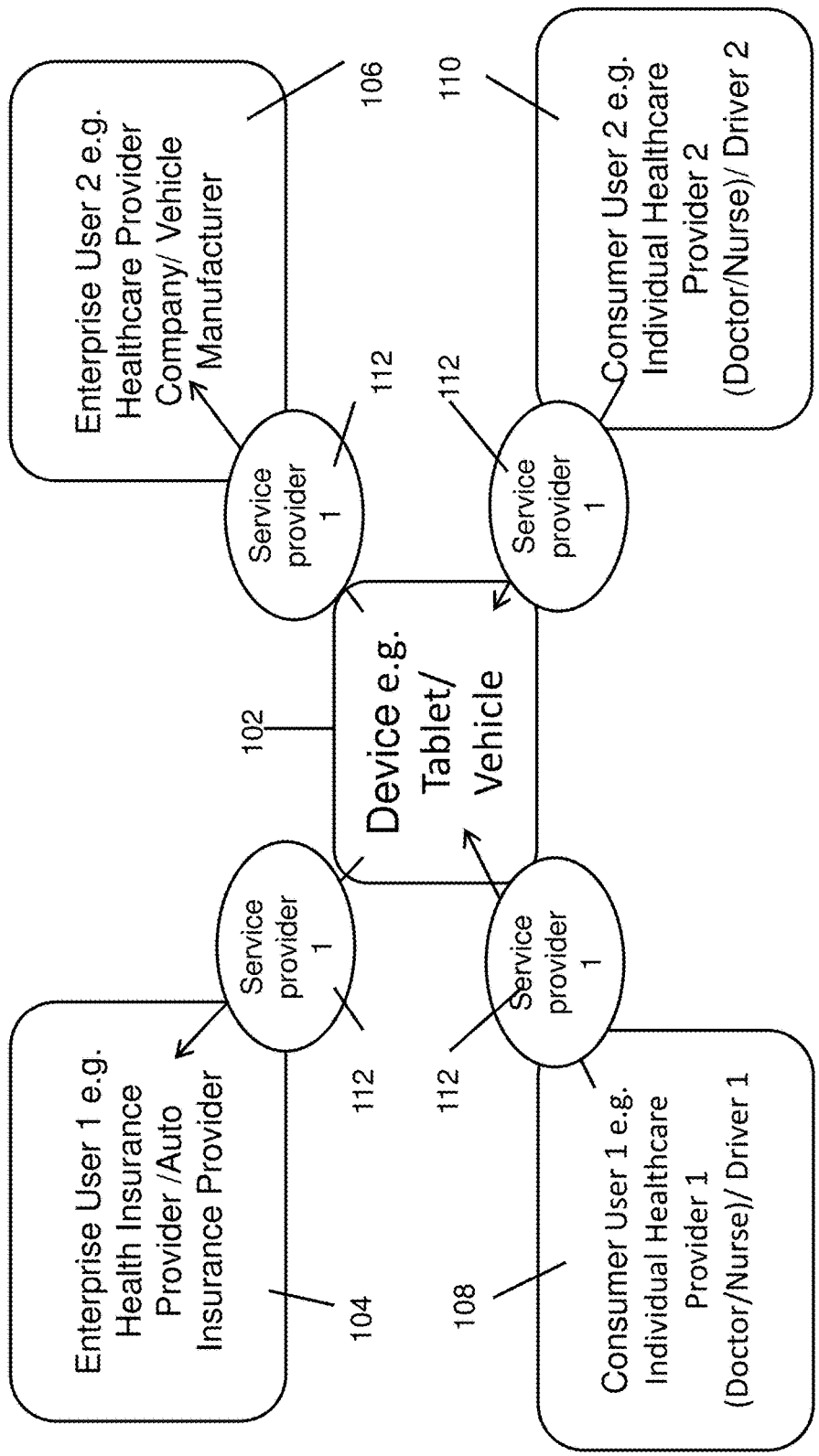

A Multipurpose Device Connected To Two Service Providers
If two profiles can be active at any given time

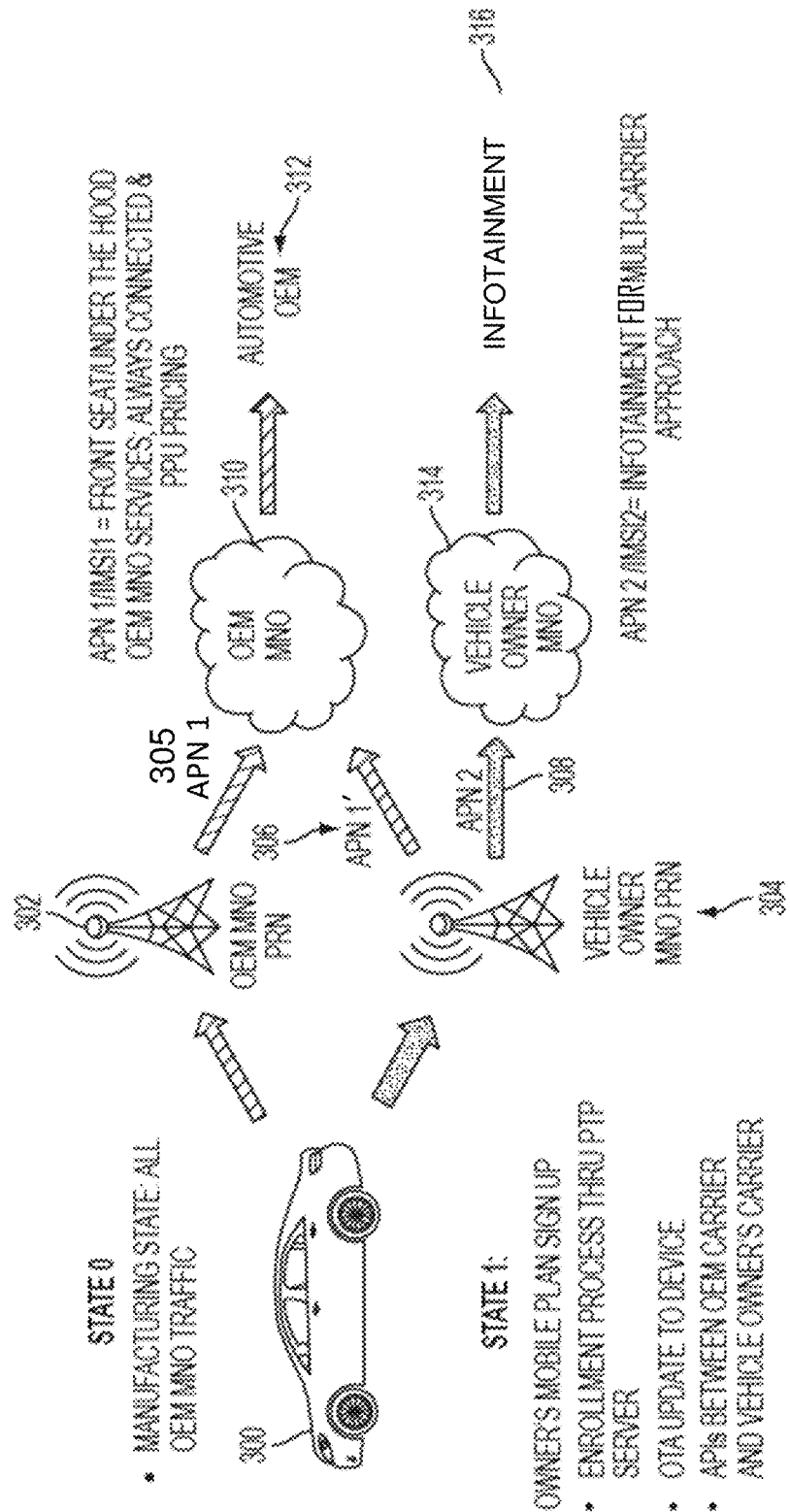

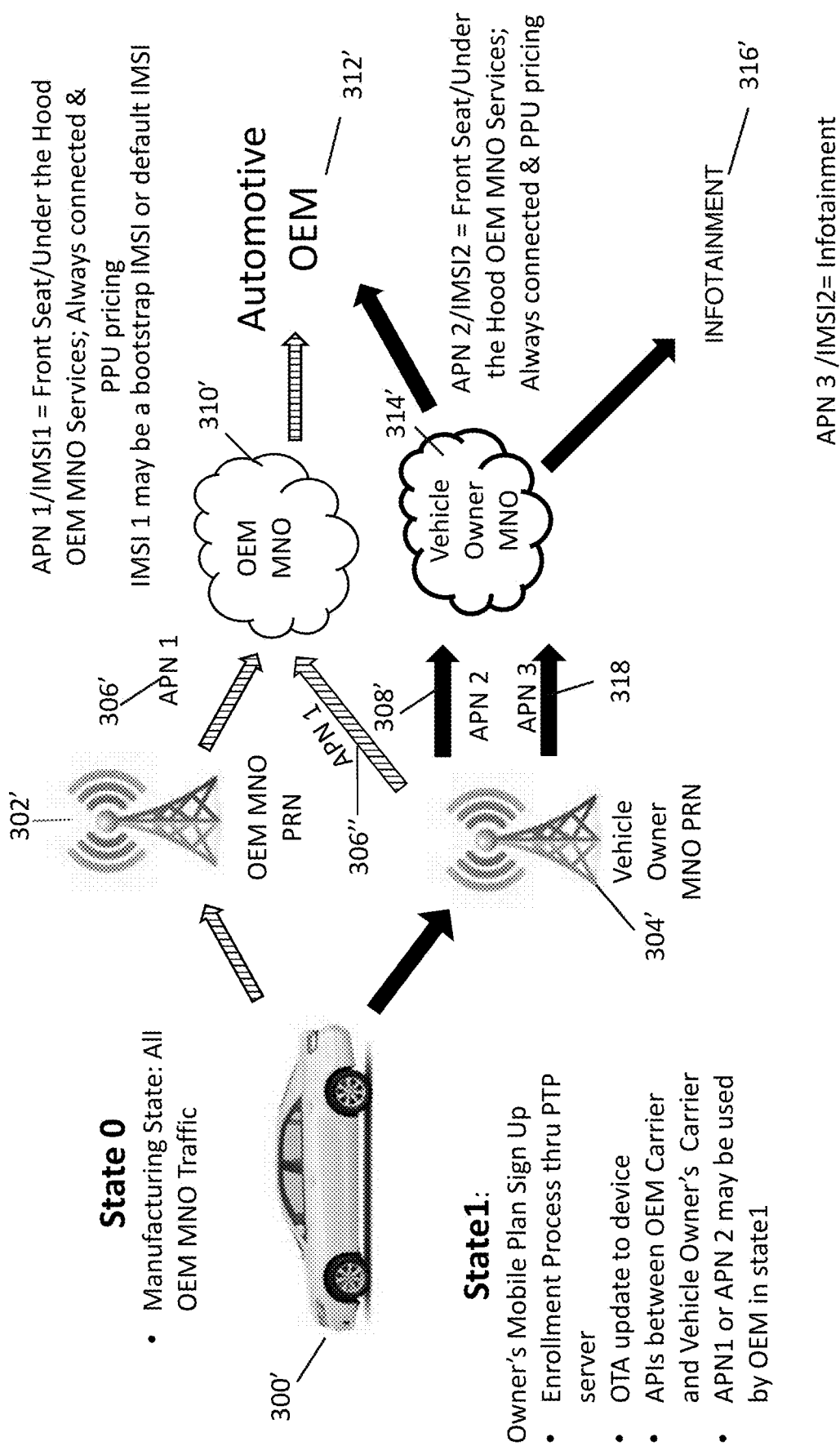

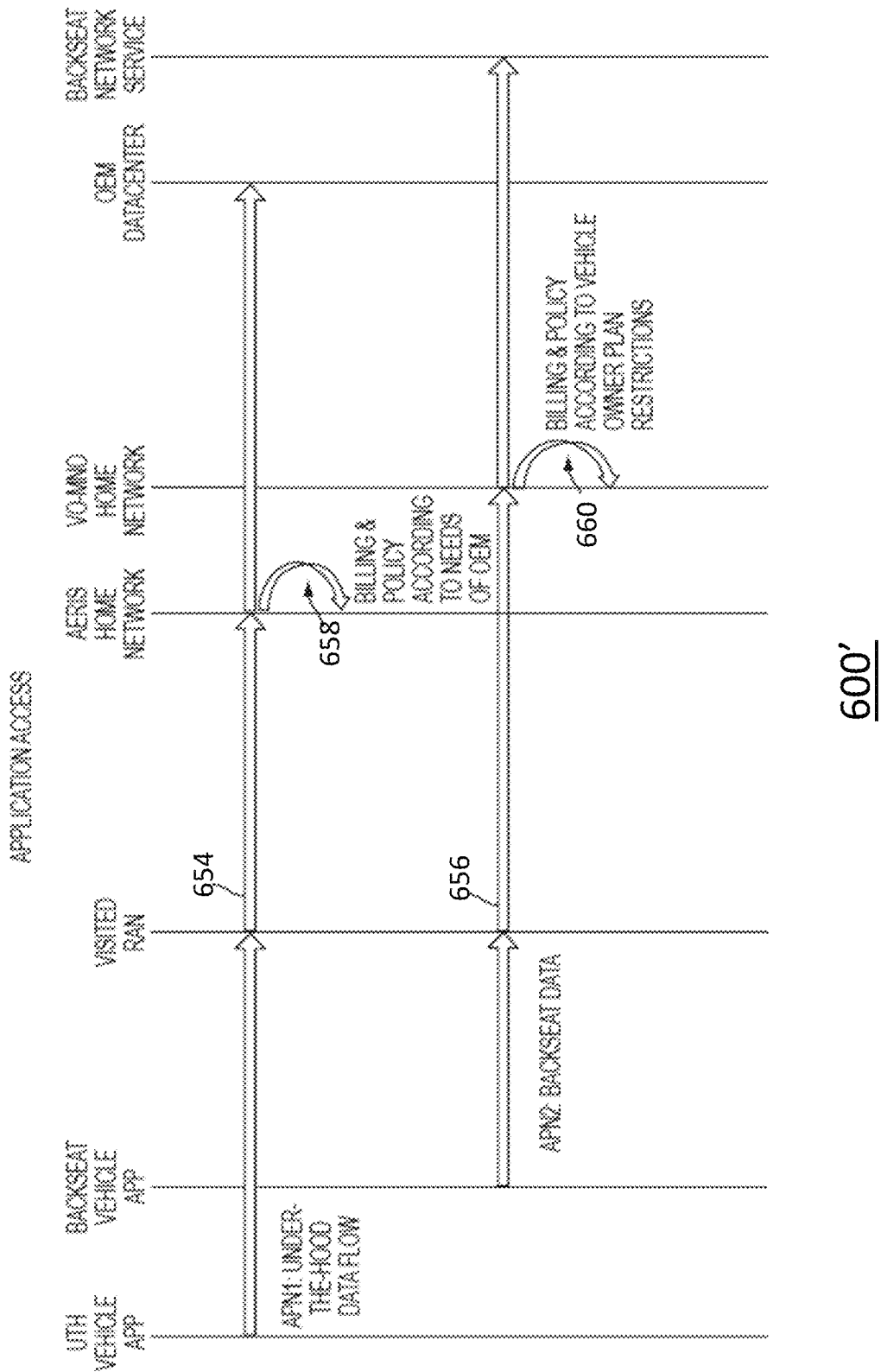

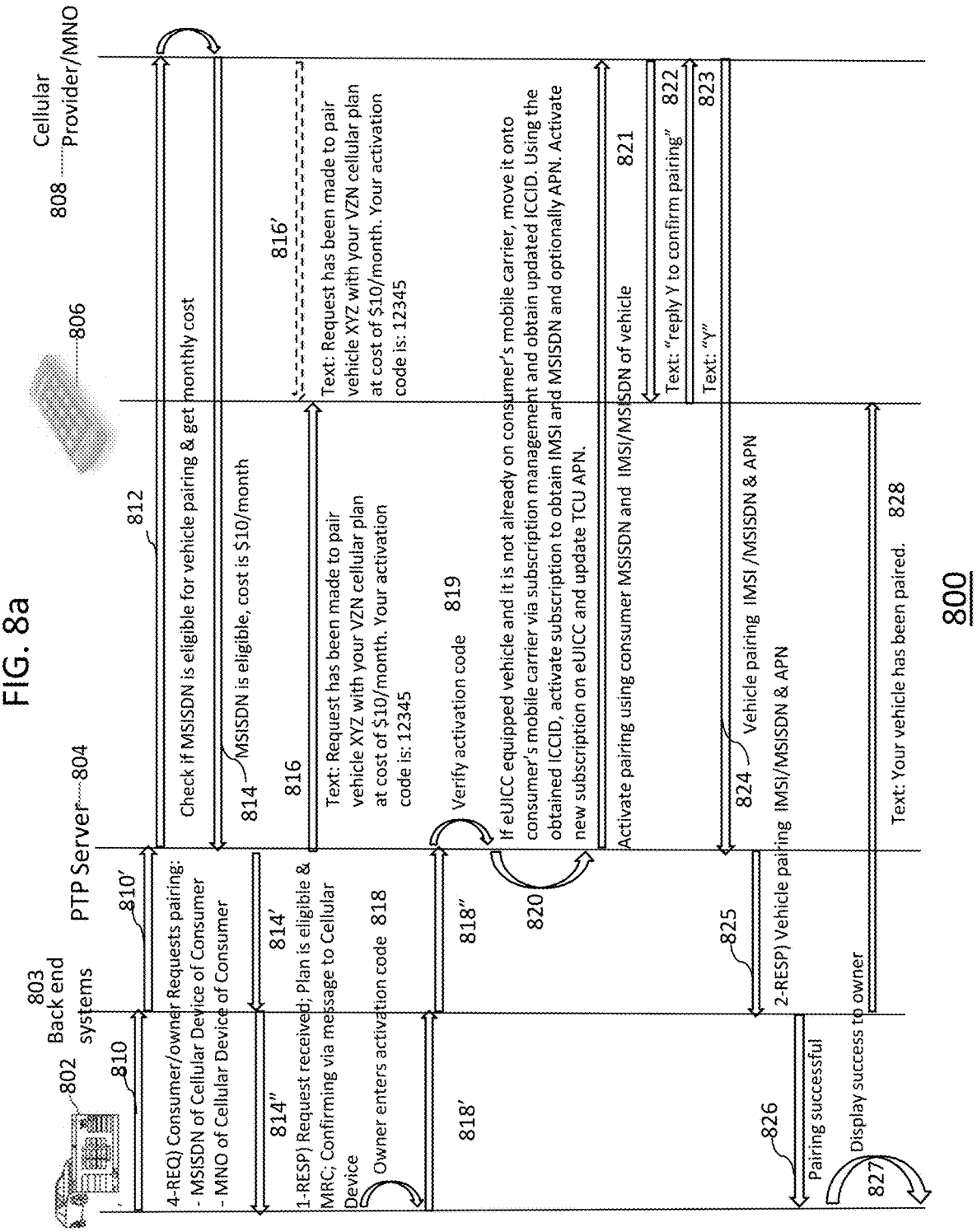

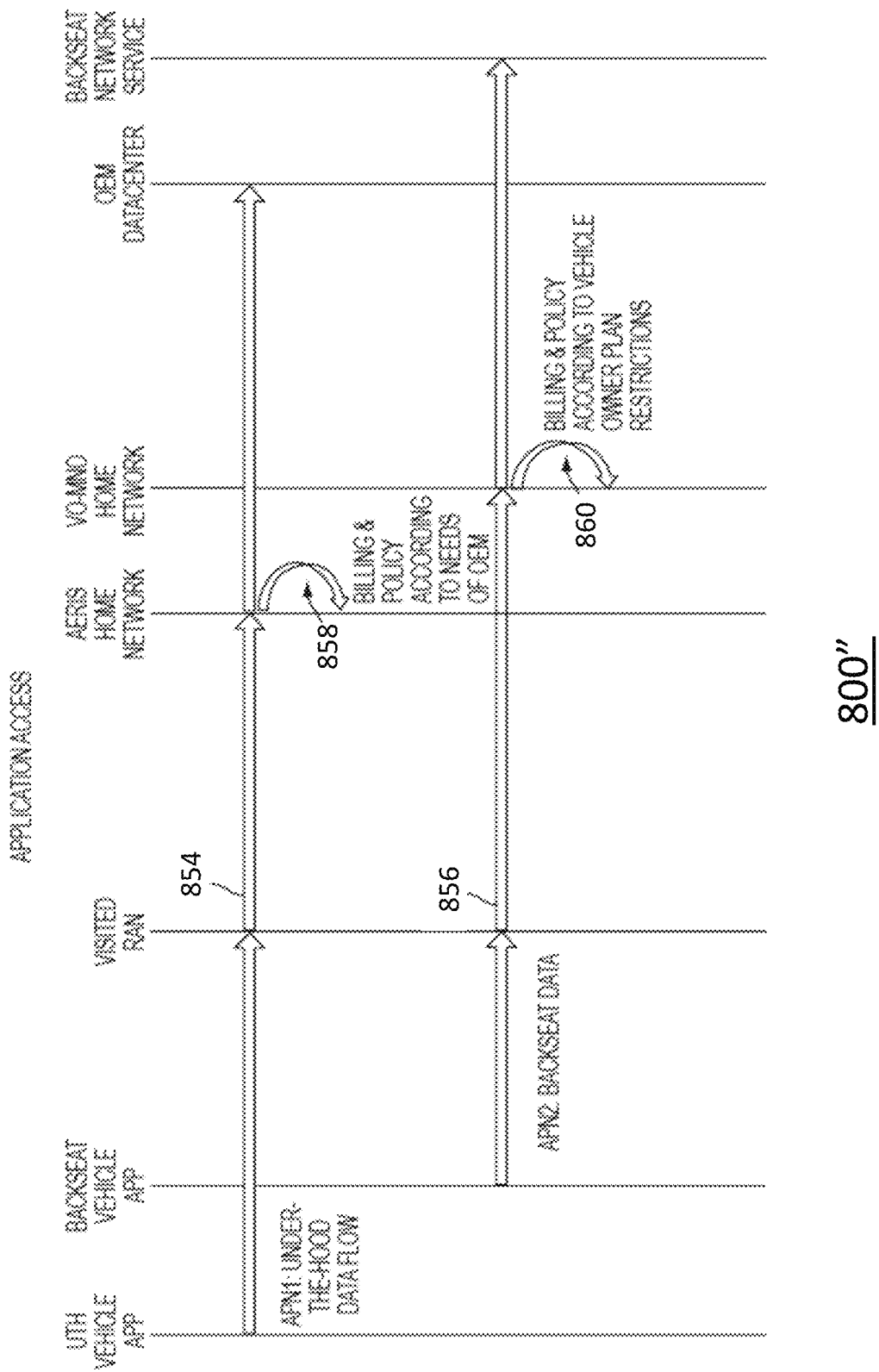

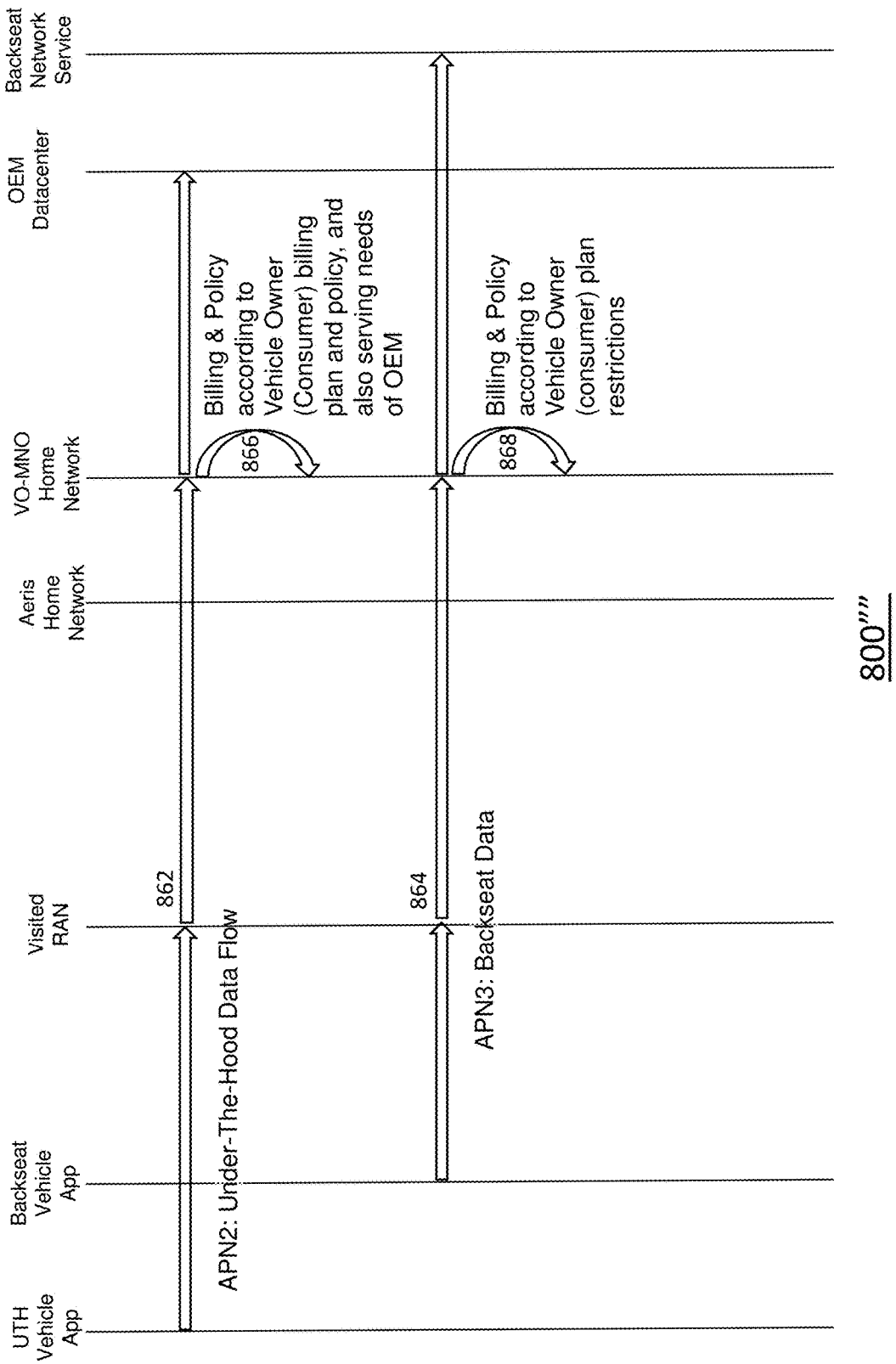

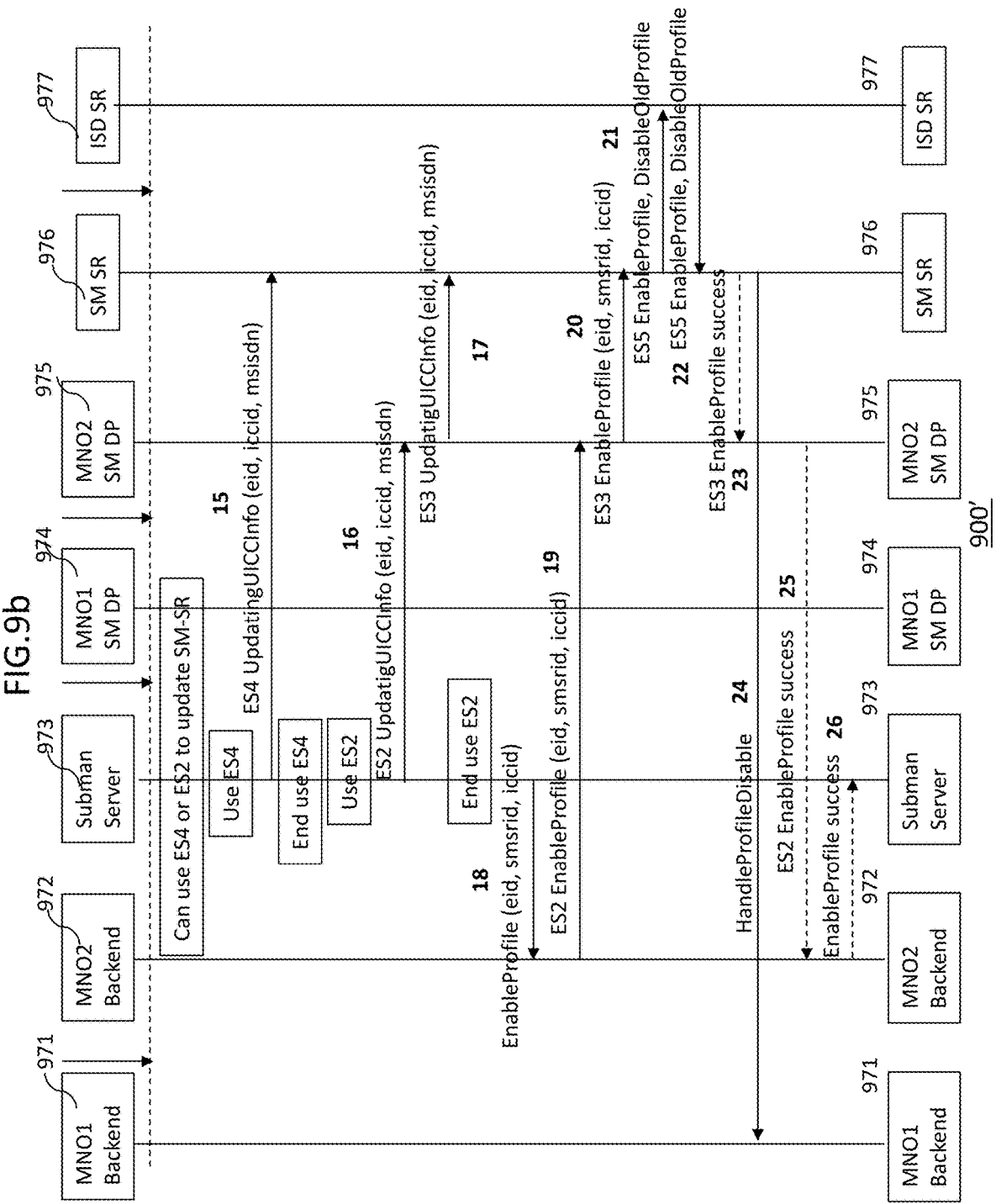

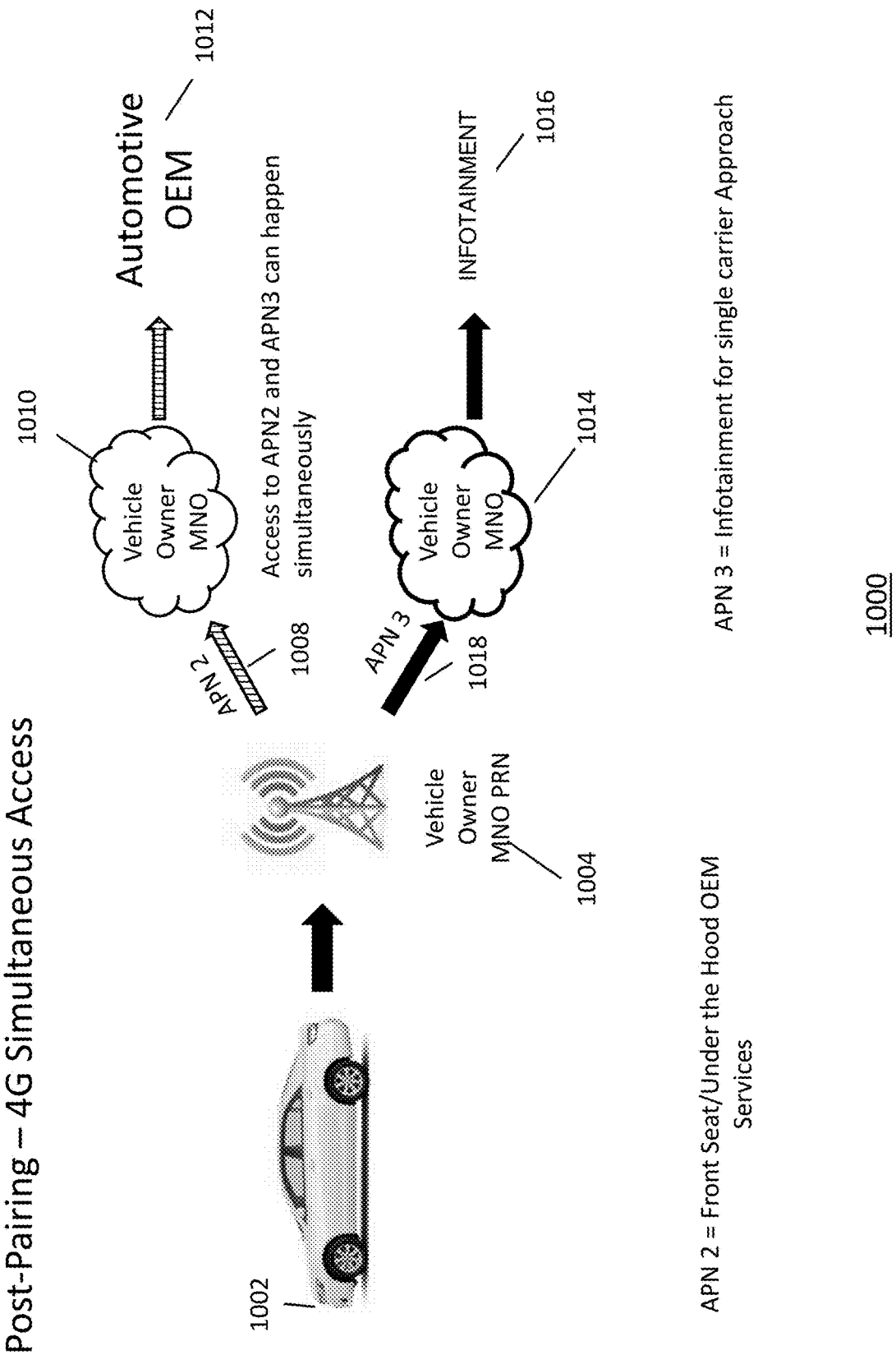

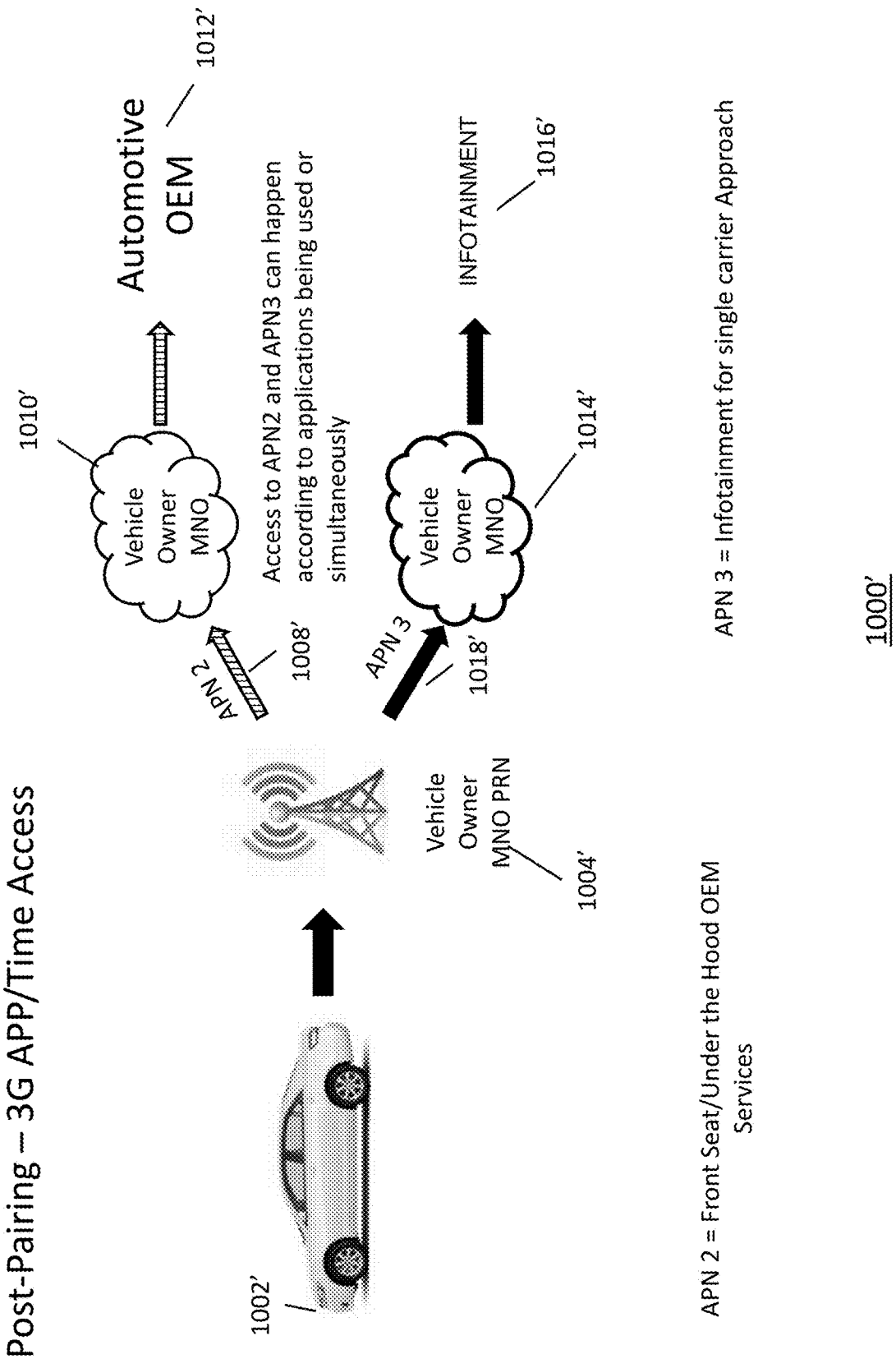

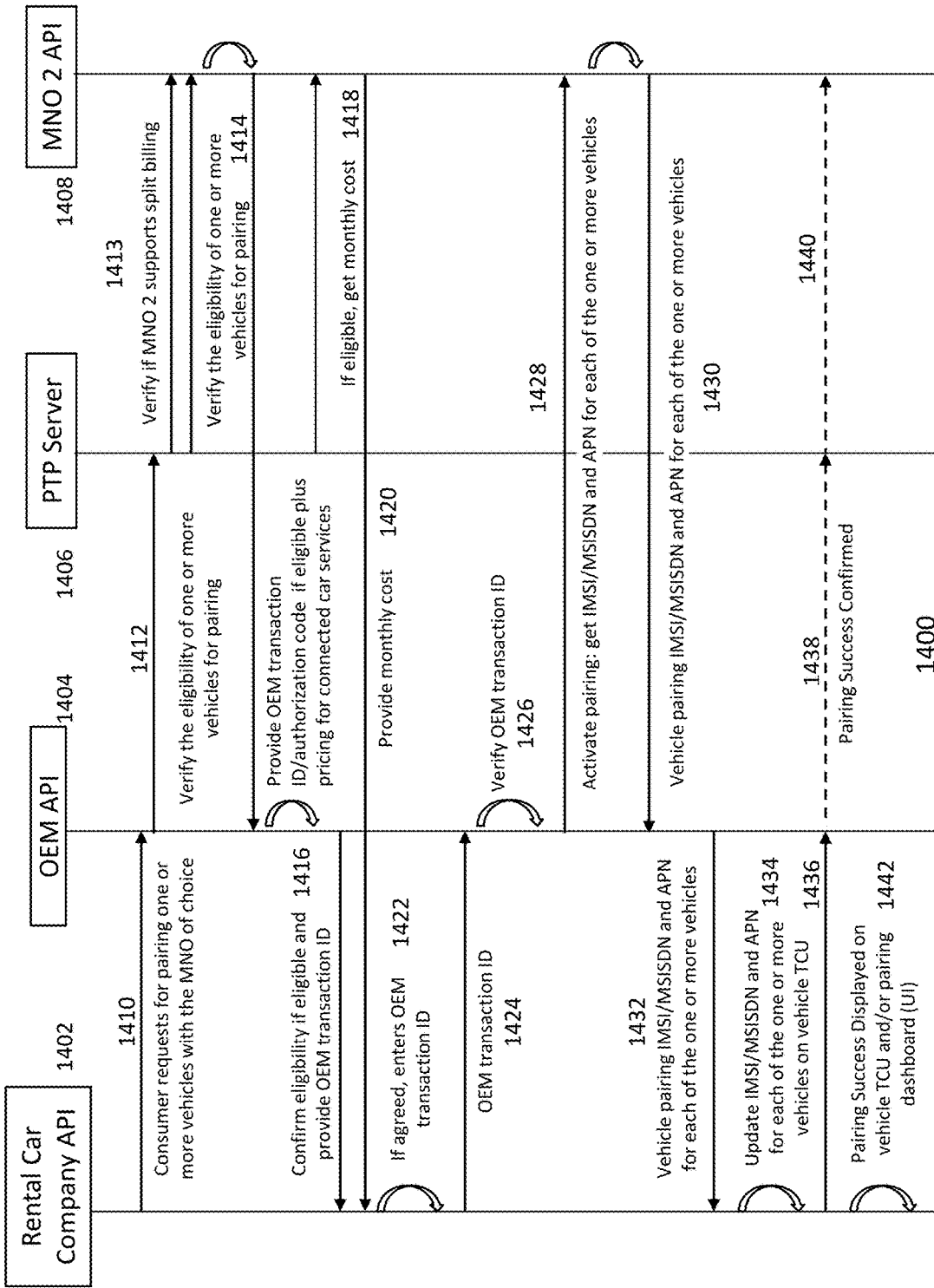

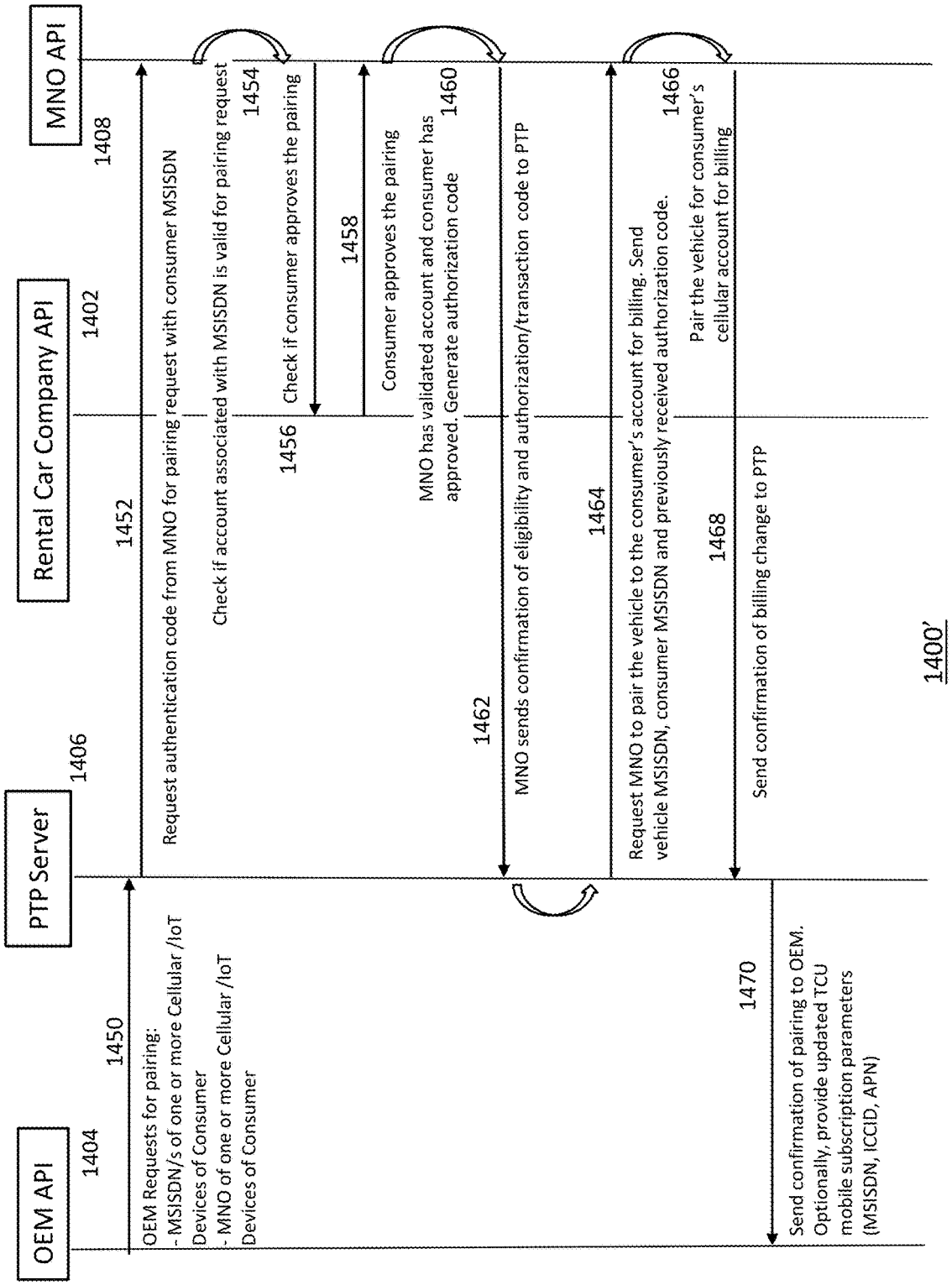
FIG. 14b  OEM using customer's plan (piggybacking)

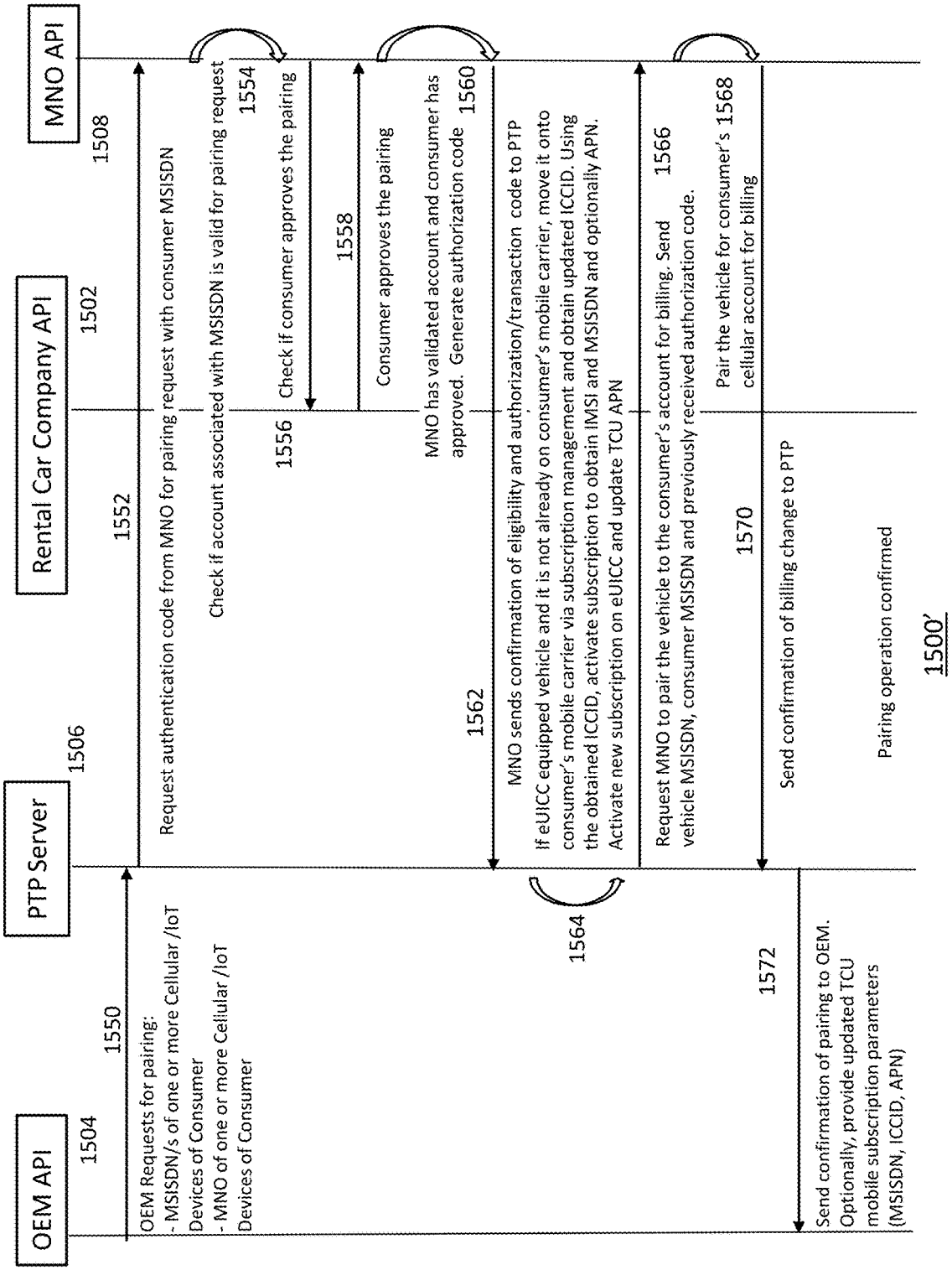

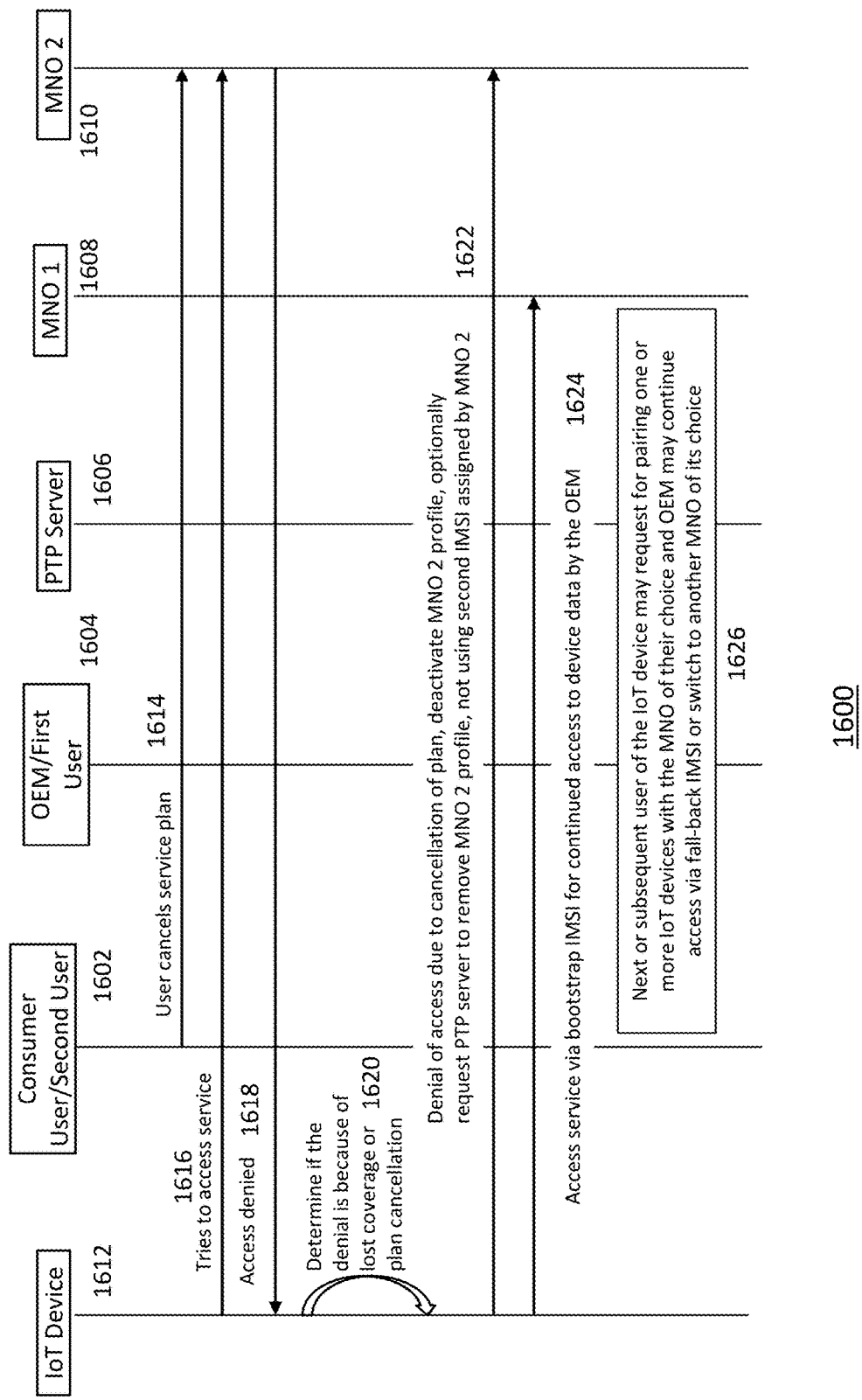

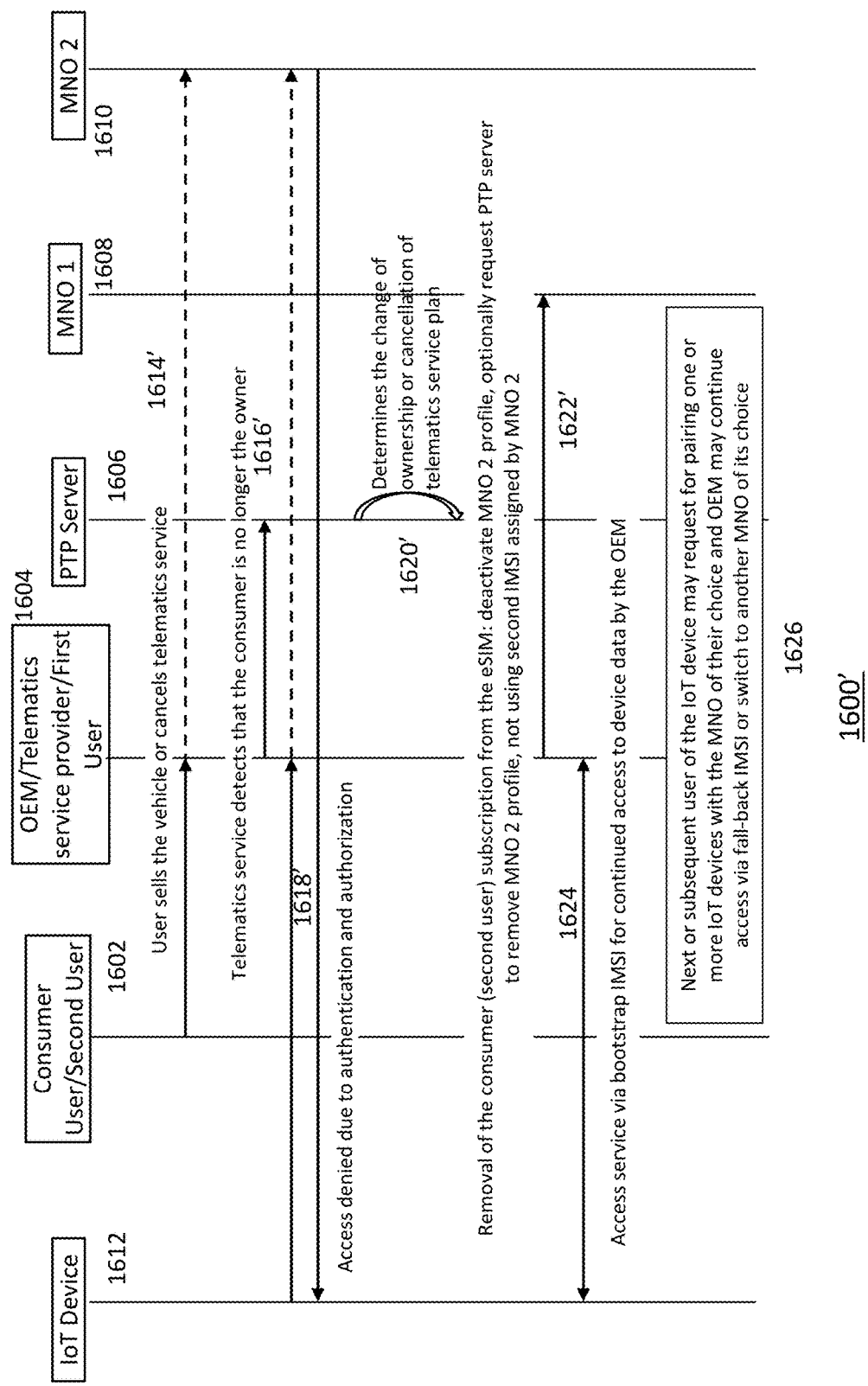

PAIR-THE-PLAN SYSTEM FOR DEVICES AND METHOD OF USE

CROSS-REFERENCE TO RELATED APPLICATIONS

This application is a Continuation-in-part of the U.S. application Ser. No. 17/465,982 (3718-5), which is a Continuation of U.S. application Ser. No. 16/819,398 (3718-3) filed on Mar. 16, 2020, which is a Continuation-in-part of the U.S. application Ser. No. 15/599,835 filed on May 19, 2017, which is a Continuation of the U.S. application Ser. No. 14/274,505, filed on May 9, 2014; which claims priority to U.S. provisional application Ser. No. 61/893,055, filed on Oct. 18, 2013, and a Continuation-in-part of the U.S. application Ser. No. 17/488,885 (3718-6), which is a Divisional of U.S. application Ser. No. 15/599,835 (3718-2) filed on May 19, 2017, which is a which is a Continuation of the U.S. application Ser. No. 14/274,505, filed on May 9, 2014; which claims priority to U.S. provisional application Ser. No. 61/893,055, filed on Oct. 18, 2013, the entire contents of all of which are hereby incorporated by reference.

FIELD OF THE INVENTION

The present invention relates generally to wireless services and more particularly to devices enabled for connectivity to cellular or other wireless service and having more than one primary purpose and user.

BACKGROUND

There are many types of devices that are enabled for connectivity to cellular or other wireless services and that can fulfill multiple purposes. One example is a vehicle with cellular connectivity; the vehicle Original Equipment Manufacturer (OEM) may enable this connectivity in the vehicle principally for the purpose of collecting data from the vehicle related to vehicle performance. At the same time, the connectivity could have other purposes, such as delivering information/entertainment (infotainment) content according to the preferences of the consumer using the vehicle (such as an owner, lessee or renter, referred to here for convenience as the "vehicle owner"), or allowing an insurance company to collect information about driving habits in order to offer discounts for those who drive safely. In the example for infotainment, vehicle owners would probably not be willing to fund the cellular connectivity for the OEM to collect data from the vehicle related to vehicle performance. Similarly, OEMs would probably not fund the cellular connectivity for vehicle owner's access to infotainment or other data-intensive applications.

Another example of such a device is a tablet (e.g. Kindle Fire™) which may be used to purchase and download content from a primary provider (e.g. Amazon). The content provider for the tablet (referred to for convenience as "the tablet content provider") benefits from such purchases and therefore is willing to fund the connectivity as part of that purchase. However, the tablet can also be used by the person using the tablet (referred to here for convenience as the "tablet owner") to access other content which is not provided by the tablet content provider, and the tablet content provider may prefer not to fund the cellular connectivity for this other content accessed by the tablet owner. As connectivity to cellular and other wireless services is not free, it is desirable to separate the cost and control of the connectivity depending on the user, directing traffic to the appropriate user's service provider and subscription and billing plan.

Accordingly, what are needed are systems and methods to address the above identified issues. The present invention addresses such a need.

SUMMARY

A computer-implemented method and system are disclosed for connecting one or more devices to a subscription and cellular or other wireless billing plan of a user. The method includes enrolling the one or more devices enabled for connectivity through cellular or other wireless service in a cellular or other wireless subscription and associated billing plan, wherein the enrollment includes providing an identifier for the one or more devices to a cellular or other wireless service provider chosen by a second user, effectively adding the the one or more devices to the cellular or other wireless subscription and billing plan selected by the second user; and allowing the second user to use capabilities of the one or more devices as governed by the cellular or other wireless subscription and an associated billing plan chosen by the second user; while the one or more devices are also configured to allow a first user to use capabilities of the one or more devices as governed by the cellular or other wireless subscription and an associated billing plan of the first user's choice.

In an embodiment, the computer-implemented method, further includes using a bootstrap IMSI or a bootstrap profile configured by a first user as an alternate path to access the cellular or other wireless service when the access to the cellular or other wireless service previously chosen by a second user is denied by the cellular or other wireless service provider.

The computer-implemented system includes one or more devices and a cellular or other wireless service provider enrollment server enabled for enrollment of one or more devices, the server including a processor and a memory in communication with the processor, wherein the server receives an identifier for the one or more devices to a cellular or other wireless service provider, effectively adding the one or more devices to a subscription and billing plan chosen by a second user, wherein the second user is allowed to use capabilities of the one or more devices as governed by the subscription and billing plan; and wherein the one or more devices are also configured to allow a first user to use capabilities of the one or more devices as governed by the subscription and billing plan of the first user's choice.

In an embodiment, the one or more devices are configured by a first user to access the cellular or other wireless service using a bootstrap IMSI or a bootstrap profile as an alternate path when the access to the cellular or other wireless service previously chosen by a second user is denied by the cellular or other wireless service provider.

In an embodiment, a non-transitory computer-readable medium is disclosed. The non-transitory computer-readable medium has executable instructions stored therein that, when executed, cause one or more processors corresponding to a system having one or more devices and a cellular or other wireless service provider enrollment server enabled for enrollment of one or more devices. The server includes a processor, a memory in communication with the processor and a user interface, to perform operations including enrolling the one or more devices in a subscription and billing plan providing cellular or other wireless service, wherein the enrollment includes providing an identifier for the one or more devices to a cellular or other wireless service provider chosen by a second user, effectively adding the one or more devices to the cellular or other wireless subscription and associated billing plan chosen by the second user; and allowing the second user to use capabilities of the one or more devices as governed by the cellular or other wireless subscription and an associated billing plan chosen by the second user; while the one or more devices are also configured to allow a first user to use capabilities of the one or more devices as governed by the cellular or other wireless subscription and an associated billing plan of the first user's choice.

In an embodiment, the non-transitory computer-readable medium further includes instructions for using a bootstrap IMSI or a bootstrap profile configured by a first user as an alternate to access the cellular or other wireless service when the access to the cellular or other wireless service previously chosen by a second user is denied by the cellular or other wireless service provider.

In an embodiment, the first user is an enterprise user and the second user may be an individual consumer or an enterprise user different from the first user.

BRIEF DESCRIPTION OF THE DRAWINGS

FIGS. 1a, 1b and 1c illustrate a tablet or a vehicle environment with multiple users using single, double and multiple subscription plans in accordance with one or more embodiments.

FIGS. 3a and 3b are diagrams illustrating exemplary systems in which a device (in this case, a vehicle) would operate in accordance with one or more embodiments.

FIG. 6b is a flow diagram illustrating an example of different ways in which data may flow according to the policies of the user plans with which the device is paired, in accordance with one or more embodiments of the present invention.

FIG. 8a is a process flow diagram illustrating one way in which the multiple-purpose device (in this case, in a vehicle) can be paired to cellular device subscription of the consumer using the solution embedded in the device, in accordance with one or more embodiments of the present invention.

FIG. 8c illustrates the transmittal of information to and from the paired vehicle's devices with two access point names (APN) through two corresponding network traffic paths, in accordance with one or more embodiments of the present invention.

FIG. 8d is a flow diagram illustrating an example of different ways in which data may flow according to the policies of the user plans with which the device is paired, in accordance with one or more embodiments of the present invention.

FIGS. 9a and 9b illustrate an exemplary process for over the air subscription management, in accordance with one or more embodiments of the present invention.

FIG. 10a illustrates a way in which a device being used for enterprise and consumer purposes simultaneously may access same provider networks, in this case through use of different network traffic paths, referenced by different access point names (APN2 and APN3), via a fourth generation (4G) cellular systems network, in accordance with one or more embodiments of the present invention.

FIG. 10b illustrates alternate access through network traffic paths, Access Point Name 2 (APN2) and Access Point Name 3 (APN3) via a third generation (3G) cellular systems network, in accordance with one or more embodiments of the present invention.

FIG. 14a is a flow diagram illustrating a process 1400 of pairing the network usage for OEM related applications running on the vehicle to the billing plan of the consumer's cellular subscription, in accordance with one or more embodiments of the invention.

FIG. 14b is a flow diagram illustrating the process of pairing the network usage for OEM related applications running on the vehicle to the billing plan of the consumer's cellular subscription, in accordance with one or more embodiments of the invention.

FIG. 15b is a flow diagram illustrating the process of pairing the network usage for OEM related applications running on the vehicle to the billing plan of the consumer's cellular subscription, in accordance with one or more embodiments of the invention.

FIGS. 16A and 16B are flow diagrams illustrating the process of using Fall-Back IMSI, in accordance with one or more embodiments of the invention.

DETAILED DESCRIPTION

Figure 1A:
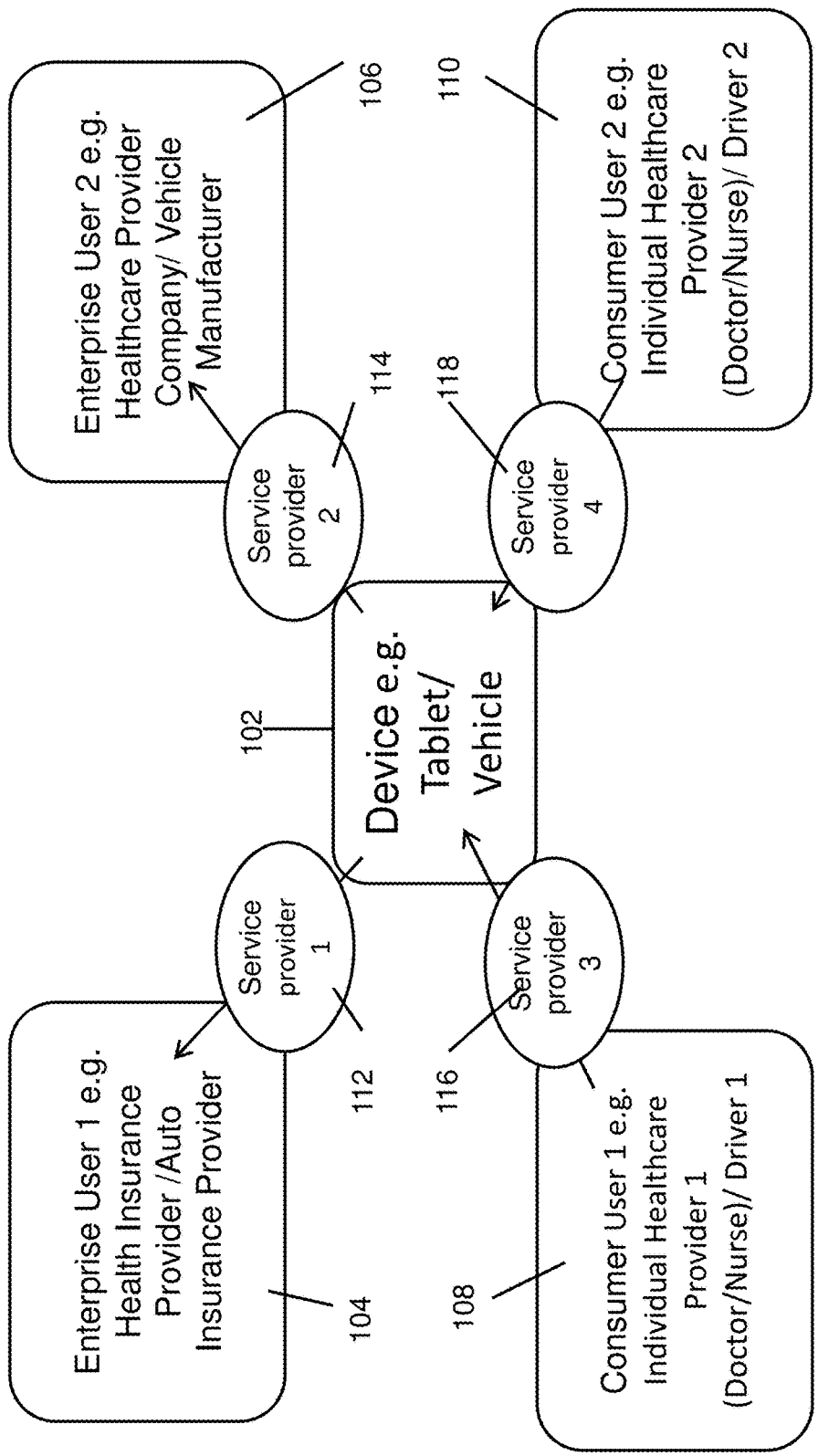

The present invention relates generally to wireless services and more particularly to devices enabled for connectivity to cellular or other wireless service and having more than one primary purpose and user. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A multi-purpose device can be defined as a device which can be used for more than one purpose by one or more users where the purposes and the users benefiting from the use may or may not be related to each other. In an embodiment, a multi-purpose device communicates with a cellular or other wireless service provider for one of its purposes to benefit one of its users and is capable of receiving and transmitting information over the provider's network. In addition, the device can be used for another purpose benefiting the same or a different user also involving communication with the same or a different provider of cellular or other wireless services. The device could be an embedded mobile device such as a telematics unit in a vehicle, a tablet, a portable computer or any portable device that has multiple purposes requiring the use of a cellular or other wireless network, either generally or in a closed environment (such as a hospital, office building or hotel).

In an embodiment, a multi-purpose device has an enterprise user (an enterprise stakeholder) and a consumer user (a consumer stakeholder). The multi-purpose device utilizes a particular cellular or other wireless provider for enterprise applications and purposes and such usage is controlled and billed by the rules of the billing plan that the enterprise user has with the provider chosen by the enterprise user. Notwithstanding this association between the device and the provider and billing subscription of the enterprise user, the device can also be paired with a subscription and billing plan available to the consumer through a provider chosen by the consumer when used for applications and purposes selected by the consumer. For these consumer-oriented uses, the multi-purpose device could be enrolled in the same billing plan (or in a new billing plan), and billed in the same manner, as any other cellular or wireless device used by that consumer and have access to one or more services (such as voice, data or SMS) available from the provider chosen by the consumer and supported by the consumer's subscription and the technical capabilities of the device. These services can be used to access such consumer-oriented uses as voice calls, messaging and address books and other data services as well as infotainment (content or programming that combines information-based uses with entertainment), whether available generally to all wireless-enabled devices or using specialized hardware/software products and systems which are built into, or can be added to, devices, for example vehicle systems designed to enhance the user experience. The cellular or other wireless provider selected by the enterprise user and the consumer user may be the same or different.

Notwithstanding this association between the device and the provider and billing subscription of the consumer user, the device can also be paired with a subscription and billing plan available to the enterprise user through a provider chosen by the enterprise user when used for applications and purposes selected by the enterprise user. For these enterprise-oriented uses, the multi-purpose device could be enrolled in the same billing plan of the consumer user (or in a new billing plan), and billed in a manner chosen by the consumer user and have access to one or more services (such as voice, data or SMS) available from the provider chosen by the consumer and supported by the consumer user's subscription and the technical capabilities of the device. These services can be used to access such enterprise-oriented uses, whether available generally to all wireless-enabled devices or using specialized hardware/software products and systems which are built into, or can be added to, devices, for example vehicles designed to enhance the user experience.

Thus, in an embodiment, the enterprise user, irrespective of its initial cellular or other wireless subscription and associated billing plan and/or a cellular or other wireless provider may choose to use consumer user's cellular or other wireless subscription and associated billing plan for its purpose of interest, essentially by piggybacking on or making further use of the consumer user's chosen cellular or other wireless provider for providing the cellular or other wireless subscription and associated billing plan. This usage may be achieved by providing an identifier of the device that consumer owns/uses, for example, a smartphone, for which the consumer has a cellular or other wireless service provider subscription with associated billing plan, to the enterprise user, wherein the enterprise user pairs its device, for example, a vehicle, with the consumer user's cellular or other wireless subscription and associated billing plan.

In another example, a multi-purpose device could be provided by a hospital, office building, manufacturing plant, hotel, or other provider for a particular business need such as health monitoring, but could also be used to allow the current user to access other content. In each case described, a single device has more than one purpose and more than one user or stakeholder. Stakeholders can be enterprises or consumers.

The cellular or other wireless subscription described herein refers to a billing account of a user and pricing associated with it, which may be based on a contract between a cellular or other wireless service user and/or a subscriber, whether an enterprise user or a consumer user and the service provider also known as a cellular or other wireless service billing entity. The billing plan associated with the cellular or other wireless subscription refers to a rate plan associated with the multi-purpose device, for example, a smartphone or a vehicle, provided by the cellular/wireless service provider.

The embodiments recited herein may use any one or more of: Pair the Plan system for devices and method of use described in co-pending and co-owned U.S. application Ser. No. 17/488,885, and patented U.S. application Ser. No. 15/599,835 and Ser. No. 14/274,505 (referred to herein as basic Pair The Plan) and Pair The Plan system for devices and method of use described in co-pending and co-owned U.S. application Ser. No. 17/465,982 and patented U.S.

application Ser. No. 16/819,398 (referred to herein as Pair The Plan using subscription management), all of which are incorporated herein by reference, to carry out the operations described in the description of those embodiments.

The embodiments using subscription management to switch the cellular or other wireless service provider for a device from one provider to another as described below.

In an embodiment, the multi-purpose device may be a mobile phone, for example, a smartphone, or a communication device enabled for connectivity via a wireless or cellular network. In an embodiment, the multi-purpose device has at least two users, e.g., a consumer user (a consumer stakeholder) and an enterprise user (an enterprise stakeholder).

In an example embodiment, the multi-purpose embedded device may be a telematics control unit (TCU) in a vehicle that includes a data transmission unit capable of communicating over a cellular or other wireless network which includes the Embedded Universal Integrated Circuit Card (eUICC or eSIM). For the purpose of this document, any reference to eSIMs is considered to be referring to eUICCs. The multi-purpose embedded device, e.g., the telematics control unit (TCU) in a vehicle may be manufactured with this embedded eUICC (eSIM). The eSIM includes a pre-allocated mobile network operator (MNO) as an initial profile or a "bootstrap" profile, which provides network connectivity by preconfigured MNO or a cellular or other wireless network service provider for a device to which eSIM is inserted. This initial profile is manufactured with the eUICC. The TCU may thus have an associated hardware identifier such as an International Mobile Equipment Identifier (IMEI) and eUICC ID (eID), and the profile may include information such as an Integrated Circuit Card Identifier (ICCID) and International Mobile Subscriber Identity (IMSI).

Once the vehicle is manufactured and released for the transport, the initial or bootstrap profile is activated on the mobile network of the pre-allocated MNO with a local rate plan. This initial profile is also assigned a Mobile Station International Subscriber Directory Number (MSISDN).

The data transmission unit, e.g., a radio module, in the multi-purpose device, e.g., OCU/TCU, may be capable of communicating over 3G or 3G/4G network, and is able to set up at least two data sessions simultaneously using different APNs. In most cases, there will be one session for usage of interest to one user, e.g., consumer traffic, e.g., infotainment, which is of interest to the consumer user and another session for usage of interest to another user, e.g., M2M traffic, which may be of interest to the enterprise user, e.g., original equipment manufacturer (OEM) or a third party application provider. These two data sessions generally may belong to the network operated by a single mobile network operator or a cellular or other wireless network service provider.

A person skilled in the art may readily recognize that more than two data sessions may be made available and hence may be used with technological advancements and other networks such as 5G or better may be utilized by the data transmission units for network communications.

As discussed above, after the vehicle is manufactured, at some point the transmission unit in the multi-purpose device, e.g., the radio module in the telematics control unit of the vehicle, is activated. The vehicle can now communicate with the OEM or other third party application providers' back end system, via the telematics control unit (OCU/TCU). The OEM or other third party application providers' back end system may include any one or more of: connectivity, user authentication, service subscription based on certain services, remote operations and collection of performance information from the vehicle (telematics).

Once the vehicle is registered with the OEM or other third party application providers back end system, the OEM or other third party application providers back end system downloads a new MNO profile called the "default" profile to the eSIM that will be used to carry traffic associated with the user (consumer or OEM) services. The default profile may be defined as a profile chosen by the OEM to conduct normal business for that particular vehicle. The backend then instructs the eSIM to activate the default profile via over the air subscription management, and automatically disables the initial or bootstrap profile. Until the default profile is activated, no traffic other than handshake traffic is allowed.

Figure 9A:
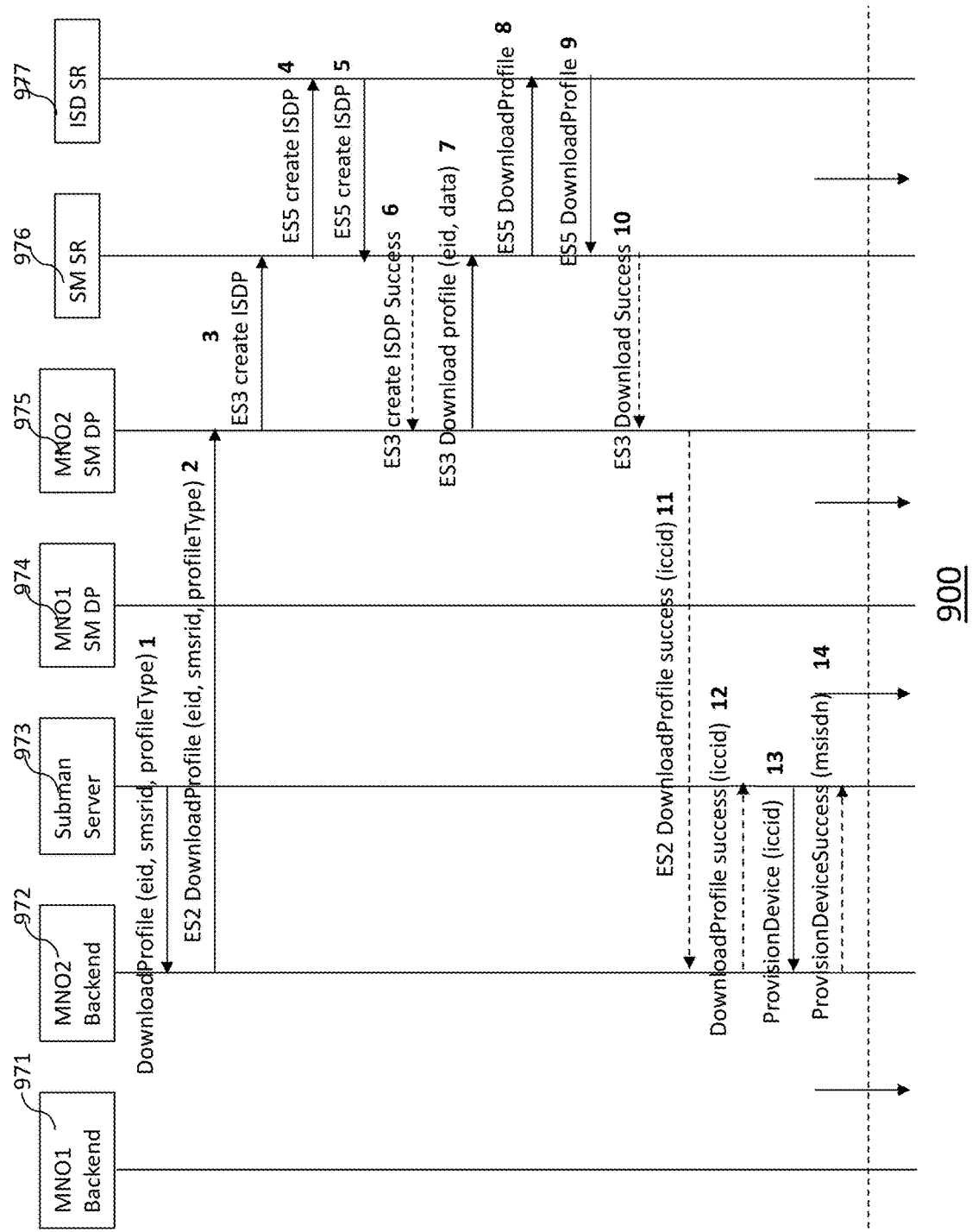

Note that the initial or bootstrap profile remains on the eSIM, but once the default profile is activated, the initial or bootstrap profile becomes dormant. At any time in the future the backend or OEM can instruct the eSIM to enable the initial or bootstrap profile via over the air subscription management, which causes the currently enabled profile which may be a default profile to be deleted or made dormant from the eSIM. An exemplary process describing over the air subscription management is illustrated in FIGS. 9a and 9b.

The choice of the default profile is up to the OEM (car manufacturer), and may or may not coincide with the consumer's personal mobile network carrier.

While on the default profile, the APN assigned for M2M traffic, e.g., APN1 or APN1', is used for data traffic of interest to the OEM and is billed by the MNO or the cellular or other wireless network provider to the OEM. Additionally or alternatively, the owner of the vehicle (consumer) may enable or use data services of interest to the consumer provided by the telematics unit in the vehicle, e.g., a WiFi hotspot. Data traffic created by the use of data services of interest to the consumer uses the APN assigned for data traffic of interest to the consumer, e.g., APN2. The data traffic on the APN assigned for data traffic of interest to the consumer is billed by the MNO or the cellular or other wireless network provider to the consumer. Alternatively, data traffic of interest to the consumer may be billed by the MNO or the cellular or other network provider to the OEM, who may choose to bill the consumer. These consumer data packages may be provided for free or may be sold on a prepaid basis. For example, $10 for 10 GB expiring after 30 days.

Additionally or alternatively, the user may choose a mobile network carrier for the vehicle of their choice for free or for a fee. In such a scenario, the OEM or other third party application providers' back end system orchestrates the download of a profile for the mobile network carrier the consumer has selected to the eSIM embedded within the vehicle, and activates it via over the air subscription management. Once activated, the new profile may perform the same function as the original default profile. The original default profile may be deleted from the eSIM when this occurs, but the initial profile or the bootstrap profile remains.

Yet another option offered to the consumer user may be to pair their vehicle's data usage charges to their personal cell phone account as an additional line. This is called Pair the Plan. To do this, the consumer must provide their connectivity information including mobile network carrier name, and some kind of identifier for their personal cell phone account which is usually their cell phone number (MSISDN) to the OEM or third party application provider. This information may be collected from any one or more of: a web portal, a mobile app, and the vehicle's built in display (Head Unit). The OEM or other third party application providers' back end system then may need to perform an operation to first switch and/or add cellular or other wireless network provider of the device to the consumer's MNO using the connectivity information provided by the consumer. The OEM or third party application provider may then instruct the consumer's MNO to bill data traffic on the consumer channel, which is the APN assigned to carry consumer traffic, to the indicated consumer billing account for the service provider chosen and paired by the consumer for that device. Alternatively, the OEM or third party application provider may also instruct the consumer's MNO to bill data traffic on the OEM channel, which is the APN assigned to carry OEM traffic, to the indicated consumer billing account for the service provider chosen and paired by the consumer for that device.

In an embodiment, the data traffic on the OEM/third party data channel, which is the APN assigned to carry OEM/third party data traffic, may be billed to the OEM/third party billing account for the service provider chosen by the OEM for that device.

At any given point in time there is at least one and potentially more than one profiles on the eSIM, e.g., the initial profile or the bootstrap profile and the currently active MNO profile. There may be use cases where the OEM may want to "fall back" to the initial or bootstrap profile. For example, in case of loss of connection through the new chosen and paired MNO, or suspension or termination of the consumer's billing account with the new chosen and paired MNO. If the OEM or other third party application providers back end system commands the eSIM to do this, it will disable the previously active MNO profile and enable the initial profile or the bootstrap profile again, or alternately download another profile (from the same or different MNO) to the eSIM and enable this downloaded profile.

The embodiments recited herein use one or more of the above mentioned processes to carry out the operations described in the description of those embodiments. For example, the embodiments recited herein may use any one or more of: Pair the Plan system for devices and method of use described in co-pending and co-owned U.S. application Ser. No. 17/488,885, and patented U.S. application Ser. No. 15/599,835 and 14/274,505 (referred to herein as basic Pair The Plan) and Pair The Plan system for devices and method of use described in co-pending and co-owned U.S. application Ser. No. 17/465,982 and patented U.S. application Ser. No. 16/819,398 (referred to herein as Pair The Plan using subscription management), all of which are incorporated herein by reference, to carry out the operations described in the description of those embodiments where applicable.

Figure 1C:
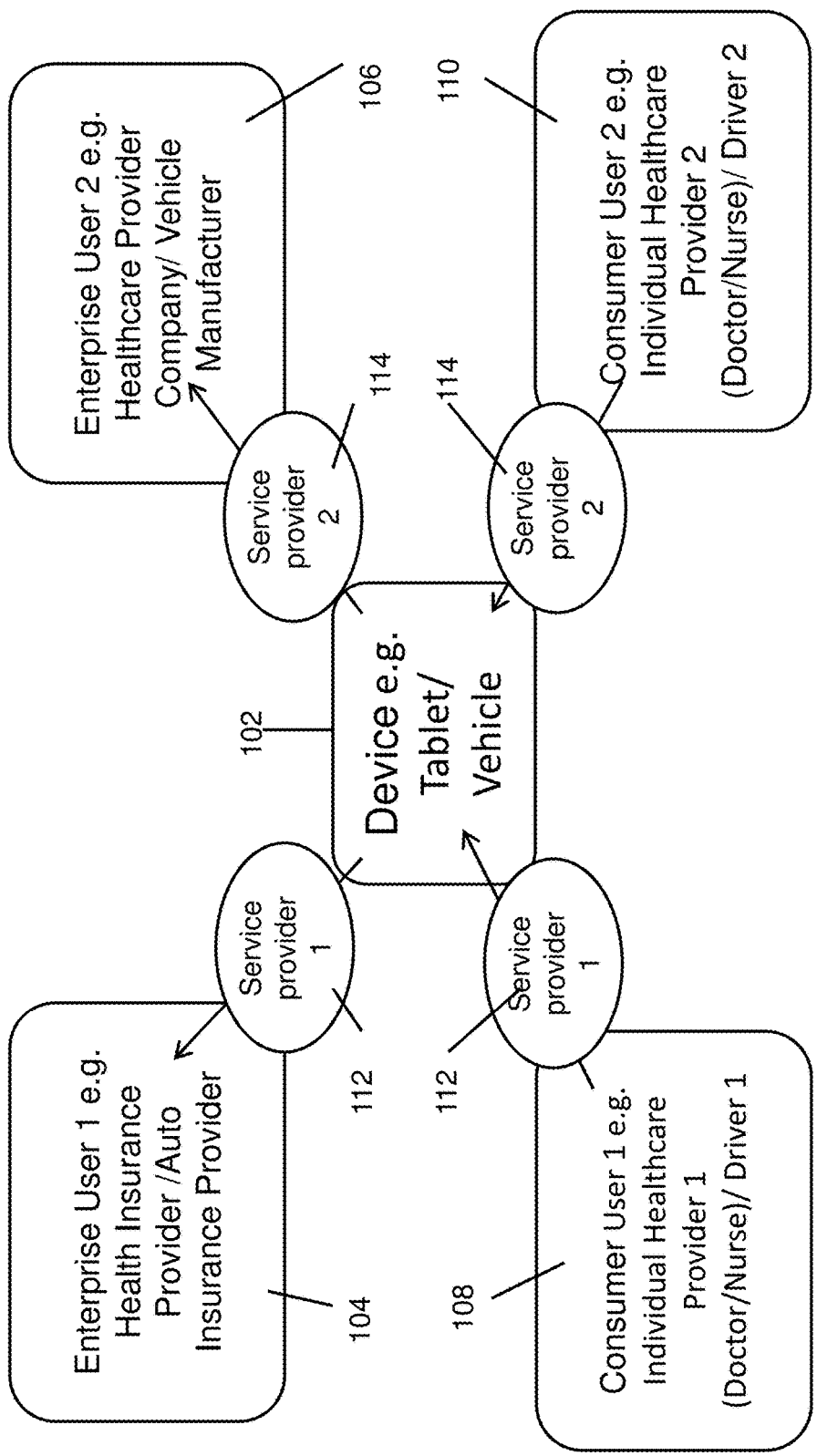

FIGS. 1a, 1b and 1c illustrate different embodiments where a device such as a vehicle's telematics unit or a tablet reader is enrolled in one or more billing plans chosen by one or more enterprises and, at the same time, is enrolled in one or more billing plans chosen by one or more consumers where the billing plans chosen by the consumers and enterprises can be same or different for basic Pair the Plan as well as Pair The Plan using subscription management.

FIG. 1a illustrates an embodiment where a device such as a vehicle's telematics unit or a tablet reader is enrolled in one or more billing plans chosen by one or more enterprises and, at the same time, is enrolled in one or more billing plans chosen by one or more consumers. Enterprise1 104 is an enterprise stakeholder such as an automobile insurance provider interested in tracking driving habits of one or more drivers. Enterprise1 104 enrolls device 102 in the service provider subscription plan 112 selected by enterprise1 104.

Similarly, enterprise2 106, another enterprise stakeholder, such as a vehicle OEM interested in tracking vehicle and vehicle systems performance, enrolls device 102 in the service provider subscription plan 114 selected by enterprise2 106. When consumer1 108, as a consumer stakeholder, uses device 102 for his/her own purpose such as infotainment, he/she would like to use his/her own subscription plan 116. Hence, consumer1 108 would enroll device 102 in the service provider subscription plan 116 selected by consumer1 108. Similarly, when consumer2 110, as another consumer stakeholder, uses device 102 for his/her own purpose such as infotainment, he/she would like to use his/her own subscription plan 118. Hence, consumer2 110 would enroll device 102 in the service provider subscription plan 118 selected by consumer2 110. This process is described in detail in U.S. Pat. No. 9,667,806.

As shown in FIG. 1b, additionally or alternatively, once the consumer1 108 enrolls device 102 in the service provider subscription plan 112 selected by consumer1 108, the enterprise1 104 and/or enterprise2 106 may enroll device 102 in the same service provider subscription plan 112 selected by consumer1 108. Similarly, once the consumer2 110 enrolls device 102 in the service provider subscription plan 112 selected by consumer1 108, the enterprise1 104 and/or enterprise2 106 may also enroll device 102 in the same service provider subscription plan 112 selected by consumer1 108. This embodiment where the consumer and enterprise users use the same service provider is illustrated by FIG. 1b.

As shown in FIG. 1c, additionally or alternatively, once the consumer1 108 enrolls device 102 in the service provider subscription plan 112 selected by consumer1 108, the enterprise1 104 and/or enterprise2 106 may enroll device 102 in the same service provider subscription plan 112 selected by consumer1 108. Similarly, once the consumer2 110 enrolls device 102 in the service provider subscription plan 114 selected by consumer2 118, the enterprise1 104 and/or enterprise2 106 may enroll device 102 in the same service provider subscription plan 114 selected by consumer2 118, when eSIM technology allows more than one profile to be active at the same time. This combination of the consumer and enterprise users using same or different service providers are illustrated by FIG. 1c.

Additionally or alternatively, if future eSIM/eUICC technology allows more than two profiles to be active at the same time, the embodiment as described in FIG. 1 may also be possible via over the air subscription management.

In the embodiments illustrated in FIGS. 1b and 1c, when the pairing occurs, the enterprise user, for example, OEM moves over to the consumer cellular or other wireless service provider, also known as mobile network operator (MNO). In that case, the eSIM may still have two MNO profiles on it, but only one is really active since all usage is being rated according to the consumer's cellular or other wireless subscription and associated billing plan. The other profile may be the default, or the "bootstrap" profile, of the OEM's original MNO, which may be different or, by coincidence, be the same. The bootstrap profile may be kept alive but dormant (and there may be billing from the MNO associated with that) so that if the consumer plan is terminated for whatever reason (e.g., non-payment), the activity can move over to the plan associated with the other profile and may be billed according to the other user's e.g., enterprise user's, cellular or other wireless subscription and associated billing plan. The "bootstrap" profile and the "default" profile as used in herein is described in detail above.

Although there are many environments in which use of a multi-purpose device would be advantageous, a significant use case is the automotive industry. Typically, in an automotive environment, a telematics unit within a vehicle (often "under the hood" and not visible to the person operating the vehicle) is used for communication. Automotive OEMs or manufacturers of vehicle audio systems often allow for the audio device in the vehicle to be connected, or paired, with the smart phone or other cellular-connected device (the "brought in phone", or BIP) of the consumer, such as vehicle owner or other user (a lessee of the vehicle or a passenger in the vehicle) as a way to economically provide infotainment services such as streaming audio in the vehicle, bypassing the telematics unit and ensuring that the cost of use remains with the consumer.

The BIP solution requires complex pairing of the smartphone with the vehicle devices and systems. For pairing to work at all, the BIP must be connected to the vehicle devices, so both BIP and vehicle devices must support compatible connectivity methods. For the consumer services to work correctly in a specific driving session, the BIP must be present and have sufficient battery, and the pairing must be refreshed, which does not always happen automatically. In addition, there is no standardization about where the system controls for the consumer services will be presented (on a screen on the vehicle device or on the screen of the BIP), which can lead to difficulties in operation and distracted driving issues. Furthermore, the BIP and the vehicle systems must support compatible infotainment application software. These capabilities must work across the range of consumer device manufacturers, operating systems, and applications. Finally, since vehicles typically have lifespans of ten years or more, the vehicle device must be able to pair with BIP devices that do not exist today or at the time of the design of the vehicle's systems, but will exist at a date sometime in the future. In practice, it is documented that consumers who upgrade smartphones and other connected devices frequently experience issues pairing their BIP devices with vehicle devices. Compatibility issues and difficulty of use drive consumer and safety complaints about most BIP systems.

Vehicle manufacturers (Vehicle OEMs) are increasingly including embedded cellular or other wireless connectivity in vehicles for the purposes of monitoring and managing the vehicle and its component systems. While these systems could be configured to allow use for consumer-oriented services, and consumers would want to use the embedded connectivity if it were available, and the OEM or the consumers may want to pay for the cellular or other wireless connectivity used for the other party's purposes (monitoring and managing the vehicle and its component systems for the OEM, infotainment or other "front seat" services for the consumer), if unlimited data plans were available through their own subscription and billing plans.

Alternatively, neither the OEM nor the consumers may want to pay for the cellular or other wireless connectivity used for the other party's purposes (monitoring and managing the vehicle and its component systems for the OEM and infotainment or other "front seat" services for the consumer).

What is needed is a method for bypassing the BIP solution and allowing the consumer to use their existing cellular or other wireless data plan with the automotive embedded device for consumer-oriented services and allowing enterprise to use their enterprise oriented services, for example, under the hood services with either their own cellular or other wireless data plan or making further use of the consumer's existing cellular or other wireless data plan. Such an invention will save total cost, improve service, safety and consumer satisfaction, reduce complexities arising out of technological change and simplify billing.

Allowing an embedded telematics device to be used for the purposes of the consumer and for the consumer to pay for that use according to consumer's own subscription plan is currently not possible because current technology requires that the embedded device be assigned to a single subscriber plan and wireless network, in this case the subscriber plan of the OEM and the OEM's cellular or other wireless home network. These limitations are eliminated by the present invention, which addresses the mutual desires of OEMs and consumers to provide a safe, convenient way to enable dual use while assigning costs to the appropriate party through their own subscription plans or through other party's subscription plan.

To describe the features of the present invention in more detail within the context of the automotive industry, refer to the accompanying figures in conjunction with the following discussions. These examples are used for purpose of illustration only, and should not be construed as limitations.

Figure 2:
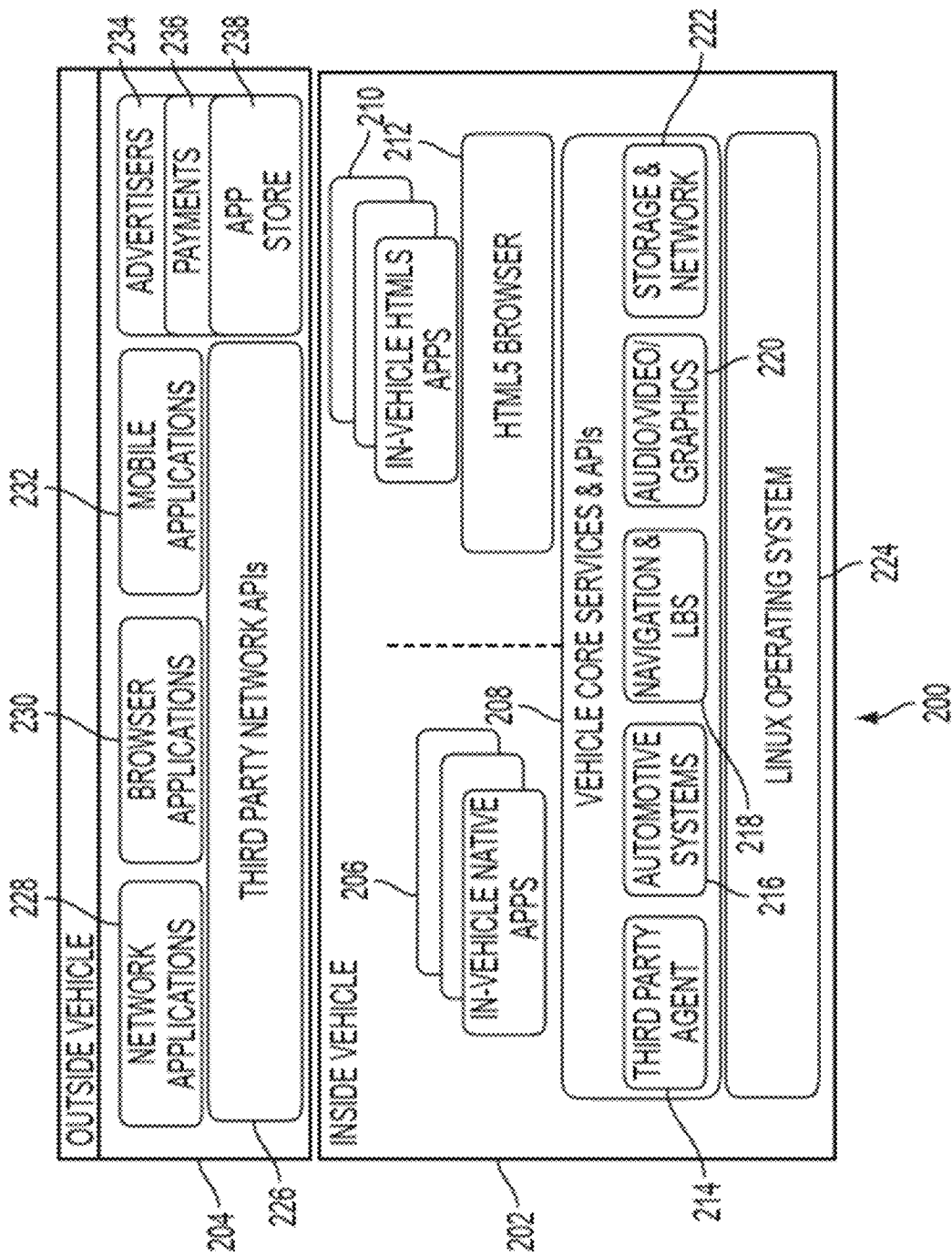
FIG. 2 illustrates a vehicle environment relating to a device with multiple purposes in accordance with an embodiment.

FIG. 2 is a diagram that illustrates applications and interfaces inside the vehicle 202 and outside the vehicle 204. Inside the vehicle comprise the applications that are running inside the vehicle. There are a variety of elements inside the vehicle that can be accessed through the applications running inside the vehicle. They include but are not limited to an operating system, for example a Linux-based operating system 224. In-vehicle native applications 206, in-vehicle Hyper Text Markup Language (HTML) applications 210 and its associated HTML browser 212, vehicle core service elements 208 all may also reside within the vehicle. The vehicle core elements could for example in an embodiment include a third party agent, 214, automotive systems 216, a navigation system 218, an audio graphic system 220 and storage and network elements 222.

Outside of the vehicle are network application programming interfaces (APIs) that reside outside the vehicle. FIG. 2 illustrates outside the vehicle applications, for example, third party network APIs 226 that interface with network applications 228, browser applications 230 and mobile applications 232. There are also advertisers 234, payment 236 and an application store 238.

These elements are utilized together to allow the vehicle OEM to choose a cellular or other wireless network provider to act as interface between the vehicle OEM and the vehicle. This cellular or other wireless network provider is referred to as "the OEM's carrier."

FIG. 3*a* is a diagram illustrating a system in which a device (in this case, a vehicle) would operate in accordance with an embodiment. The vehicle OEM 312 is always connected to the vehicle 300 via the OEM's carrier 302 which may be a "bootstrap" carrier or a "default" carrier, in a manufacturing state, state0 via 305. When the vehicle 300 is purchased, a consumer, in this case owner of the vehicle, can enroll his or her vehicle 300 into his/her existing cellular or other wireless plan as provided by his/her cellular or other wireless network provider 314 referred to as "the vehicle owner's carrier" 314.

After enrollment, as depicted by state 1, the vehicle's behavior is changed so that 1) the vehicle 300 will connect to the consumer's carrier depicted by vehicle owner's mobile network operator's preferred radio network (vehicle owner MNO PRN) 304 rather than the OEM's carrier 302; and 2) two network traffic paths are established, one for the OEM's purposes Access Point Name 1 (APN1'), the other for the vehicle owner's Access Point Name 2 (APN2). The first network traffic path is depicted by Access Point Name 1 (APN1') 306. This path is directed to the OEM via the vehicle owner's carrier's radio access network (vehicle owner MNO) 304 and the OEM's carrier's core network 310 to the vehicle manufacturer 312.

The interconnection between the vehicle owner's carrier 304 and the OEM's carrier 302 adheres to cellular or other wireless network providers' interconnection standards. As a result, the vehicle OEM 312 is always connected to the vehicle 300. The second network traffic path is depicted by Access Point Name 2 (APN2) 308 provided to the vehicle owner's carrier 314 to access other, typically infotainment, services 316. Applications in the vehicle 300 can be mapped to either APN1' 306 to allow billing directly to OEM's plan or to APN2 308 for billing to the vehicle owner's plan, depending on which stakeholder uses the application.

The embodiment described above involves use of two different subscription and associated billing plans by the consumer user and the enterprise user. However, the consumer user and the enterprise user may also use the same subscription and billing plan, according to another embodiment, as depicted by FIG. 3*b*.

The implementation depicted in FIG. 3*a* involves the management and updating of the multi-purpose device's network parameters and resources such as the International Mobile Subscriber Identifier (IMSI) or Mobile Directory Number (MDN), and the device Preferred Roaming List (PRL) or public land mobile network (PLMN). For example, the vehicle owner's carrier 304 may assign a new international mobile subscriber identifier (IMSI) to the vehicle. The new IMSI assigned by the vehicle owner's carrier will be used for all future authentications and dataflow, and old IMSI assigned by the OEM's carrier 302 remains as a back-up for vehicle OEM to access the vehicle related data in case of loss of connection through the new carrier or suspension or termination of the vehicle owner's account with the new carrier for basic Pair the Plan as well as Pair The Plan using subscription management.

Figure 4A:
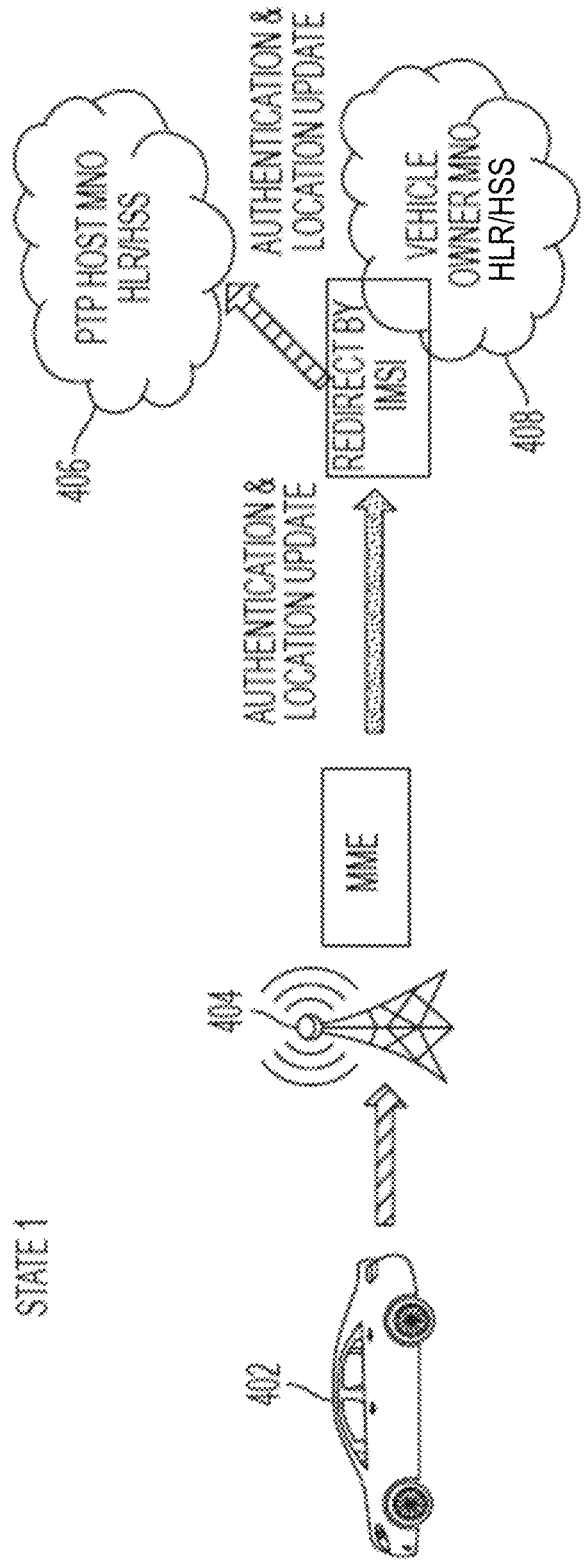
FIGS. 4a and 4b illustrate management of network registrations and authorizations through different channels of communication post-pairing, in accordance with one or more embodiments of the present invention.
Figure 4B:
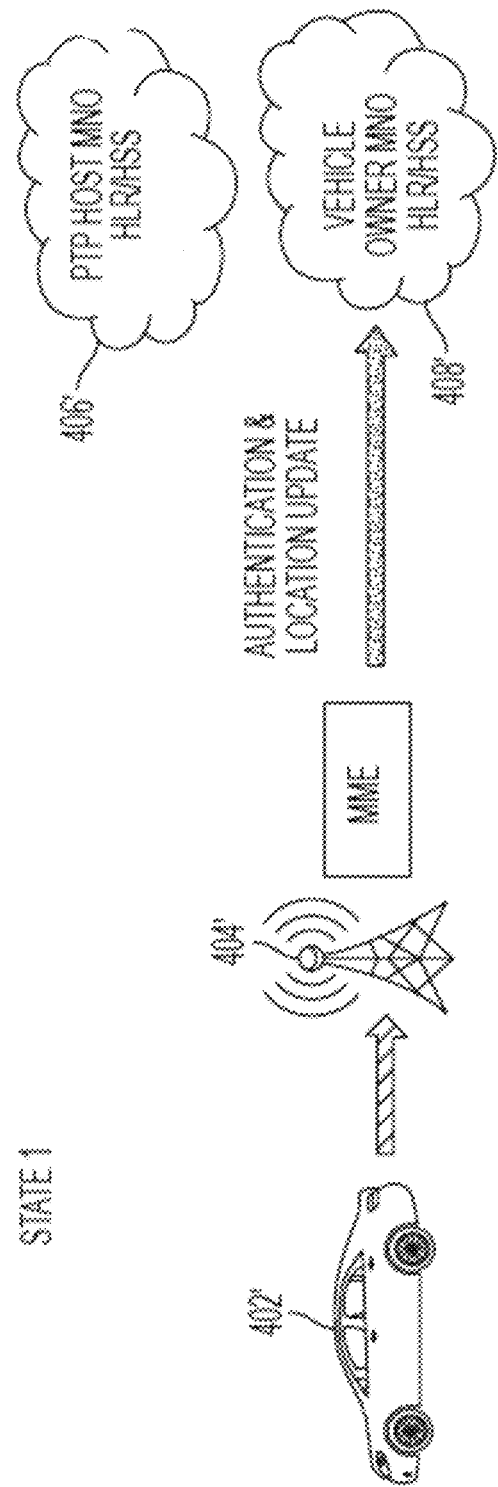

The HLR or HSS 310 of the OEM's carrier 302 may be utilized, as an embodiment, to manage the network registrations and authorizations post-pairing as discussed in description accompanying FIGS. 4*a* and 4*b*, 4*b* and 4*c*.

FIG. 3*b* is a diagram illustrating a system in which a device (in this case, a vehicle) would operate in accordance with another embodiment. The vehicle OEM 312 may be connected to the vehicle 300 via the OEM's carrier 302 in a manufacturing state, state 0. As illustrated in FIG. 3*b*, the vehicle in state 0 has one International Mobile Subscriber Identifier (IMSI), IMSI 1 assigned to it with one APN, APN1 306' to allow traffic pertaining to front seat/under the hood services and/or applications. When the vehicle 300' is purchased, a consumer, in this case owner of the vehicle, can enroll his or her vehicle 300' into his/her existing cellular or other wireless plan as provided by his/her cellular or other wireless network provider referred to as "the vehicle owner's carrier" 304'.

After enrollment, as depicted by state 1, the vehicle's behavior is changed so that 1) the vehicle 300' will connect to the consumer's carrier depicted by vehicle owner's mobile network operator's preferred radio network (vehicle owner MNO PRN) 304' rather than the OEM's carrier 302', and the consumer's carrier will now assign another IMSI, IMSI 2 to the vehicle; and 2) two network traffic paths are established, one for the OEM's purposes, the other for the vehicle owner's, both traffic paths now using IMSI 2. The first network traffic path is depicted by Access Point Name2 (APN2) 308'. This path is directed to the OEM via the vehicle owner's carrier's radio access network (vehicle owner MNO) 304' and the vehicle owner's service provider's (carrier's) core network 314' to the vehicle manufacturer 312'.

The second network traffic path in state 1, is depicted by Access Point Name 3 (APN3) 318 provided to the vehicle owner's carrier 314' to access other, typically infotainment, services 316'. Applications in the vehicle 300' can be mapped to either APN1 306' and APN1 306 to allow billing directly to OEM's plan, corresponding to IMSI 1, which may be kept alive as a bootstrap profile if the consumer plan is terminated for whatever reason, e.g., non-payment, or to APN2 308' and/or APN3 318 for billing to the vehicle owner's plan, depending on which stakeholder uses the application.

The implementation depicted in FIG. 3*b* involves the management and updating of the multi-purpose device's network parameters and resources such as the International Mobile Subscriber Identifier (IMSI) or Mobile Directory Number (MDN), and the device Preferred Roaming List (PRL) or public land mobile network (PLMN) as described above. For example, the vehicle owner's carrier 304' may assign a new international mobile subscriber identifier (IMSI) IMSI 2 to the vehicle. The new IMSI, IMSI 2, assigned by the vehicle owner's carrier will be used for all future authentications and dataflow, and old IMSI, IMSI 1, assigned by the OEM's carrier 302' remains as a back-up for vehicle OEM to access the vehicle related data in case of loss of connection through the new carrier or suspension or termination of the vehicle owner's account with the new carrier. This can be done via basic Pair the Plan as well as Pair The Plan using subscription management.

The HLR or HSS 310' of the OEM's carrier 302' may or may not be utilized, as an embodiment, to manage the network registrations and authorizations post-pairing as discussed below.

FIGS. 4*a* and 4*b* illustrate management of network registrations and authorizations through different channels of communication post-pairing. FIG. 4*a* illustrates a preferred embodiment where HSS/HLR is maintained by the "Pair The Plan" PTP server 406 even after pairing, for example, authentication and location updates are done with PTP server or host MNO 406. This is accomplished by the vehicle owner MNO 408 redirecting the authentication and location update traffic toward the PTP server or host MNO 406 based on the IMSI. This continuing involvement of PTP server or host MNO 406 in managing data traffic provides various advantages such as maintaining any special features that the automotive OEM requires to execute functionalities of interest to it and better enabling additional and/or subsequent pairings. FIG. 4*b* illustrates another embodiment where management of network registrations and authorizations is transferred to the vehicle owner MNO 408' from PTP server or host MNO 406' post-pairing, for example, authentication and location updates are accomplished using vehicle owner MNO 408'.

To describe an example of a pairing experience by both the consumer and the cellular or other wireless plan provider in accordance with an embodiment refer now to the following description in conjunction with the accompanying figures.

Figure 5:
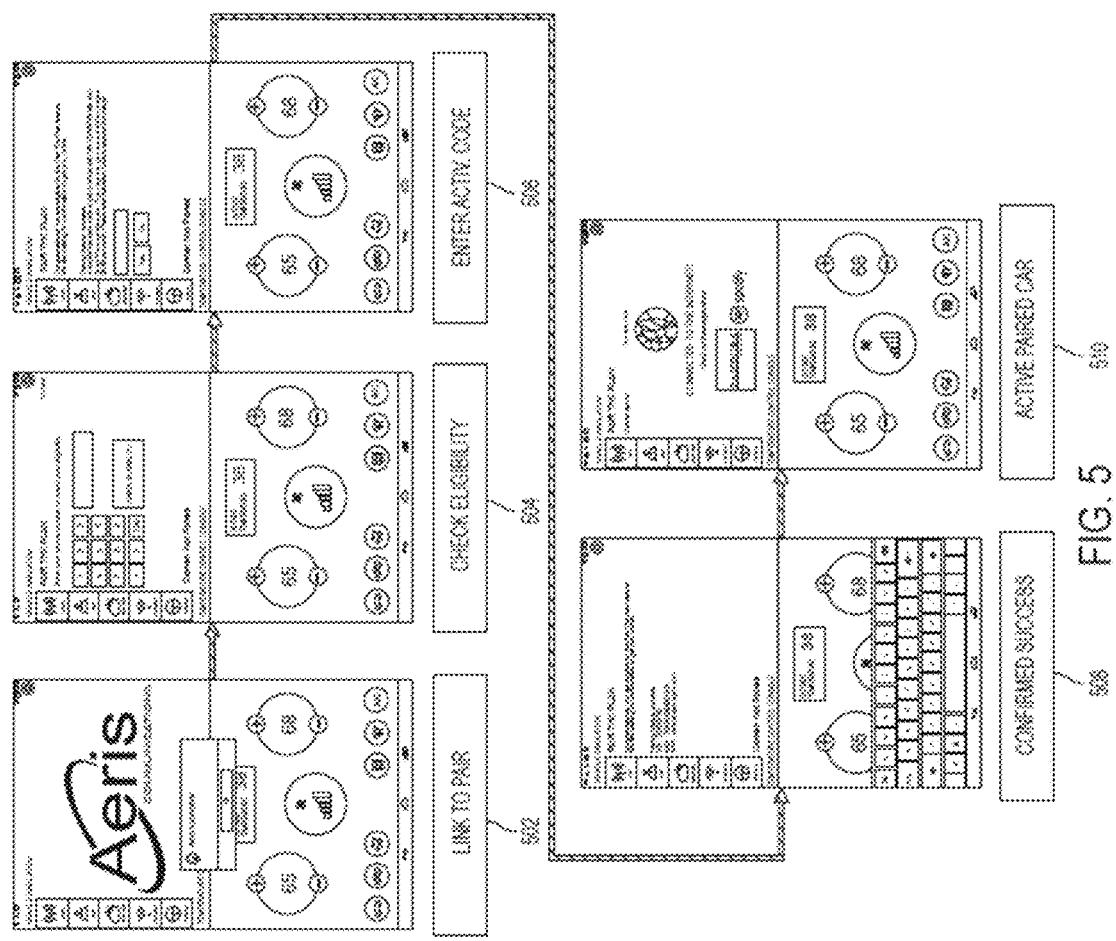
FIG. 5 illustrates a series of display screens depicting an example of a vehicle pairing experience by a vehicle owner.

FIG. 5 illustrates a series of display screens depicting an example of a user interface device being displayed to a pairing consumer, in accordance with an embodiment of the invention. Initially, the consumer will go to a "Vehicle Subscription Pairing" screen 502 accessible via user settings of the vehicle's operation system. The consumer must enter an identification number, for example, a phone number of the primary device, typically a smartphone, associated with his/her cellular or other wireless subscription using a keypad or other input system similar to that on screen 504. An application based on a server, for example, a PTP server, or in the cloud will be triggered that will use the entered phone number to identify the consumer's cellular or other wireless network provider and subscription. Once the plan is identified, the eligibility of the subscription plan to support pairing with the vehicle is verified. If eligible, a request requiring verification that the consumer approves adding the vehicle to their identified plan as a new device is sent to the consumer. In this embodiment, the verification process is entering an activation code on screen 506.

After successful verification by the consumer, a request is sent to the consumer's cellular or other wireless network provider to obtain new values of network resources for the vehicle's telematics unit. These resources include, but are not limited to, the IMSI, Mobile Subscriber Integrated Services Digital Network-Number (MSISDN), and the APN to be used as APN2 308 or APN3 318 in FIGS. 3a and 3b.

Thereafter the consumer's cellular or other wireless network provider will respond to the request with new resource values. An over-the-air update to the vehicle is performed applying the resource values obtained from the consumer's carrier. A confirmation text is then sent to the consumer's smartphone. Upon completion, additional message(s) may be provided confirming that pairing has completed and/or reporting any pairing errors as shown by screen 508 and screen 510.

Figure 6A:
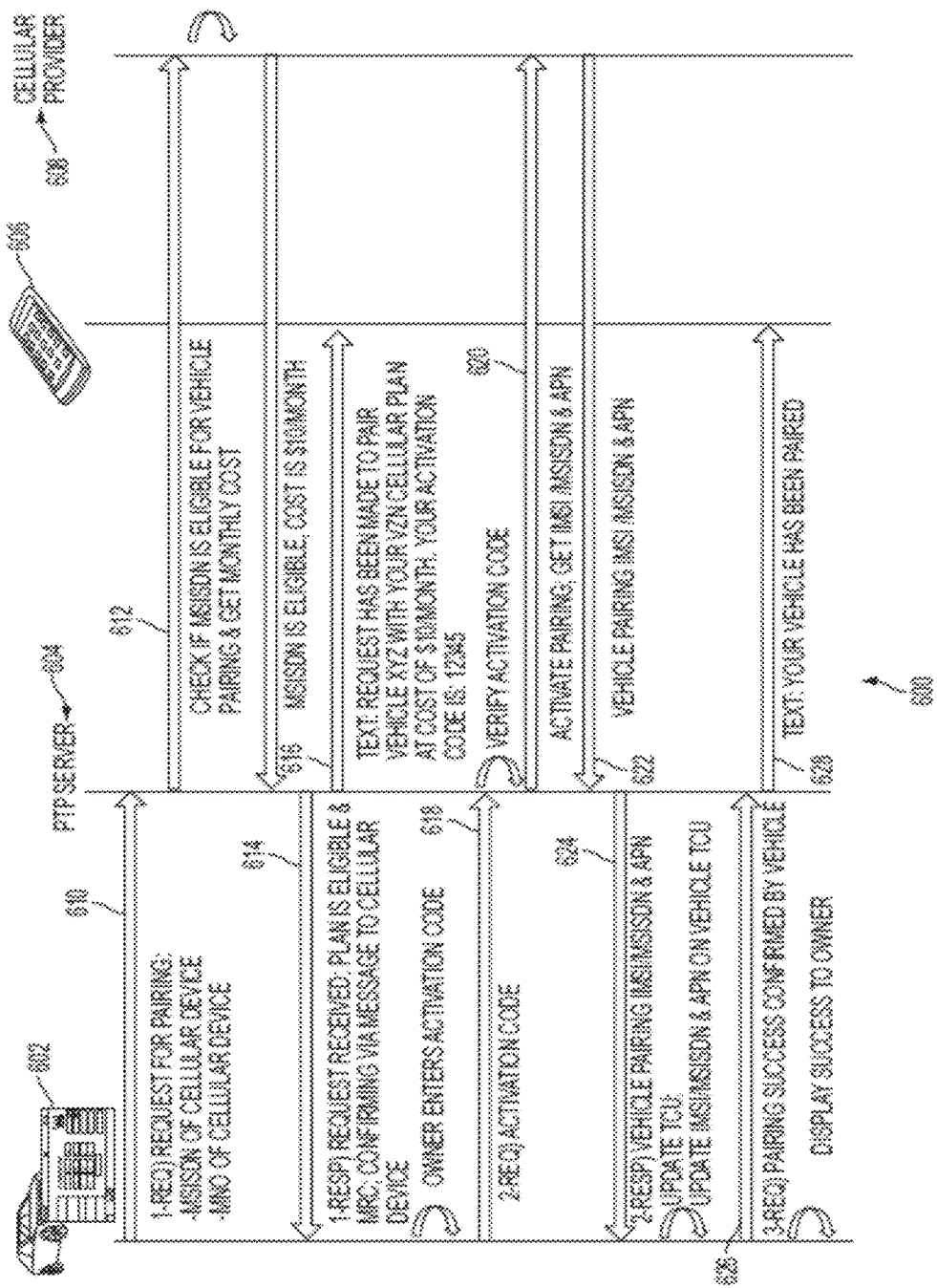
FIG. 6a is a process flow diagram illustrating one way in which the multiple-purpose device (in this case, in a vehicle) can be paired to cellular device subscription of the consumer using the solution embedded in the device, in accordance with one or more embodiments of the present invention.

FIG. 6a is a flow diagram illustrating the process of pairing the vehicle to the billing plan of the consumer's cellular or other wireless subscription, in accordance with an embodiment of the invention. The consumer's cellular or other wireless network provider is referred to as "Cellular Provider" or "MNO" 608 and the server or cloud-based application used for pairing is referred to as the "PTP server" 604.

First, a request for pairing is initiated by the consumer to the PTP server 604 via step 610. This initiation could be provided in a variety of ways. For example, one, by providing either an MSISDN of a cellular device 606 of the vehicle owner and thus identifying MNO based on MSISDN, or two, by providing a MNO of the cellular device 606 of the consumer. Next, the PTP server 604 sends a signal to the cellular provider 608 to determine if the cellular device 606 is eligible for vehicle pairing by the cellular plan provider 608, by utilizing for example the MSISDN, via step 612. If it is determined that the cellular device 606 is eligible, then a monthly cost may be provided to the PTP server 604 and sent to the vehicle 602, via step 614. Next, a text is provided to the cellular device to prevent fraud and make sure the user actually has possession of the cellular device, via step 616. The text may say for example "Request has been made to pair vehicle XYZ with your VZN mobile plan at cost of $10/month. If you wish to accept pairing, press <here>. We will then send you an activation code to complete this transaction." Upon receipt of the approval, the cellular plan provider may send an additional text to indicate completion of the enrollment process, saying, for example, "Your activation code is: 12345". Next, the consumer would enter the activation code, via step 618, to finish the pairing activities by the consumer.

Pairing is then activated, for example, by obtaining the appropriate IMSI/MSISDN and the access point name (APN) from the cellular plan provider, via step 620. The vehicle is paired utilizing the IMSI/MSISDN and APN and a notification is displayed as "Vehicle pairing IMSI/MSISDN and APN", via step 622. Pairing success may then be confirmed by vehicle, via step 624. Finally, the vehicle screen will display pairing success to the owner of the cellular device, via step 626 and a text is received by the cellular device that indicates that the vehicle has been paired, via step 628. Thereafter, the cellular device used to perform the pairing is not required to be present in the vehicle for the consumer-oriented services to be usable.

FIG. 6b illustrates the transmittal of information to and from the paired vehicle device through two corresponding network traffic paths identified by the access point name (APN). Each path manages and charges for traffic according to the policies and the billing plan selected by corresponding stakeholder. For example, as shown in FIG. 6b, APN1 provides under-the-hood and other driving-related data to the OEM step 630 and APN2 provides consumer-directed infotainment or other services to the consumer step 632.

Since the OEM is interested in monitoring under-the-hood and other driving-related data, the OEM will be charged for network traffic associated with transmitting this data, according to its billing plan step 634. Similarly, since the consumer is interested in receiving infotainment or other consumer-directed services and associated content, the consumer will be charged for traffic associated with these consumer-directed applications according to the rules and policies of the consumer's cellular or other wireless subscription and associated billing plan step 636.

Figure 7A:
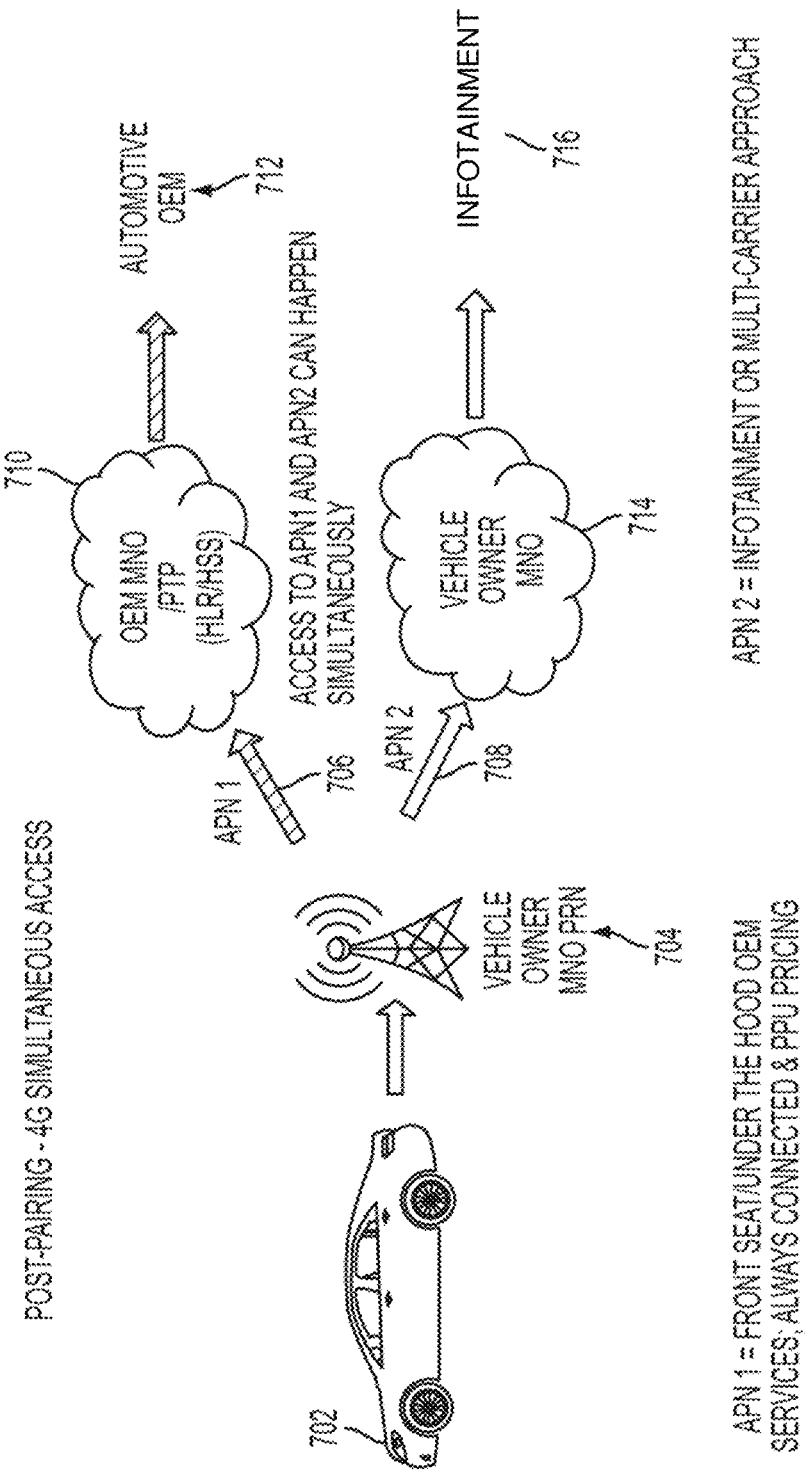
FIG. 7a illustrates a way in which a device being used for enterprise and consumer purposes simultaneously may access different provider networks, in this case through use of different access point names (APN1 and APN2) via a fourth generation (4G) cellular systems network, in accordance with one or more embodiments of the present invention.

FIG. 7a illustrates simultaneous access through APN1 and APN2 via a first cellular network system, for example, a fourth generation (4G) network. The simultaneous access through both APN1 706 and APN2 708 is possible due to the presence and simultaneous availability of two data paths in a 4G network system, identified by APNs 706 and 708 (APN1 and APN2).

Figure 7B:
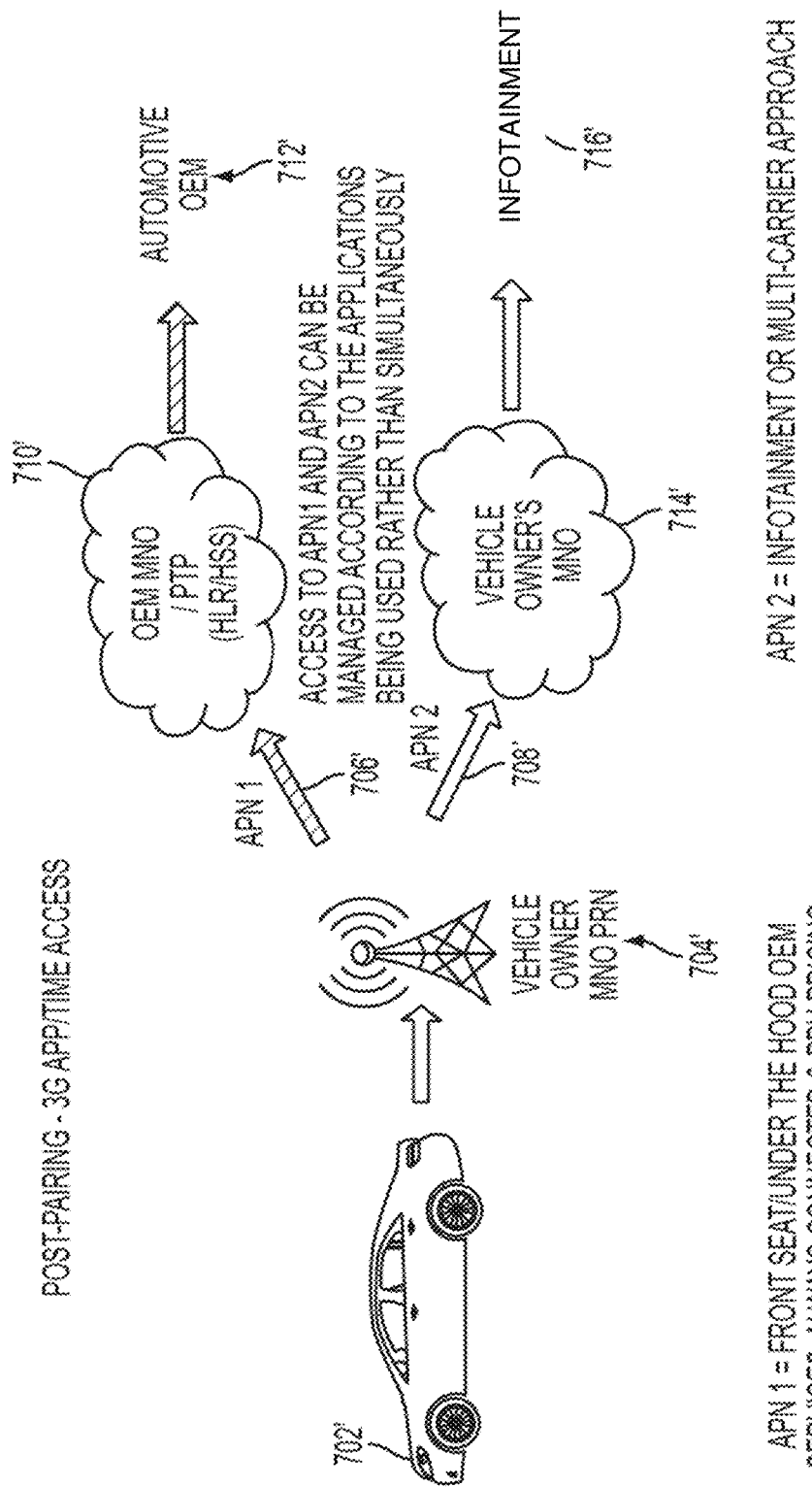
FIG. 7b illustrates alternate access through Access Point Name 1 (APN1) and Access Point Name 2 (APN2) via a third generation (3G) cellular systems network, in accordance with one or more embodiments of the present invention.

FIG. 7b illustrates alternate access through APN1 and APN2 via a second cellular network system, for example, a third generation (3G) network. In a 3G network system, only one data path is accessible at a time, so the vehicle 702' must be able to alternate between the two data paths identified by APN1 706' and APN2 708' according to the priorities and requirements of the supported applications. Different algorithms can be used for determination of APN access by the vehicle during different situations. For example, the algorithm could specify "if the vehicle is not in "ignition/aux on" then use APN1; if the vehicle is in "ignition/aux on" then use APN2". The use of this algorithm can result in the OEM accessing its under-the-hood data via APN1 706' when the vehicle 702' is not being used by the consumer, and the consumer accessing its applications and data via APN2 708'. This arrangement generally works well since many OEM uses for data are not time-specific, allowing OEM 712' to upload its under-the-hood data just after the vehicle 702' is turned off. However, the system can be configured to grant priority to non-consumer uses in specified situations, such as in case of emergency; for example, the system can immediately grant access to emergency communication, such as an automatic call to 911 regarding an accident, by switching to APN1 706' and terminating communications over APN2 708' for the duration of the emergency call.

FIG. 8a is a flow diagram illustrating the process of pairing the vehicle to the billing plan of the consumer's cellular or other wireless subscription, in accordance with an embodiment of the invention. The consumer's cellular or other wireless network provider is referred to as "Cellular Provider" or "MNO" 808 and the server or cloud-based application used for pairing is referred to as the "PTP server" 804.

First, a request for pairing is initiated by the consumer through vehicle TCU 802 or by the vehicle TCU 802 to the PTP server 804 via step 810. This initiation could be provided in a variety of ways. For example, one, by providing either an MSISDN of a cellular device 806 of the vehicle owner and thus identifying MNO based on MSISDN, or two, by providing an MNO of the cellular device 806 of the consumer. Next, the PTP server 804 sends a signal to the cellular provider 808 to determine if the cellular device 806 is eligible for vehicle pairing by the cellular plan provider 808, by utilizing for example the MSISDN, via step 812. If it is determined that the cellular device 806 is eligible, then a monthly cost may be provided to the PTP server 804 via step 814 and sent to the vehicle 802, back end systems 803 via steps 814' and 814". Next, a text is provided to the cellular device 806 to prevent fraud and make sure the user actually has possession of the cellular device, via step 816. This message may be initiated by the PTP server as shown by 816 or the cellular plan provider directly as shown by 816'. The text may say for example "Request has been made to pair vehicle XYZ with your VZN mobile plan at cost of $10/month. If you wish to accept pairing, press <here>. We will then send you an activation code to complete this transaction." Upon receipt of the approval, the cellular plan provider may send an additional text to indicate completion of the enrollment process, saying, for example, "Your activation code is: 12345". Alternatively, the initial text message may also include the required activation code. Next, the consumer would enter the activation code, via step 818, to finish the pairing activities by the consumer. The activation code entered by the consumer may be provided directly to the PTP server 804 via step 818 as depicted in FIG. 8a, or may be provided to the PTP server 804 via back end systems 803 via steps 818' and 818" which is verified by the PTP server 804 via step 819. If the activation code is provided by the MNO, the PTP server can check the activation code with the MNO to verify the activation code. If the vehicle is equipped with eUICC and it is not already on consumer's mobile carrier, the vehicle is moved onto consumer's mobile carrier via subscription management, for example, by using over the air subscription management as illustrated in FIGS. 9a and 9b. Using the ICCID obtained from this process, the subscription is activated with cellular provider/MNO 808 to obtain IMSI and MSISDN and optionally APN. New subscription on the eUICC is activated and TCU APN is updated via step 820.

Once the activation code is verified, pairing is activated, for example, by using the supplied IMSI/MSISDN and APN, or by obtaining an appropriate IMSI/MSISDN and APN from the MNO via step 820 as shown in FIG. 8a. The vehicle is paired utilizing the IMSI/MSISDN and APN. A notification "Vehicle pairing IMSI/MSISDN and APN" is provided from MNO to PTP server via 822. PTP server initiates pairing process with the vehicle via step 824. For example, PTP server may update TCU setting by giving a new IMSI/MSISDN & APN via step 824.

In the environment where the back end system is interposed between the vehicle and PTP server, pairing may be activated by using the MSISDN provided by the consumer in step 810 and the IMSI/MSISDN of the vehicle, via step 820 as shown in FIG. 8a. MNO may also optionally choose to request confirmation of the pairing request from the consumer at this point via text message or phone call prior to pairing via step 822 and 823. The MNO confirms pairing via step 624 and the PTP Server confirms via step 825.

Pairing success may then be confirmed by vehicle, via step 826. Finally, the vehicle screen will display pairing success to the owner of the cellular device, via step 827 and a text is received by the cellular device that indicates that the vehicle has been paired, via step 828. Thereafter, the cellular device used to perform the pairing is not required to be present in the vehicle for the consumer-oriented services to be usable.

Figure 8B:
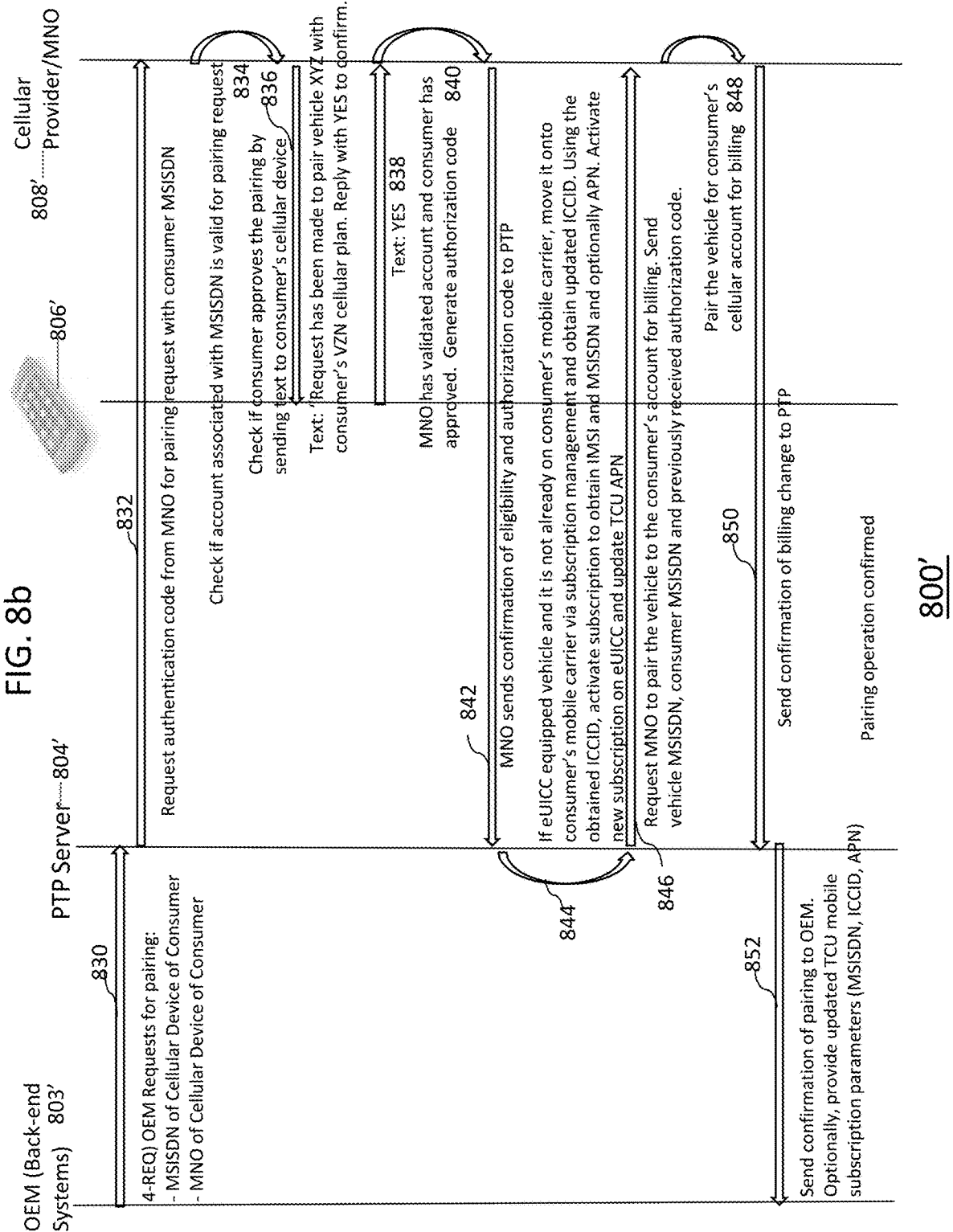
FIG. 8b is a flow diagram illustrating the process of pairing the network usage for OEM related applications running on the vehicle to the billing plan of the consumer's cellular subscription, in accordance with one or more embodiments of the invention.

FIG. 8b is a flow diagram illustrating an exemplary embodiment describing the process of pairing the network usage for OEM related applications running on the vehicle to the billing plan of the consumer's cellular or other wireless subscription, in accordance with an embodiment of the invention. The consumer's cellular or other wireless network provider is referred to as "MNO" or "Cellular Provider," 808' and the server or cloud-based application is referred to as the "PTP server" 804'.

In an embodiment illustrated by FIG. 8b, The vehicle is paired with the consumer's cellular subscription and associated billing plan, on the enterprise user's request, for example, OEM 803'. The OEM may want to use the consumer's billing plan for applications of its interest, for example, under the hood applications, rather than using enterprise user's separate billing plan. This may be done by providing MSISDN of cellular device 806' of consumer or vehicle owner and thus identifying MNO based on MSISDN, or two, by providing an MNO of cellular device 806' of consumer by the OEM 803' (or OEM back end system) to the PTP server 804' via step 830 as it initiates a request for pairing OEM related applications for that vehicle to the consumer's billing plan to which the vehicle has been paired earlier as shown in FIG. 8a. The pairing may encompass usage by the enterprise user and/or by the consumer user such that the vehicle related use by the enterprise user and/or by the consumer user is billed to the consumer's billing and subscription plan.

The PTP server 804' requests authentication code from MNO or cellular or wireless service provider 808' for pairing request with consumer MSISDN via step 832. The cellular or wireless service provider 808' checks if the account associated with the MSISDN provided by the OEM 802' is valid for pairing request via step 834. The cellular or wireless service provider 808' also checks if consumer approves the pairing by sending text to consumer's cellular device 606' via step 836. The consumer through their cellular device 806' may approve the pairing request by responding "YES" via step 838. Once the MNO or cellular or wireless service provider 608' has validated account and consumer has approved, it generates authorization code via step 840 and sends confirmation of eligibility and authorization code to PTP server 804' via step 842.

The PTP server 804' checks if the vehicle is eUICC equipped. If the vehicle is equipped with eUICC and it is not already on consumer's mobile carrier, the vehicle is moved onto consumer's mobile carrier via subscription management, e.g., use the same cellular provider or MNO, for example, by using over the air subscription management as illustrated in FIGS. 9a and 9b.

Using the obtained ICCID, subscription is activated with cellular provider/MNO 808' to obtain IMSI and MSISDN and optionally APN. New subscription on eUICC is activated and TCU APN is updated via step 844. Thus, the eUICC and APN used by vehicle TCU is updated by this process. The PTP server 804' requests MNO or cellular service provider 808' to pair the vehicle to the consumer's account for billing and sends vehicle MSISDN and/or IMSI, consumer MSISDN and/or IMSI and previously received authorization code via step 846. The MNO or cellular service provider 808' pairs the vehicle for consumer's cellular account for billing via step 848 and sends confirmation of billing change to PTP server 804' via step 850. The PTP server 804' also sends confirmation of pairing to OEM, or optionally, provide updated TCU mobile subscription parameters (MSISDN, ICCID, APN) via step 852 and confirms the completion of the pairing operation.

FIG. 8c illustrates the transmittal of information to and from the paired vehicle device through two corresponding network traffic paths identified by the access point name (APN). Each path manages and charges for traffic according to the policies and the billing plan selected by corresponding stakeholder. For example, as shown in FIG. 8c, APN1 provides under-the-hood and other driving-related data to the OEM step 854 and APN2 provides consumer-directed infotainment or other services to the consumer step 856.

Since the OEM is interested in monitoring under-the-hood and other driving-related data, the OEM will be charged for network traffic associated with transmitting this data, according to its billing plan step 858. Similarly, since the consumer is interested in receiving infotainment or other consumer-directed services and associated content, the consumer will be charged for traffic associated with these consumer-directed applications according to the rules and policies of the consumer's cellular subscription and associated billing plan step 860.

FIG. 8d illustrates the transmittal of information to and from the paired vehicle device through two corresponding network traffic paths identified by the access point name (APN). Each path manages and charges for traffic according to the policies and the billing plan selected by corresponding stakeholder. For example, as shown in FIG. 8d, APN2 provides under-the-hood and other driving-related data to the OEM step 862 and APN3 provides consumer-directed infotainment or other services to the consumer step 864.

Since the OEM is interested in monitoring under-the-hood and other driving-related data, and the OEM has successfully paired his vehicle application usage data with consumer's cellular billing plan the consumer may be charged for network traffic associated with transmitting this data, according to vehicle owner's billing plan step 866. Similarly, since the consumer is interested in receiving infotainment or other consumer-directed services and associated content, the consumer will be charged for traffic associated with these consumer-directed applications according to the rules and policies of the consumer's cellular subscription and associated billing plan step 868.

FIGS. 9a and 9b illustrate an exemplary process 900 and 900' for over the air subscription management. The MNO for a device may be changed from MNO 1 to MNO 2 (or from one MNO to another MNO), via over the air subscription management as follows. The subscription management described herein downloads and enables new profile as desired. The system used for subscription management for two mobile network operators (MNOs) may include MNO 1 backend 971, MNO 2, backend 972, subscription management server 973, MNO 1 subscription manager data preparation (SM DP) 974, MNO 2 subscription manager data preparation (SM DP) 975, subscription manager secure routing (SM SR) 976 and Issuer Security Domain Secure Routing (ISO SR) 977. ES2, ES3, ES4 and ES5 as used herein refer to defined interfaces between specific components of the system. For example, ES2 is defined as an MNO-SM_DP interface and is related to profile download and installation procedure. ES3 is defined as SM_DP-SM_SR interface and is related to profile download and installation procedure. ES4 is defined as an MNO-SM_SR interface and is related to profile download and installation procedure. ES5 is defined as an SM_SR-eUICC interface and is a secure channel interface established between SM_SR and ISD_SR used for over the air communication for remote provisioning and management.

Subscription management server 973 downloads profile for MNO 2 including Embedded Universal Integrated Circuit Card Identifier (EID), Subscription Manager Secure Routing Identifier (SMSRID) and profile type via step 1. MNO 2 backend 972 requests download of the profile to MNO 2 SM DP 975 via step 2 which requests creation of Issuer Security Domain Profile (IS DP) from SM SR 676 via step 3. SM SR 976 uses ES5 to create ISDP at ISD SR via step 4. Once the ISDP is successfully created, it is transmitted to the MNO 2 SM-DP 975 and the profile is downloaded to the eUICC. The profile may include information such as an Integrated Circuit Card Identifier (ICCID) and International Mobile Subscriber Identity (IMSI). This profile for MNO 2 is assigned a Mobile Station International Subscriber Directory Number (MSISDN) via steps 13 and 14.

The subscription management server 973 requests to update UICC information for the device with eUICC including EID, ICCID, MSISDN to SM SR 976. This may be done by using ES4 which may involve a single step 15 or ES2 which may involve two steps 16 and 17. Once the profile on SM SR is updated via step 15 or 17, it is enabled via steps 18, 19, 20, 21, 22 and the success may be reported via steps 23, 24 and 25 to all the entities involved in the transaction. As the new profile for MNO 2 is enabled, MNO 1 is notified that the original profile is disabled via step 24.

FIG. 10a illustrates simultaneous access through APN2 and APN3 via a first cellular network system, for example, a fourth generation (4G) network. The simultaneous access through both APN2 1008 and APN3 1018 is possible due to the presence and simultaneous availability of two data or network traffic paths in a 4G network system, identified by APNs 1008 and 1018 (APN2 and APN3).

FIG. 10b illustrates alternate access through APN2 and APN3 via a second cellular network system, for example, a third generation (3G) network. In a 3G network system, only one data or network traffic path is accessible at a time, so the vehicle 1002' must be able to alternate between the two data or network traffic paths identified by APN2 1008' and APN3 1018' according to the priorities and requirements of the supported applications. Different algorithms can be used for determination of APN access by the vehicle during different situations. For example, the algorithm could specify "if the vehicle is not in "ignition/aux on" then use APN2; if the vehicle is in "ignition/aux on" then use APN3. The use of this algorithm can result in the OEM accessing its under-the-hood data via APN2 1008' when the vehicle 1002' is not being used by the consumer, and the consumer accessing its applications and data via APN3 1018'. This arrangement generally works well since many OEM uses for data are not time-specific, allowing OEM 1012' to upload its under-the-hood data just after the vehicle 1002' is turned off. However, the system can be configured to grant priority to non-consumer uses in specified situations, such as in case of emergency; for example, the system can immediately grant access to emergency communication, such as an automatic call to 911 regarding an accident, by switching to APN2 1008' and terminating communications over APN3 1018 for the duration of the emergency call.

However, in an embodiment, a multicarrier approach as illustrated in FIG. 3b and described in detail in the description accompanying FIG. 3b is also possible where the OEM may have choice to use either APN1 via OEM MNO or APN2 via vehicle owner/consumer MNO in state 1.

Alternatively or additionally, 3G may also offer two data or network traffic paths simultaneously similar to 4G. Alternatively or additionally, 5G may also offer two data or network traffic paths simultaneously similar to 4G.

Figure 11:
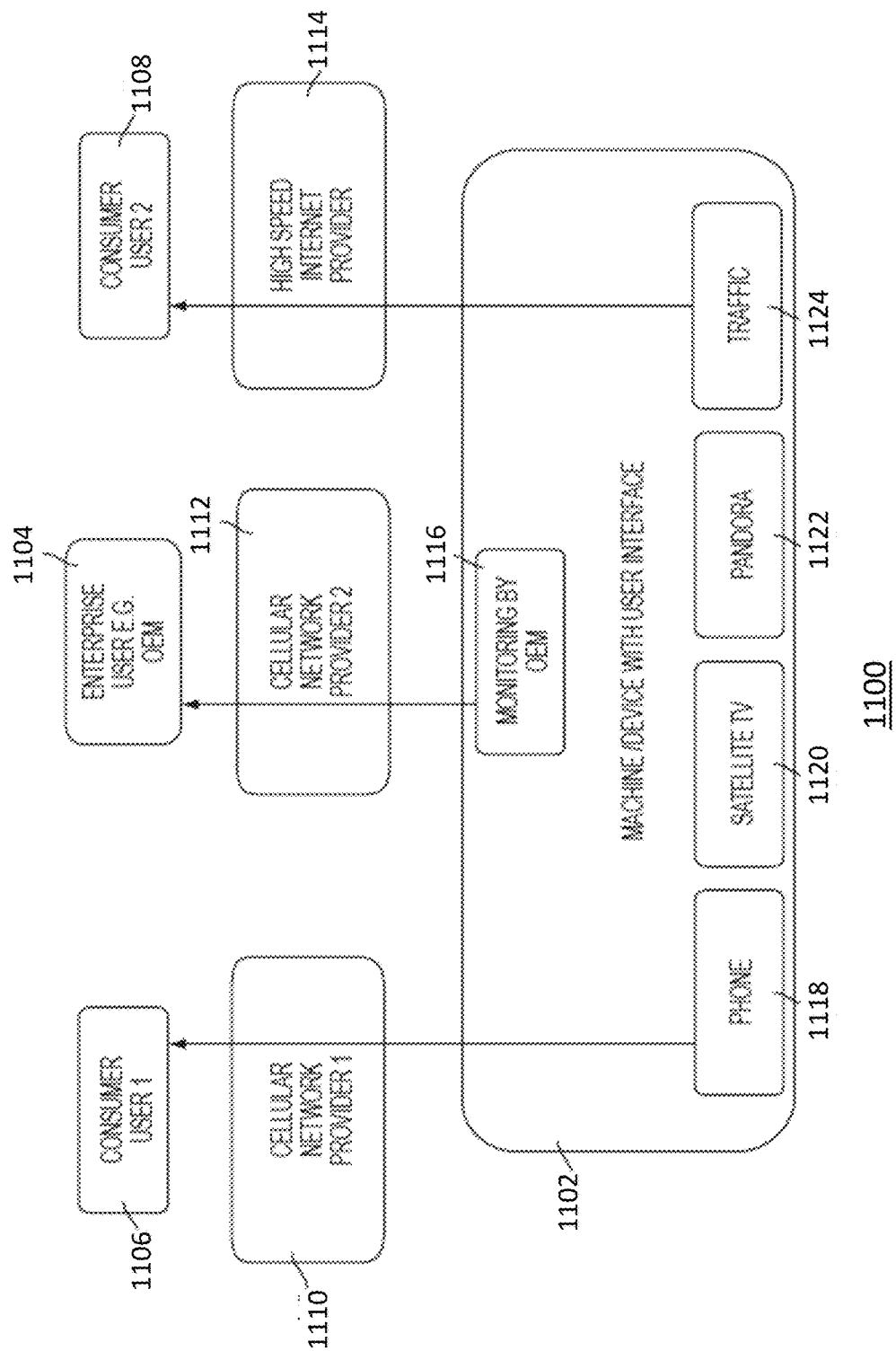
FIG. 11 illustrates an example of an interface for use/purpose based billing for multipurpose devices connected to one or more service providers providing different data services to different users based on usage of communication channels in accordance with one or more embodiments of the present invention.

FIG. 11 illustrates another embodiment where, in independent transactions, a device such as a tablet or a vehicle is enrolled in one or more billing plans chosen by one or more enterprise stakeholders and also in one or more billing plans chosen by one or more consumers, such as but not limited to an owner, user or a lessee of the tablet or the vehicle. Device 1102 can be any device such as but not limited to a tablet or a vehicle with a user interface for example, as described in FIG. 5. Enrolling the device 1102 in different subscription plans as selected by different users, which can be any combination of one or more enterprises and/or consumers, may be carried out as described in FIGS. 6a, 7a and 7b. In an embodiment, the device may be enrolled in the same subscription plan as the consumer user and may make further use of his associated billing plan as illustrated in FIGS. 6c, 8c and 8d and described in description associated with FIGS. 6b, 8c and 8d. Examples used are for purpose of illustration only, and should not be construed as limitations.

As illustrated in FIG. 11, OEM 1104 is an enterprise that is interested in monitoring equipment performance 1116, enrolls device 1102 in the service provider subscription plan 1112 selected by OEM 1104. Consumer1 1106 and consumer2 1108 are different users of the same device 1102 who, in addition to using the device for its principal purposes (e.g. in case of vehicle, driving), would also use the device 1102 for other purposes such as infotainment depicted by phone 1118, satellite TV 1120, Pandora 1122 and traffic 1124. When consumer1 1106 uses the device 1102 for his/her own purpose such as infotainment, he/she would use his/her own subscription plan. Consumer1 1106 enrolls device 1102 in the service provider subscription plan 1110 selected by consumer1 1106. Similarly, when consumer2 1108 uses the device 1102 for his/her own purpose such as infotainment, he/she would use his/her own subscription plan.

Consumer2 1108 enrolls device 1102 in the service provider subscription plan 1114 selected by consumer2 1108. Furthermore, consumer1 1106 and consumer2 1108 can choose which channel to use to get the content based on their service provider subscription plan. For example, applications available through different communication channels, consumer can choose which communication channel to use e.g. YouTube through cellular network as a communication channel is more expensive than internet as a communication channel.

Alternatively or additionally, in an embodiment, the OEM may choose to use either consumer1 or consumer2's billing plan and use the MNO of their choice for applications of interest to the enterprise user, and the consumer whose plan the OEM selects may get charged for the usage and the usage may be restricted according to the consumer's billing plan selected.

The embodiments described hereafter may use any one of the above methods, systems and/or computer program products to pair-the-plan, one via basic pair-the-plan and another via pair-the-plan using subscription management. For example, the embodiments recited herein may use any one or more of: Pair the Plan system for devices and method of use described in co-pending and co-owned U.S. application Ser. Nos. 15/599,835 and 14/274,505 (referred to herein as basic Pair The Plan) and Pair The Ran system for devices and method of use described in co-pending and co-owned U.S. application Ser. No. 16/819,398 (referred to herein as Pair The Plan using subscription management), to carry out the operations described in the description of those embodiments where applicable, all of which are incorporated herein by reference in their entirety.

In an embodiment, the consumer user (second user) described above may also be an enterprise. For example, where a third party solution provider such as application service provider (ASP) and/or OEM provide the IoT solutions that use their own connectivity for the IoT solutions, the consumer user, which is in this case may also be an enterprise, that uses those solutions may have their own connectivity arrangement with the MNO which may or may not be the same as the ASP and/or OEM. In this case, rather than paying for the connectivity used by the ASP and/or OEM (first user), the enterprise (second user) may want to use their own connectivity for ASP and/or OEM IoT solutions. In cases where ASP and OEM work together as one entity to provide IoT solutions, the ASP will also be a first user, similar to OEM.

Such a solution may help the enterprise consumer user (second user) avoid margin stacking and may also provide security for the enterprise consumer user, where the enterprise consumer user is able to monitor and manage the connectivity in a more secure manner than using the default connectivity provided.

In an embodiment, the second user may include a subsequent user (third, fourth, fifth . . . user), for example, a 'third user', which may be an individual consumer, whose cellular or other wireless subscription may be paired with the second user's IoT devices. For example, an OEM is a first user, a rental car company a second user, from which a consumer or a third user leases a car and would like to use their own cellular or other wireless subscription and billing plan for using the capabilities of the shared multipurpose device, in this example, a vehicle for the use of their interest, for example, infotainment.

The embodiments described herein provide a method, system and computer program product for pairing a fleet of vehicles with the MNO of Enterprise consumer user's (second user's or subsequent user's) choice rather than pairing a single vehicle as described above. Thus the method, system and computer program product works for the benefit of an enterprise user, described hereonwards as enterprise user as well as a consumer user or a second user which may also include another enterprise described hereonwards as enterprise consumer user or second user. The example enterprise consumer user provided herein describes a fleet owner such as a rental car company, wants to leverage their connectivity relationship with an MNO or mobile virtual network operator (MVNO) rather than pay for connectivity through the OEM Telematics provider such as original equipment manufacturer (OEM) and/or application service provider (ASP), for example, a car manufacturer or simply enterprise user or first user. A person skilled in the art may readily understand that although the embodiments are described using MNO, for example MNO 1, MNO 2, etc., any combination of MNO and/or MVNO may be also be used and is within the spirit and scope of this invention.

For example, if a car manufacturer (enterprise user 1/first user) uses MNO 1 as their connectivity provider. The car manufacturer (enterprise user 1/first user) buys this connectivity from MNO 1, marks it up with margin and resells it to rental car company (consumer user 1, which is also an enterprise, and hence enterprise consumer user or second user) as part of the cost of their telematics service. If another car manufacturer (enterprise user 2/also a first user and hence referred to as another first user) uses MNO 2 as their connectivity provider. This another car manufacturer (enterprise user 2) buys this connectivity from MNO 2, marks it up with margin and resells it to the rental car company (consumer user 1, which is also an enterprise and hence enterprise consumer user/second user) as part of their telematics service.

The rental car company (consumer user 1, which is also an enterprise and hence enterprise consumer user or a second user) may have a direct relationship with another MNO, for example, MNO 3 at a very good rate. The rental car company (consumer user 1, which is also an enterprise and hence enterprise consumer user or a second user) can save substantial money by moving the vehicles from both the first car manufacturer (enterprise user 1/first user) and the second car manufacturer (enterprise user 2/another first user) to their MNO 3 connectivity.

To do so, the rental car company (consumer user 1, which is also an enterprise and hence enterprise consumer user or second user) needs an ability to "pair-the-plan" for vehicles coming from both the first car manufacturer (enterprise user 1/first user) and the second car manufacturer (enterprise user 2/another first user) with their the rental car company (consumer user 1, which is also an enterprise and hence enterprise consumer user or second user) connectivity MNO 3 rate plan.

The rental car company (consumer user 1, which is also an enterprise and hence enterprise consumer user or second user) should be able to perform this "pair-the-plan" at any time. They can perform this either after-the-fact on a single vehicle or on a set of vehicles. They can also perform this based on a set of rules around taking delivery or some other aspect of the vehicle supply chain where the vehicles are automatically paired to the rental car company (consumer user 1, which is also an enterprise and hence enterprise consumer user/second user) plan.

This capability may be possible with any combination of vehicle providers and connectivity providers. It might even be that a vehicle provider (the first car manufacturer (enterprise user 1/first user) and/or the second car manufacturer (enterprise user 2/another first user)) is already using MNO 3 but by moving the vehicle to the rental car company (consumer user 1, which is also an enterprise and hence enterprise consumer user)'s MNO 3 plan, the margin stacking from the vehicle provider (the first car manufacturer (enterprise user 1/first user) and/or the second car manufacturer (enterprise user 2/another first user)) can be avoided.

The capability should be possible with any combination of connected things used by the rental car company (consumer user 1, which is also an enterprise and hence enterprise consumer user/second user). For example, for cars, trucks, and for fueling stations which are located at the the rental car company (consumer user 1, which is also an enterprise and hence enterprise consumer user/second user) facility.

This capability should be possible for any enterprise leveraging connected things. For example, a large healthcare provider such as Kaiser Permanente could leverage their connectivity plan to connect many healthcare devices from many difference providers. A person skilled in the art may readily recognize that although the embodiments are described using vehicles as an example of devices such as IoT devices and vehicle manufacturers and rental companies as examples of enterprise user or simply user 1 or first user and a consumer user such as another enterprise user and hence enterprise consumer user or simply user 2 or second user, other devices such as other IoT devices or machine to machine (M2M) devices and other user 1 and user 2 relationships are also within the scope of this invention.

A person skilled in the art may readily recognize that although first user and another first user are used here to describe the enterprise user or simply user 1, existence of more than two first user is also within the scope of this invention.

This pairing may be done in the following phases: 1. Eligible/Possible Phase: The enterprise (second user) uses a mechanism to verify that the thing being moved to their (second user's) enterprise connectivity plan is eligible (that such a move is possible) and verifies the cost for the move and for ongoing service. 2. Pairing Request Phase: The enterprise (second user) initiates a request to move the thing to their (second user's) enterprise connectivity plan. 3. Authorization Phase: The receiving connectivity provider, the enterprise (second user), and the OEM (first user) use a mechanism to fully authorize this move from the OEM (first user's) connectivity plan to the to the enterprise (second user's) connectivity plan. 4. Pairing Execution Phase: The actual move of connectivity plan is executed. 5. Pairing Confirmation Phase: The move of connectivity plan is confirmed to all parties (Enterprise (second user), Enterprise (second user's) connectivity provider, and OEM (first user)).

For example, the Eligible/Possible Phase may include the consumer user enterprise (second user) calling the API of the vehicle OEM (first user) with device identifier, for example, a vehicle ID such as VIN and the target enterprise (second user's) MNO account to which the enterprise (second user) would like to move the vehicle. For example, Hertz calls the VolksWagan (VW) API with vehicle IDs and wants to find out if it is possible to pair these vehicles under the Hertz (second user's) T Mobile account. The OEM (first user) API responds with information on whether such a move is possible from the OEM (first user) perspective, what the cost of the IoT service would be after the move (should be a lower cost once the connectivity cost is moved to the enterprise), and with an OEM (first user) transaction ID that can be used with the (second user's) MNO API.

Authorization Phase may include the enterprise (second user) calling the (second user's) MNO with the OEM transaction ID in order to authorize the (second user's) MNO to accept the subscription for the Thing onto their enterprise MNO account; The MNO responds with the MNO transaction ID.

Pairing Request Phase may include the enterprise (second user) calling the OEM (first user) API with the MNO transaction ID so that the OEM API can complete the subscription move; The enterprise (second user) includes a call-back API which can be called once the move is completed.

Pairing Execution Phase may include the OEM (first user) executing the pairing.

Pairing Confirmation Phase: Once the move is completed, the OEM (first user) calls the enterprise (second user) callback API to provide this final notification.

Figure 12:
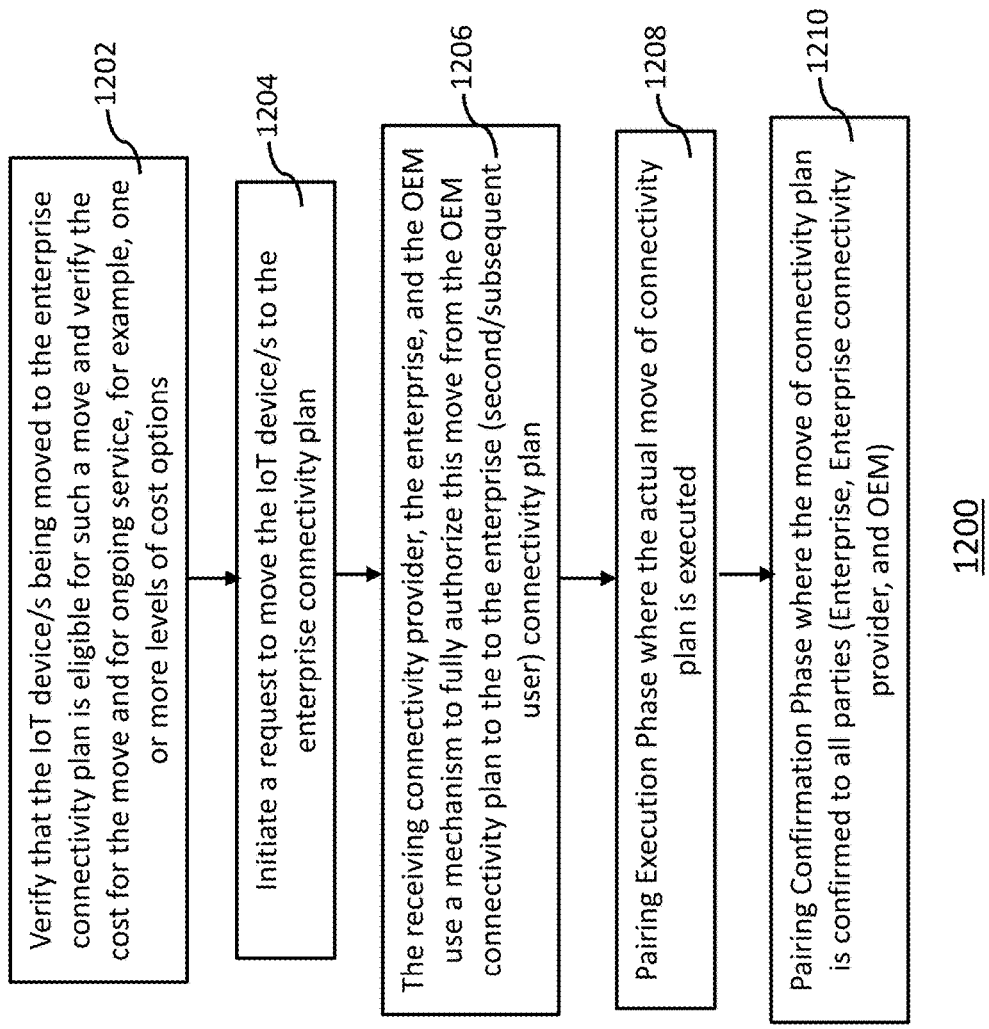
FIG. 12 illustrates an exemplary process 1200 of pairing the network usage for OEM related applications running on the vehicle to the billing plan of the consumer's cellular subscription, in accordance with one or more embodiments of the invention.

FIG. 12 illustrates an exemplary process 1200 of pairing the network usage for OEM (first user) related applications running on one or more devices, for example, an IoT device or a machine to machine (M2M) device such as but not limited to a vehicle/a thing, to the billing plan of the consumer's (second user's) cellular or other wireless subscription, in accordance with one or more embodiments of the invention. For example, as described above and illustrated in FIG. 12, the process may include first checking if the (second user's) MNO, for example, MNO 2 supports the split billing plan if paired and then verifying that the device(s) being moved to the enterprise connectivity plan or the connectivity plan chosen by the second user is eligible for such a move and verifying the cost for the move and for ongoing service via step 1202 and initiating a request to move the device(s) to the enterprise connectivity plan or the connectivity plan chosen by the second user via step 1204.

The verification of the cost may include one or more levels of cost options, for example, if the OEM (first user) provides connected car services and bills consumer for connected car services, MNO 2 may charge consumer (second user) as well as OEM (first user) for the actual connectivity in different ways, for example, each party may be charged for their usage, also known as split billing, in the cases where MNO 2 supports split billing; the consumer (second user) may be charged for the connectivity used by the consumer (second user) themselves as well as the OEM (first user), in which case, the consumer (second user) may or may not charge OEM (first user) for their usage; and the OEM (first user) may be charged for the connectivity used by the OEM (first user) itself as well as the consumer (second user), in which case, the OEM (first user) may or may not charge consumer (second user) for their connectivity usage. The options where one party, consumer (second user) or OEM (first user) may decide to charge the other party, OEM (first user) or consumer, for their usage, verification if the MNO supports split billing may be necessary. However, in a scenario where the OEM (first user)has a complete list of usage records and corresponding charges, then OEM (first user) itself can charge consumer (second user) for their usage and may not require the MNO to support split billing. If consumer (second user) is charged for everything, which optionally charges OEM (first user)for their usage or which may be realized as other discounted services from the OEM (first user) for using consumer's connectivity, there is no requirement that MNO 2 supports split billing.

Additionally or alternatively, any of these states may be defined as a default state. For example, to begin the service, the default state may be defined as the OEM (first user) being charged for the connectivity used by the OEM (first user) itself as well as the consumer (second user), and the OEM (first user) in turn charges consumer (second user) for their connectivity usage along with the connected car services. Additionally, an option to change from this default state may be provided.

The receiving connectivity provider, the enterprise (second user), and the OEM (first user) may use a mechanism to fully authorize this move from the OEM connectivity plan to the to the enterprise connectivity plan or the connectivity plan chosen by the second user via step 1206. The process 1200 may further include pairing execution phase, step 1208, where the actual move of connectivity plan is executed and a pairing confirmation phase, step 1210, where the move of connectivity plan is confirmed to all parties (Enterprise (second user), Enterprise connectivity provider (the connectivity plan provider) chosen by the second user, and OEM (first user)).

Figure 13:
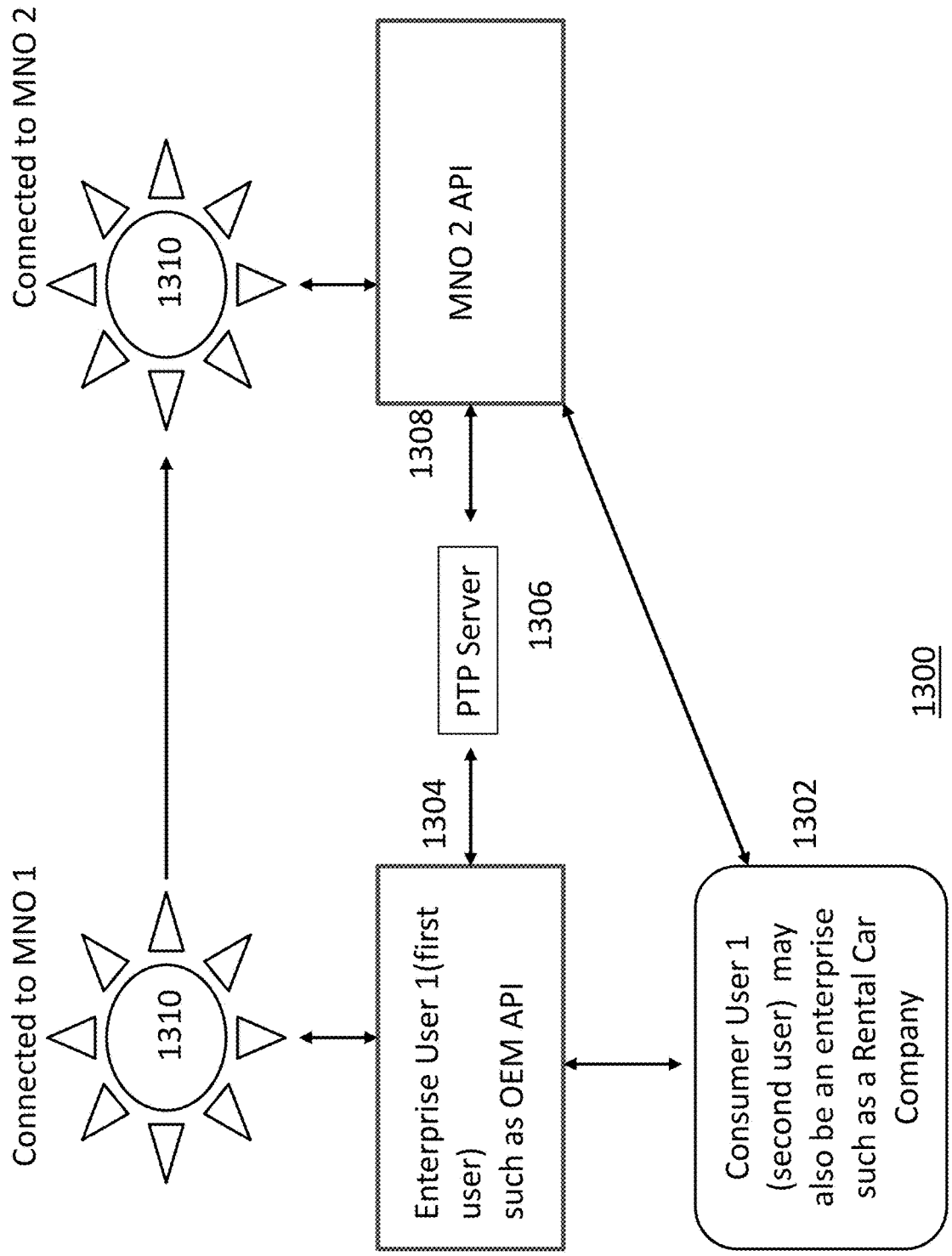
FIG. 13 illustrates an exemplary system 1300 for pairing the network usage for OEM related applications running on the vehicle to the billing plan of the consumer's cellular subscription, in accordance with one or more embodiments of the invention.

FIG. 13 illustrates an exemplary system 1300 for pairing the network usage for OEM related applications running on the one or more devices, for example, an IoT device or a machine to machine (M2M) device such as but not limited to vehicle, to the billing plan of the consumer's (second user's) cellular or other wireless subscription using the process 1200 described above, in accordance with one or more embodiments of the invention. For example, in an embodiment, the computer-implemented system 1300 includes one or more devices 1310 and a cellular or other wireless service provider enrollment server 1306, illustrated as Pair The Plan (PTP) server, enabled for enrollment of one or more devices 1310, the server 1306 including a processor and a memory in communication with the processor, wherein the server 1306 receives an identifier for the one or more devices 1310 to a cellular or other wireless service provider 1308, illustrated as MNO 2, effectively adding the one or more devices 1310 to a subscription and billing plan chosen by a second user 1302, wherein the second user is allowed to use capabilities of the one or more devices 1310 as governed by the subscription and billing plan of the second user's choice; and wherein the one or more devices 1310 are also configured to allow a first user 1304 to use capabilities of the one or more devices 1310 as governed by the subscription and billing plan of the first user's choice.

FIG. 14a is a flow diagram illustrating a process 1400 of pairing the network usage for OEM related applications running on the device, for example, an IoT device or a machine to machine (M2M) device such as but not limited to a vehicle, to the billing plan of the consumer's (second user's) cellular or other wireless subscription, in accordance with one or more embodiments of the invention. For example, in an embodiment, a consumer or a second user, which may also be an enterprise, illustrated as a rental car company 1402, sends a request for pairing one or more devices, for example, vehicles, with the MNO 1408 of their choice to the OEM (first user) API 1404 via step 1410. The OEM (first user) API 1404 sends a verification request to check the eligibility of one or more vehicles for pairing to PTP server 1406 via step 1412. Additionally, the PTP server may also verify if MNO 2, supports split billing via step 1413 where MNO 2 may charge consumer as well as OEM for the actual connectivity in different ways, for example, each party may be charged for their usage. The PTP server 1406 verifies the eligibility of one or more vehicles for pairing with MNO API 1408 and sends a response back to the OEM API 1404 via step 1414.

If eligible, the OEM (first user) API 1404, provides a transaction ID or authorization code to the rental car company API 1402 via step 1416. If eligible, the PTP server 1406 also requests monthly cost from the MNO API 1408 via step 1418, and provides it to the the rental car company API 1402 via step 1420.

The verification of the cost may include one or more levels of cost options, for example, if the OEM provides connected car services and bills consumer for connected car services, MNO 2 may charge consumer as well as OEM for the actual connectivity in different ways, for example, each party may be charged for their usage, also known as split billing, in the cases where MNO 2 support split billing; the consumer may be charged for the connectivity used by the consumer themselves as well as the OEM, in which case, the consumer may or may not charge OEM for their usage; and the OEM may be charged for the connectivity used by the OEM itself as well as the consumer, in which case, the OEM may or may not charge consumer for their connectivity usage. The options where one party, consumer or OEM may decide to charge the other party, OEM or consumer, for their usage, verification if the MNO support split billing may be necessary. However, in a scenario where the OEM has a complete list of usage records and corresponding charges, then OEM itself can charge consumer for their usage and may not require the MNO to support split billing. If consumer is charged for everything, which optionally charges OEM for their usage or which may be realized as other discounted services from the OEM for using consumer's connectivity, there is no requirement that MNO 2 supports split billing.

Additionally or alternatively, any of these states may be defined as a default state. For example, to begin the service, the default state may be defined as the OEM being charged for the connectivity used by the OEM itself as well as the consumer, and the OEM in turn charges consumer for their connectivity usage along with the connected car services. Additionally, an option to change from this default state may be provided.

If agreed, the rental car company API 1402 enters the transaction ID or authorization code provided by the OEM via steps 1422 and 1424, which is verified by the OEM API 1404 via step 1426. The OEM API 1404 sends a request to activate pairing and get IMSI/MSISDN and APN for each of the one or more vehicles to the MNO API 1408 via PTP server 1406 via step 1428. The MNO API 1408 pairs the IMSI/MSISDN and APN for each of the one or more vehicles and sends the pairing response to the OEM API 1404 via PTP server 1406 via step 1430, which it then transmits to the rental car company API 1402 via step 1432.

The rental car company API 1402 updates the IMSI/MSISDN and APN for each of the one or more vehicles on each vehicle TCU via step 1434 and confirms pairing success with the OEM API 1404 via step 1436. The pairing success may be displayed on each of the one or more vehicles' TCU and/or pairing dashboard (UI) at the rental car company via step 1442 and communicated to the the PTP server 1406 via step 1438 and MNO API 1408 via step 1440.

FIG. 14*b* is a flow diagram illustrating a process 1400' of pairing the network usage for OEM (first user) related applications running on the vehicle to the billing plan of the consumer's (second user's) cellular or other wireless subscription, in accordance with one or more embodiments of the invention. For example, in an embodiment, the OEM API 1404 sends a request for pairing the one or more vehicles with the the consumer's (second user's, for example, rental car company) cellular or other wireless subscription to the PTP server 1406 along with MSISDN/s of one or more cellular or IoT devices of the consumer and MNO of one or more cellular or IoT devices of the consumer to the PTP server 1406 via step 1450. The PTP server 1406 request transaction ID/authentication code from the MNO API 1408 for pairing request with consumer (second user) MSISDN via step 1452.

The MNO API 1408 checks if the account associated with the MSISDN is valid for authorizing the pairing request via step 1454 and also checks if the consumer (second user) approves the pairing request with the rental car company (consumer) API 1402 via step 1456. If the consumer, in this case, the rental car company API 1402 approves the pairing via step 1458, the MNO generates the authorization code, also known as transaction identifier (transaction ID), via step 1460 and sends the confirmation of eligibility and authorization/transaction code to the PTP server 1406 via step 1462.

The PTP server 1406 sends a request to the MNO API 1408 to pair the vehicle to the consumer's (second user's) account for billing along with MSISDN/s of one or more cellular/IoT devices, consumer MSISDN and previously received authorization code via step 1466. The MNO API 1408 pairs the one or more cellular or IoT devices for consumer's (second user's) cellular or other wireless account for billing via step 1468 and sends confirmation of the billing change to the PTP server 1406 via step 1470. The PTP server 1406 then sends confirmation of pairing to OEM API 1404 and optionally, may provide updated TCU mobile subscription parameters (MSISDN, ICCID, APN) to the OEM API 1404 via step 1472.

Figure 15A:
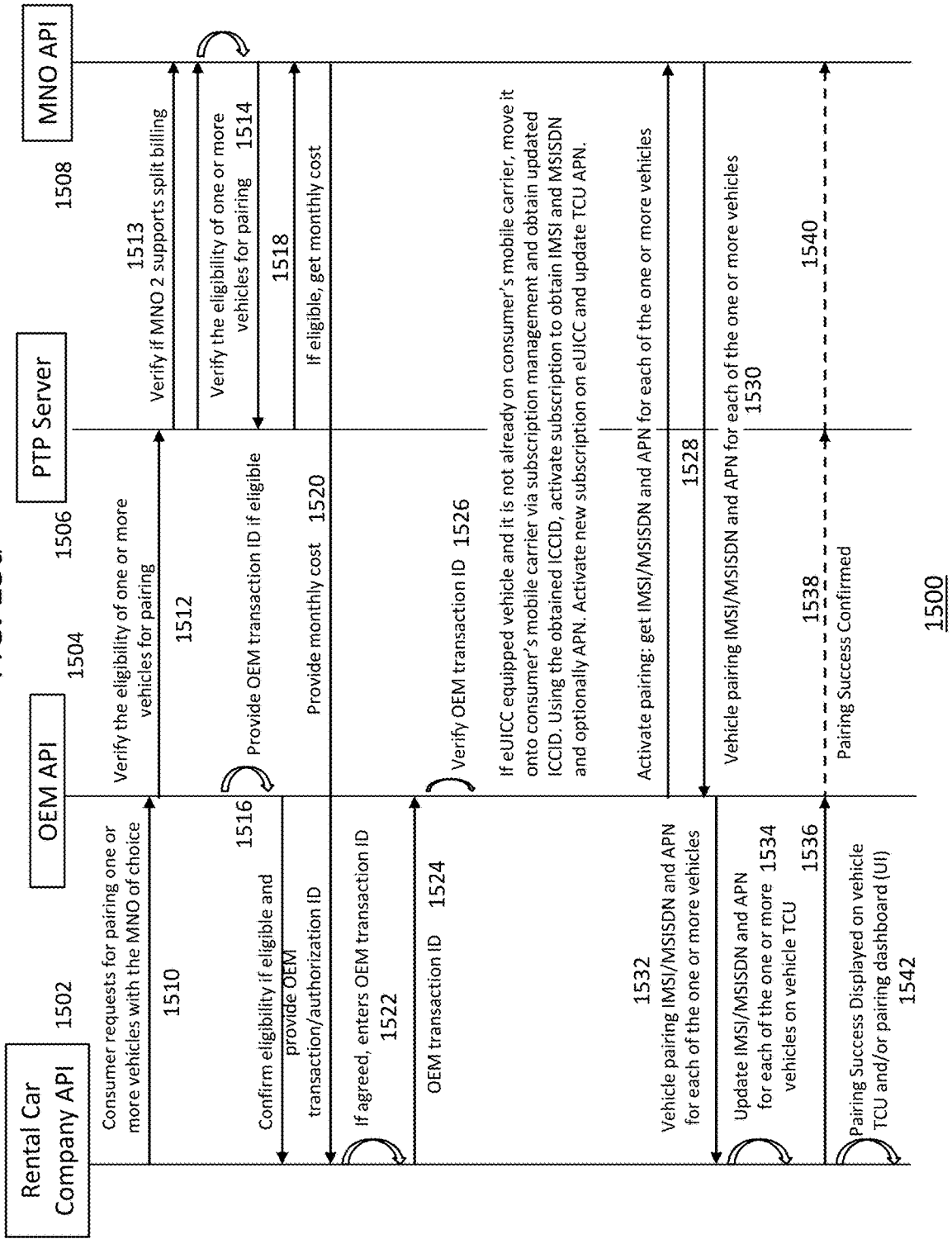
FIG. 15a is a process flow diagram illustrating one way in which the multiple-purpose device (in this case, in a vehicle) can be paired to cellular device subscription of the consumer using the solution embedded in the device, in accordance with one or more embodiments of the present invention.

FIG. 15*a* is a process flow diagram illustrating a process 1500 in which the one or more devices, for example, an IoT device or a machine to machine (M2M) device (in this example as illustrated, in a vehicle) can be paired to cellular or other wireless subscription of the consumer (second user) using the solution embedded in the devices using subscription management described in detail in FIGS. 9*a* and 9*b*, in accordance with one or more embodiments of the present invention. For example, in an embodiment, a consumer or a second user, illustrated as a rental car company 1502, sends a request for pairing one or more devices, for example, an IoT device or a machine to machine (M2M) device such as vehicles, with the MNO 1508 of their choice to the OEM (first user) API 1504 via step 1510. The OEM (first user) API 1504 sends a verification request to check the eligibility of one or more vehicles for pairing to PTP server 1506 via step 1512. Additionally, the PTP server may also verify if MNO 2 supports split billing via step 1513 where MNO 2 may charge consumer as well as OEM for the actual connectivity in different ways, for example, each party may be charged for their usage. The PTP server 1506 verifies the eligibility of one or more vehicles for pairing with MNO API 1508 and send a response back to the PTP server 1506 via step 1514.

If eligible, the OEM (first user) API 1504, provides a transaction ID or authorization code to the rental car company API 1502 via step 1516. If eligible, the PTP server 1506 also requests monthly cost from the MNO API 1508 via step 1518, and provides it to the the rental car company API 1502 via step 1520.

The verification of the cost may include one or more levels of cost options, for example, if the OEM provides connected car services and bills consumer for connected car services, MNO 2 may charge consumer as well as OEM for the actual connectivity in different ways, for example, each party may be charged for their usage, also known as split billing, in the cases where MNO 2 support split billing; the consumer may be charged for the connectivity used by the consumer themselves as well as the OEM, in which case, the consumer may or may not charge OEM for their usage; and the OEM may be charged for the connectivity used by the OEM itself as well as the consumer, in which case, the OEM may or may not charge consumer for their connectivity usage. The options where one party, consumer or OEM may decide to charge the other party, OEM or consumer, for their usage, verification if the MNO support split billing may be necessary. However, in a scenario where the OEM has a complete list of usage records and corresponding charges, then OEM itself can charge consumer for their usage and may not require the MNO to support split billing. If consumer is charged for everything, which optionally charges OEM for their usage or which may be realized as other discounted services from the OEM for using consumer's connectivity, there is no requirement that MNO 2 supports split billing.

Additionally or alternatively, any of these states may be defined as a default state. For example, to begin the service, the default state may be defined as the OEM being charged for the connectivity used by the OEM itself as well as the consumer, and the OEM in turn charges consumer for their connectivity usage along with the connected car services. Additionally, an option to change from this default state may be provided.

If agreed, the rental car company API 1502 enters the transaction ID or authorization code provided by the OEM via step 1522 and which is provided to OEM API via step 1524, and verified by the OEM API 1504 via step 1526. The OEM API 1504 then sends a request to activate pairing and get IMSI/MSISDN and APN for each of the one or more vehicles to the MNO API 1508 via PTP server 1506 via step 1528.

The PTP server determines 1506 if the one or more vehicles are eUICC equipped and if they are not already on consumer's cellular or other wireless carrier/subscription and billing plan, move the one or mote vehicles onto consumer's cellular or other wireless carrier/subscription and billing plan via subscription management as described in FIGS. 9a and 9b, and obtain updated ICCID. Using the obtained ICCID, activate the subscription to obtain IMSI and MSISDN and optionally APN. The new subscription is then activated on eUICC and TCU APN is updated.

The MNO API 1508 pairs the IMSI/MSISDN and APN for each of the one or more vehicles and sends the pairing response to the rental car company API 1502 via PTP server 1506 via step 1530, which it then transmits to the rental car company API 1502 via step 1532.

The rental car company API 1502 updates the IMSI/MSISDN and APN for each of the one or more vehicles on each vehicle TCU via step 1534 and confirms pairing success with the OEM API 1504 via step 1536. The pairing success may be displayed on each of the one or more vehicles' TCU and/or pairing dashboard (UI) at the rental car company via step 1542 and communicated to the the PTP server 1506 via step 1538 and MNO API 1508 via step 1540.

FIG. 15b is a flow diagram illustrating a process 1500' of pairing the network usage for OEM (first user) related applications running on the one or more devices, for example, an IoT device or a machine to machine (M2M) device such as in this example as illustrated, in vehicles, to the billing plan of the consumer's (second user's) cellular or other wireless subscription using subscription management described in detail in FIGS. 9a and 9b, in accordance with one or more embodiments of the invention. For example, in an embodiment, the OEM API 1504 sends a request for pairing the one or more vehicles with the the consumer's (second user's, for example, rental car company) cellular or other wireless subscription to the PTP server 1506 along with MSISDN/s of one or more cellular or IoT devices of the consumer and MNO of one or more cellular or IoT devices of the consumer to the PTP server 1506 via step 1550. The PTP server 1506 request transaction ID/authentication code from the MNO API 1508 for pairing request with consumer (second user) MSISDN via step 1552.

The MNO API 1508 checks if the account associated with the MSISDN is valid for authorizing the pairing request via step 1554 and also checks if the consumer (second user) approves the pairing request with the rental car company (consumer) API 1502 via step 1556 (is this checked by the PTP server or MNO API?). If the consumer, in this case, the rental car company API 1502 approves the pairing via step 1558, the MNO API 1508 generates the authorization code via step 1560 and sends the confirmation of eligibility and authorization/transaction code to the PTP server 1506 via step 1562.

The PTP server 1506 determines if the one or more vehicles are eUICC equipped and if they are not already on consumer's cellular or other wireless carrier/subscription and billing plan, moves the one or more vehicles onto consumer's cellular or other wireless carrier/subscription and billing plan via subscription management as described in FIGS. 9a and 9b, and obtains updated ICCID. Using the obtained ICCID, the PTP server 1506 activates the subscription to obtain IMSI and MSISDN and optionally APN. The new subscription is then activated on eUICC and TCU APN is updated via step 1564.

The PTP server 1506 sends a request to the MNO API 1508 to pair the vehicle to the consumer's (second user's) account for billing along with MSISDN/s of one or more cellular or IoT devices, consumer MSISDN and previously received authorization code via step 1566. The MNO API 1508 pairs the one or more cellular or IoT devices for consumer's (second user's) cellular or other wireless account for billing via step 1568 and sends confirmation of the billing change to the PTP server 1506 via step 1570. The PTP server 1506 then sends confirmation of pairing to OEM API 1504 and optionally, may provide updated TCU mobile subscription parameters (MSISDN, ICCID, APN) to the OEM API 1504 via step 1572.

In one or more embodiment described herein, the one or more devices, for example, an IoT device or a machine to machine (M2M) device may be configured to use the bootstrap carrier described in the description accompanying FIG. 3a or the bootstrap profile or initial profile in case of eSIM described above as a "fall back" if the device that was paired to a phone and/or a plan of the second user (consumer user, including enterprise consumer user) is then sold to a 3rd party (which may be another consumer user) without the first user, for example, the OEM, knowing about it, and the second user has removed the subscription/plan, the first user, for example, the OEM, can still get data from the device using the "fall back" plan.

The embodiments recited herein may use any one or more of: Pair the Plan system for devices and method of use described in co-pending and co-owned U.S. application Ser. No. 15/599,835 and 14/274,505 (referred to herein as basic Pair The Plan) and Pair The Plan system for devices and method of use described in co-pending and co-owned U.S. application Ser. No. 16/819,398 (referred to herein as Pair The Plan using subscription management), to carry out the operations described in the description of those embodiments where applicable, all of which are incorporated herein by reference in their entirety.

In the case of basic Pair The Plan, as described in the description accompanying FIG. 3a, the device manufacturer (first user or enterprise user), for example, vehicle OEM, is always connected to the device via the OEM's (First user's) carrier which may be a "bootstrap" carrier or a "default" carrier, in a manufacturing state, state 0. When the device, for example, an IoT device or a machine to machine (M2M) device such as but not limited to a vehicle, is purchased, a consumer (second user), in this case owner of the vehicle or the rental car company, can enroll their vehicle into their existing cellular or other wireless plan or the cellular or other wireless service and billing plan chosen by them as provided by their cellular or other wireless network provider.

The implementation depicted in FIG. 3a involves the management and updating of the multi-purpose device's network parameters and resources such as the International Mobile Subscriber Identifier (IMSI) or Mobile Directory Number (MDN), and the device Preferred Roaming List (PRL) or public land mobile network (PLMN). For example, the vehicle owner's (second owner's) carrier may assign a new international mobile subscriber identifier (IMSI) to the device, for example, an IoT device or a machine to machine (M2M) device such as in this example, the vehicle. The new IMSI assigned by the vehicle owner's (second owner's) carrier will be used for all future authentications and dataflow, and old IMSI assigned by the OEM's (first user's) carrier remains as a back-up for the vehicle OEM (first user) to access the vehicle related data in case of loss of connection through the new carrier or suspension or termination of the vehicle owner's account with the new carrier.

Similarly, in case of Pair The Plan using subscription management, which may be performed using eSIM, at any given point in time there is at least one and potentially more than one profiles on the eSIM, e.g., the initial profile or the bootstrap profile and the currently active MNO profile. There may be use cases where the OEM may want to "fall back" to the initial or bootstrap profile. For example, in case of loss of connection through the new chosen and paired MNO, or suspension or termination of the consumer's billing account with the new chosen and paired MNO. If the OEM or other third party application providers back end system commands the eSIM to do this, it will disable the previously active MNO profile and enable the initial profile or the bootstrap profile again, or alternately download another profile (from the same or different MNO) to the eSIM and enable this downloaded profile.

In the embodiments described above, where the enterprise user or the first user, for example, original equipment manufacturer (OEM) moves over (piggybacking), to the consumer's (second user's) cellular or other wireless service provider also known as mobile network operator (MNO), the eSIM may still have two MNO profiles on it, but only one is really active since all usage is being rated according to the consumer's cellular or other wireless subscription and associated billing plan. The other profile may be the default, or the "bootstrap" profile, of the OEM's original MNO, which may be different or, by coincidence, be the same. The bootstrap profile may be kept alive but dormant (and there may be billing from the MNO associated with that) so that if the consumer plan is terminated for whatever reason (e.g., non-payment), the activity can move over to the plan associated with the other profile and may be billed according to the other user's e.g., enterprise user's, cellular or other wireless subscription and associated billing plan. The "bootstrap" profile and the "default" profile as used in herein is described in detail above.

This allows for service continuity in such a way that even after the second user (consumer user which may be an individual or an enterprise) has canceled their plan in a pair-the-plan scenario, it is possible for the connected service to work for the first user (enterprise user, for example, OEM) as well as for subsequent owners where the next owner may cancel their plan in the pair-the-plan scenario.

A device, for example, an IoT device or a machine to machine (M2M) device such as but not limited to a vehicle, has a bootstrap network profile that allows for the first-time connection, registration, pairing, and enrollment. (The OEM also known as a first user can modify this bootstrap network profile to their own default network profile before the vehicle is sold for the first time.)

The first owner (second user or buyer of the vehicle, which may be an individual or an enterprise such as a rental car company) connects, registers, pairs, enrolls, and subscribes.

The subscription is sent to the eSIM in the vehicle per individual consumer or enterprise pair-the-plan flow described in the description accompanying FIGS. 8a, 8b, 15a and 15b.

When the second user cancels the plan, the plan should be removed from the eSIM in the vehicle, and the SIM needs to fallback to a default network profile to allow the next user (third user, for example, a subsequent buyer such as a used car buyer) or the first user such as a manufacturer, to connect, register, pair, and enroll.

A variety of methods may be used to achieve this detection and fallback and they could potentially happen in a different order, for example, communication-level detection and fallback where the consumer (second user) cancels their plan first. For example, the radio module in the car attempts to connect to the telematics service using the consumer (second user) plan but is denied because the plan has been canceled. The eSIM sub-system has a fallback mechanism to connect via the bootstrap subscription. The telematics software needs to determine whether the communication issue is a problem with coverage on the consumer plan or because the plan has been canceled. Once the telematics software determines the problem is due to canceled plan, it can remove the consumer (second user's) plan from the eSIM. This is illustrated by FIG. 16A.

Another method may use a telematics service detection: in this case the consumer (second user) cancels their telematics service due to no longer wanting the service or because they have sold the car. It is also possible that the telematics service registers with the MNO for call-back if the consumer (second user) cancels their MNO plan. Additionally or alternatively, the telematics service may use data collection and analytics to determine that the consumer (second user) is no longer the owner of the car. Additionally or alternatively, the telematics service provider may collect information from the radio module that shows denial of connectivity due to authentication and authorization or lack of coverage.

Once the telematics service detects that the consumer (second user) has canceled their telematics service plan or no longer owns the vehicle, the telematics service provider can initiate the removal of the consumer (second user) subscription from the eSIM, and fallback to either bootstrap or OEM default subscription. Although the embodiments are described herein use the first user and second user, a person skilled in the art may readily recognize that a user may be a second, third, fourth . . . user that cancels the subscription and the first user, for example, an OEM, a telematics service provider or any subsequent buyer (third, fourth, fifth . . . user) may benefit from the fallback to either bootstrap or OEM default subscription described herein and hence is within the scope of this invention. This is illustrated by FIG. 16B.

Thus, in an embodiment, the computer-implemented method, system and computer program product further includes using a bootstrap IMSI or a bootstrap profile configured by a first user as an alternate path to access the cellular or other wireless service when the access to the cellular or wireless service previously chosen by a second user is denied by the cellular or other wireless service provider.

FIG. 16A is a flow diagram illustrating a system and process 1600 for determining denial of service and using Fall-Back IMSI or plan, in accordance with one or more embodiments of the invention. For example, a consumer user or a second user 1602 which may be an individual or an enterprise (for example, second user) cancels cellular or other wireless service plan via step 1614 without any notification. The device 1612 which was enrolled in that cellular or other wireless service plan provided by a cellular service provider 1610, illustrated as MNO 2, tries to access the service via 1616, and receives a notification as access denied from the cellular or other wireless service provider 1610, illustrated as MNO 2 via step 1618.

The device 1612, then tries to determine if the denial of service is because of loss of coverage or plan cancellation via step 1620. As described above this may be accomplished by communication-level detection as illustrated in FIG. 16A, or by using a telematics service detection, using data collection and analytics by the telematics service to determine that the consumer (second user) is no longer the owner of the car, or by collecting information from the radio module by the telematics service provider, which may show the denial of connectivity due to authentication and authorization or lack of coverage, as illustrated in FIG. 16B.

Once it is determined that the denial of access due to cancellation of plan, as illustrated in FIG. 16A, the device 1612 deactivates MNO 2 profile from eSIM or may remove the MNO 2 profile from eSIM when instructed to do so by the OEM or the PTP server via step 1622. This may be achieved by using process(es) illustrated in FIGS. 9A and 9B and described in detail in the description accompanying FIGS. 9A and 9B when using Pair-The-Plan using subscription management.

The the device 1612 may optionally request PTP server to remove MNO 2, profile, or not use second IMSI assigned by MNO 2, via step 1622' which may be accomplished by using basic Pair-The-Plan.

The device 1612 then accesses the cellular or other wireless service via bootstrap IMSI for continued access to device data by the OEM or the first user and/or to connect and enroll in the new cellular or other wireless service and billing plan by the subsequent owner also referred to as a subsequent user via step 1624. The subsequent user of the device 1612 may request for pairing one or more devices 1612 with the cellular or other wireless service provider of their choice and OEM or the first user may continue access via fall-back IMSI or switch to another MNO of their choice via step 1626.

FIG. 16B is a flow diagram illustrating a system and process 1600' for determining that the consumer (second user) is no longer the owner of the car and using Fall-Back IMSI or plan, in accordance with one or more embodiments of the invention. For example, a consumer user or a second user 1602 which may be an individual or an enterprise (for example, second user) cancels telematics service plan or sells the device via step 1614' without any notification. If the device 1612 which was enrolled in that cellular or other wireless service plan provided by a cellular service provider 1610, illustrated as MNO 2, tries to access the service, it will receive a notification as access denied from the cellular or other wireless service provider 1610, illustrated as MNO 2 via step 1618', in which case communication level detection illustrated in FIG. 16A and described in the description accompanying FIG. 16A applies.

Additionally or alternatively, the telematics service provider may collect information from the radio module that shows denial of connectivity due to authentication and authorization or lack of coverage.

Alternatively, the telematics service may use data collection and analytics to determine that the consumer (second user) is no longer the owner of the car via step 1616'.

Once the telematics service provider 1604 determines that there is a change of ownership or cancellation of telematics service plan, the telematics service provider 1604 may remove the consumer (second user) subscription from the eSIM, for example, removes MNO 2 profile from eSIM via step 1622'. This may be achieved by using process(es) illustrated in FIGS. 9A and 9B and described in detail in the description accompanying FIGS. 9A and 9B when using Pair-The-Plan using subscription management.

The telematics service provider 1604 may optionally request PTP server to remove MNO 2 profile, or not use second IMSI assigned by MNO 2, via step 1622' which may be accomplished by using basic Pair-The-Plan.

The device 1612 may then be accessed by the telematics service provider or OEM 1604 via the cellular or other wireless service via bootstrap IMSI assigned by MNO 1 for continued access to device data by the OEM or the first user and/or to connect and enroll in the new cellular or other wireless service and billing plan by the subsequent owner also referred to as a subsequent user via step 1624. The subsequent user of the device 1612 may request for pairing one or more devices 1612 with the cellular or other wireless service provider of their choice and OEM or the first user may continue access via fall-back IMSI or switch to another MNO of their choice via step 1626.

Figure 17:
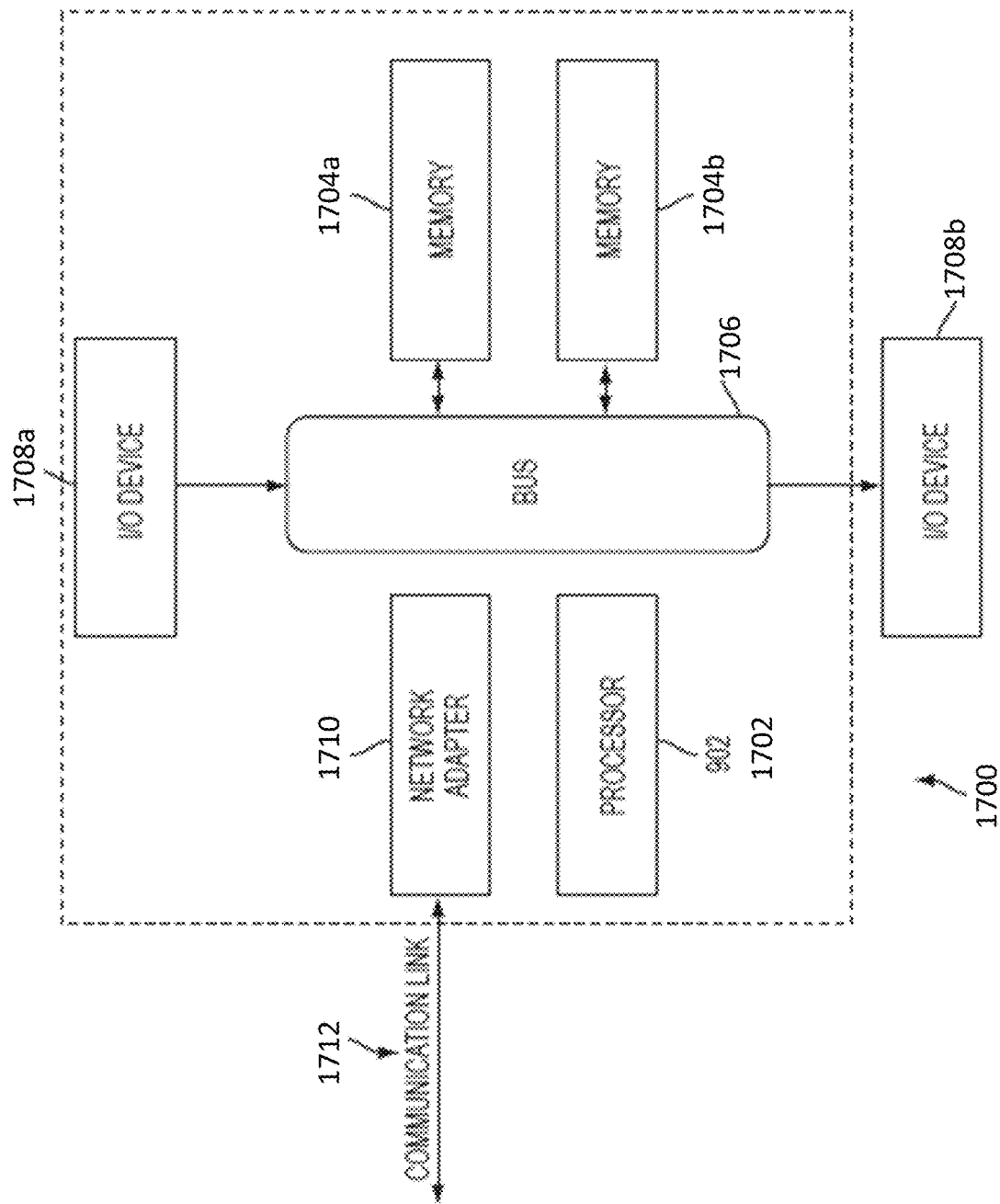
FIG. 17 illustrates a data processing system 900 suitable for storing the computer program product and/or executing program code relating to the choices of the users in accordance with one or more embodiments of the present invention.

FIG. 17 illustrates a data processing system 1700 suitable for storing the computer program product and/or executing program code in accordance with an embodiment of the present invention. The data processing system 1700 includes a processor 1702 coupled to memory elements 1704*a-b* through a system bus 1706. In other embodiments, the data processing system 1700 may include more than one processor and each processor may be coupled directly or indirectly to one or more memory elements through a system bus.

Memory elements 1704*a-b* can include local memory employed during actual execution of the program code, bulk storage, and cache memories that provide temporary storage of at least some program code in order to reduce the number of times the code must be retrieved from bulk storage during execution. As shown, input/output or I/O devices 1708*a-b* (including, but not limited to, keyboards, displays, pointing devices, etc.) are coupled to the data processing system 1700. I/O devices 1708*a-b* may be coupled to the data processing system 900 directly or indirectly through intervening I/O controllers (not shown).

In FIG. 17, a network adapter 1710 is coupled to the data processing system 1702 to enable data processing system 1702 to become coupled to other data processing systems or remote printers or storage devices through communication link 1712. Communication link 1712 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk—read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

Similarly, it is envisioned by the present invention that the term communications network includes communications across a network (such as that of a M2M but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, 5G, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method comprising:
    enrolling one or more devices enabled for connectivity to cellular or other wireless service in a cellular or other wireless subscription and associated billing plan,
        wherein the enrollment includes providing an identifier for each of the one or more devices to a cellular or other wireless service provider chosen by a second user, effectively adding the one or more devices to the cellular or other wireless subscription and associated billing plan chosen by the second user; and
    allowing the second user to use capabilities of the one or more devices as governed by the cellular or other wireless subscription and an associated billing plan chosen by the second user;
    while the one or more devices are also configured to allow a first user to use capabilities of the one or more devices as governed by the cellular or other wireless subscription and an associated billing plan of the first user's choice,
        wherein each of the one or more devices is shared simultaneously by the first user and the second user,
        wherein the first user is an enterprise user and the usage characteristics of interest to the first user comprise enterprise applications and purposes, and
        wherein the second user is an individual consumer or another enterprise and the usage characteristics of interest to the second user comprise consumer or another enterprise applications and purposes.

2. The computer-implemented method of claim 1, wherein the second user comprises any user that uses the device subsequent to the first user or a user subsequent to that user.

3. The computer-implemented method of claim 1, wherein the cellular or other wireless subscription and an associated billing plan of the first user's choice includes the same cellular or other wireless subscription and the associated billing plan chosen by the second user or a different cellular or other wireless subscription and an associated billing plan.

4. The computer-implemented method of claim 1 further comprising:
    managing data flow through one or more data paths according to usage requirements of the first user and the second user.

5. The computer-implemented method of claim 1 further comprising:
    managing data flow through one or more data paths according to connectivity parameters controlled by the cellular or other wireless service provider and the enabled one or more devices, and according to usage requirements of the first user and the second user.

6. The computer-implemented method of claim 4 further comprising:
    allowing emergency access to emergency related data-flow to and from the enabled one or more devices by overriding data-flow management configuration under non-emergency situation.

7. The computer-implemented method of claim 1, wherein the one or more devices are multipurpose devices shared simultaneously by the first user and the second user, and wherein the capabilities of the device of interest to the first user comprise machine to machine (M2M) traffic, and wherein the capabilities of the device of interest to the second user comprise machine to machine (M2M) traffic, consumer traffic or a combination thereof.

8. The computer-implemented method of claim 1, wherein the device identifier comprises any of international mobile subscriber identification (IMSI), mobile directory number (MDN), mobile subscriber integrated services digital network number (MSISDN), integrated circuit card identifier (ICCID), embedded universal integrated circuit card identifier (EID) and a combination thereof.

9. The computer-implemented method of claim 1, wherein enrolling one or more devices enabled for connectivity to cellular or other wireless service in a cellular or other wireless subscription and associated billing plan further comprises using over the air subscription management.

10. The computer-implemented method of claim 1, wherein configuring the enabled one or more devices for use by a first user via the same cellular or other wireless subscription and the associated billing plan selected by the second user includes providing device identifier of the one or more devices to the cellular or other wireless service provider chosen by the second user for pairing usage of the one or more devices to the cellular or other wireless subscription and associated billing plan chosen by the second user.

11. The computer-implemented method of claim 1, further comprising using a bootstrap IMSI or a bootstrap profile configured by a first user as an alternate path to access the cellular or other wireless service when the access to the cellular or other wireless service previously chosen by a second user is denied by the cellular or other wireless service provider.

12. A system comprising one or more devices and a cellular or other wireless service provider enrollment server enabled for enrollment of the one or more devices, the server including a processor and a memory in communication with the processor, wherein the server
   receives an identifier for each of the one or more devices to the cellular or other wireless service provider, effectively adding the one or more devices to the cellular or other wireless subscription and associated billing plan chosen by the second user, and
   enrolls the one or more devices enabled for connectivity to cellular or other wireless service in a cellular or other wireless subscription and associated billing plan chosen by the second user;
      wherein the second user is allowed to use capabilities of the one or more devices as governed by the cellular or other wireless subscription and an associated billing plan chosen by the second user; and
   wherein the one or more devices are also configured to allow a first user to use capabilities of the one or more devices as governed by the cellular or other wireless subscription and an associated billing plan of the first user's choice,
      wherein each of the one or more devices is shared simultaneously by the first user and the second user,
      wherein the first user is an enterprise user and the usage characteristics of interest to the first user comprise enterprise applications and purposes, and
      wherein the second user is an individual consumer or another enterprise and the usage characteristics of interest to the second user comprise consumer or another enterprise applications and purposes.

13. The system of claim 12, wherein the second user comprises any user that uses the device subsequent to the first user or to a user subsequent to that user.

14. The system of claim 12, wherein the cellular or other wireless subscription and an associated billing plan of the first user's choice includes the same cellular or other wireless subscription and the associated billing plan chosen by the second user or a different cellular or other wireless subscription and an associated billing plan.

15. The system of claim 12, wherein data flow through one or more data paths is managed according to usage requirements by the first user and the second user.

16. The system of claim 12, wherein data flow through one or more data paths is managed according to connectivity parameters controlled by the cellular or other wireless service provider and the enabled one or more devices, and according to usage requirements by the first user and the second user.

17. The system of claim 15, wherein the data flow through one or more data paths is allowed emergency access to emergency related data-flow to and from the enabled device by overriding data-flow management configuration under non-emergency situation.

18. The system of claim 12, wherein the one or more devices are multipurpose devices shared simultaneously by the first user and the second user, and wherein the capabilities of the device of interest to the first user comprise machine to machine (M2M) traffic, and wherein the capabilities of the device of interest to the second user comprise machine to machine (M2M) traffic, consumer traffic or a combination thereof.

19. The system of claim 12, wherein the device identifier comprises any of international mobile subscriber identification (IMSI), mobile directory number (MDN), mobile subscriber integrated services digital network number (MSISDN), integrated circuit card identifier (ICCID), embedded universal integrated circuit card identifier (EID) and a combination thereof.

20. The system of claim 12, wherein enrolling the one or more devices enabled for connectivity to cellular or other wireless service in a cellular or other wireless subscription and associated billing plan chosen by the second user further comprises using over the air subscription management.

21. The system of claim 12, wherein configuring the enabled one or more devices for use by a first user via the same cellular or other wireless subscription and the associated billing plan chosen by the second user includes providing device identifier of the one or more devices to the cellular or other wireless service provider chosen by the second user for pairing usage of the one or more devices to the cellular or other wireless subscription and associated billing plan chosen by the second user.

22. The system of claim 12, wherein the one or more devices are configured to access the cellular or other wireless service using a bootstrap IMSI or a bootstrap profile as an alternate path when the access to the cellular or other wireless service is denied by the cellular or other wireless service provider.

23. A non-transitory computer-readable medium having executable instructions stored therein that, when executed, cause one or more processors corresponding to a system having one or more devices and a cellular or other wireless service provider enrollment server enabled for enrollment of the one or more devices, the server including a processor, a memory in communication with the processor and a user interface, to perform operations comprising:
   enrolling the one or more devices enabled for connectivity to cellular or other wireless service in a cellular or other wireless subscription and associated billing plan,
      wherein the enrollment includes providing an identifier for each of the one or more devices to a cellular or other wireless service provider chosen by a second user, effectively adding the one or more devices to the cellular or other wireless subscription and associated billing plan chosen by the second user; and
   allowing the second user to use capabilities of the one or more devices as governed by the cellular or other wireless subscription and an associated billing plan chosen by the second user; while the one or more devices are also configured to allow a first user to use capabilities of the one or more devices as governed by the cellular or other wireless subscription and an associated billing plan of the first user's choice,
      wherein each of the one or more devices is shared simultaneously by the first user and the second user,
      wherein the first user is an enterprise user and the usage characteristics of interest to the first user comprise enterprise applications and purposes, and
      wherein the second user is an individual consumer or another enterprise and the usage characteristics of interest to the second user comprise consumer or another enterprise applications and purposes.

24. The non-transitory computer-readable medium of claim 23, wherein the second user comprises any user that uses the device subsequent to the first user or to a user subsequent to that user.

25. The non-transitory computer-readable medium of claim 23, wherein the cellular or other wireless subscription and an associated billing plan of the first user's choice includes the same cellular or other wireless subscription and the associated billing plan chosen by the second user or a different cellular or other wireless subscription and an associated billing plan.

26. The non-transitory computer-readable medium of claim 23, further comprising instructions for:
  managing data flow through one or more data paths according to usage requirements of the first user and the second user.

27. The non-transitory computer-readable medium of claim 23, further comprising instructions for:
  managing data flow through one or more data paths according to connectivity parameters controlled by the cellular or other wireless service provider and the enabled one or more devices, and according to usage requirements of the first user and the second user.

28. The non-transitory computer-readable medium of claim 26, further comprising instructions for:
  allowing emergency access to emergency related data-flow to and from the enabled one or more devices by overriding data-flow management configuration under non-emergency situation.

29. The non-transitory computer-readable medium of claim 23, wherein the one or more devices are multipurpose devices shared simultaneously by the first user and the second user, and wherein the capabilities of the device of interest to the first user comprise machine to machine (M2M) traffic, and wherein the capabilities of the device of interest to the second user comprise machine to machine (M2M) traffic, consumer traffic or a combination thereof.

30. The non-transitory computer-readable medium of claim 23, wherein the device identifier comprises any of international mobile subscriber identification (IMSI), mobile directory number (MDN), mobile subscriber integrated services digital network number (MSISDN), integrated circuit card identifier (ICCID), embedded universal integrated circuit card identifier (EID) and a combination thereof.

31. The non-transitory computer-readable medium of claim 23, wherein enrolling the one or more devices enabled for connectivity to cellular or other wireless service in a cellular or other wireless subscription and associated billing plan further comprises using over the air subscription management.

32. The non-transitory computer-readable medium of claim 23, wherein configuring the enabled one or more devices for use by a first user via the same cellular or other wireless subscription and the associated billing plan chosen by the second user includes providing device identifier of each the one or more devices to the cellular or other wireless service provider chosen by the second user for pairing usage of the one or more devices to the cellular or other wireless subscription and associated billing plan chosen by the second user.

33. The non-transitory computer-readable medium of claim 23, further comprising instructions for using a bootstrap IMSI or a bootstrap profile as an alternate to access the cellular or other wireless service when the access to the cellular or other wireless service is denied by the cellular or other wireless service provider.

* * * * *